(12) United States Patent
Okamoto

(10) Patent No.: US 10,316,417 B2
(45) Date of Patent: Jun. 11, 2019

(54) PHOTOSYNTHESIS APPARATUS

(71) Applicant: FUJITSU LIMITED, Kawasaki-shi, Kanagawa (JP)

(72) Inventor: Naoya Okamoto, Isehara (JP)

(73) Assignee: FUJITSU LIMITED, Kawasaki (JP)

(*) Notice: Subject to any disclaimer, the term of this patent is extended or adjusted under 35 U.S.C. 154(b) by 240 days.

(21) Appl. No.: 15/264,959

(22) Filed: Sep. 14, 2016

(65) Prior Publication Data
US 2017/0002471 A1   Jan. 5, 2017

Related U.S. Application Data

(63) Continuation of application No. PCT/JP2014/060628, filed on Apr. 14, 2014.

(51) Int. Cl.
*C25B 9/00* (2006.01)
*C25B 9/10* (2006.01)
(Continued)

(52) U.S. Cl.
CPC ............. *C25B 9/10* (2013.01); *C25B 1/003* (2013.01); *C25B 1/10* (2013.01); *C25B 3/04* (2013.01);
(Continued)

(58) Field of Classification Search
CPC .. C25B 1/003; C25B 9/10; C25B 1/10; Y02E 10/549
(Continued)

(56) References Cited

U.S. PATENT DOCUMENTS

| 2002/0130030 | A1 | 9/2002 | Kato | |
| 2011/0278176 | A1 | 11/2011 | He | |
| 2014/0209893 | A1* | 7/2014 | Okamoto | H01L 29/045 257/43 |

FOREIGN PATENT DOCUMENTS

| JP | S53-31576 | 3/1978 |
| JP | H04-63113 | 2/1992 |

(Continued)

OTHER PUBLICATIONS

S. Sato, et al.; "Selective CO2 Conversion to Formate Conjugated with H2O Oxidation Utilizing Semiconductor/Complex Hybrid Photocatalysts;" J. Am. Chem. Soc.; vol. 133; 2011; pp. 15240-15243 (4 Sheets)/p. 3 of specification.

S. Yotsuhashi, et al.; "Enhanced CO2 reduction capability in an AlGaN/GaN photoelectrode;" Applied Physics Letters; vol. 100; 2012; pp. 243904-1-243904-3 and cover sheet (4 Sheets total)/p. 3 of specification.

International Search Report for International Application No. PCT/JP2014/060628 dated Jul. 15, 2014.

*Primary Examiner* — Zulmariam Mendez

(74) *Attorney, Agent, or Firm* — Kratz, Quintos & Hanson, LLP

(57) ABSTRACT

A photosynthesis apparatus includes a groove part formed in a semiconductor substrate; a first conductive type area formed on one side surface of the groove part; a second conductive type area formed on another side surface of the groove part; an oxidation electrode formed in contact with the first conductive type area on the one side surface; a reduction electrode formed in contact with the second conductive type area on the other side surface; and a proton diaphragm formed at a center part of the groove part. Water including carbon dioxide is supplied to the groove part, and light is radiated to the oxidation electrode or the reduction electrode to generate oxygen and a hydrogen ion from the water at the oxidation electrode, and the generated hydrogen ion penetrates the proton diaphragm and reacts with the carbon dioxide to generate formic acid at the reduction electrode.

10 Claims, 42 Drawing Sheets

(51) Int. Cl.
  *C25B 3/04*     (2006.01)
  *C25B 1/00*     (2006.01)
  *C25B 1/10*     (2006.01)
  *H01G 9/20*     (2006.01)
  *H01G 9/22*     (2013.01)
  *C25B 9/04*     (2006.01)

(52) U.S. Cl.
  CPC ............... *C25B 9/04* (2013.01); *H01G 9/205* (2013.01); *H01G 9/22* (2013.01); *Y02E 60/368* (2013.01)

(58) Field of Classification Search
  USPC ......................................................... 204/248
  See application file for complete search history.

(56) References Cited

FOREIGN PATENT DOCUMENTS

| | | |
|---|---|---|
| JP | 2000-300954 | 10/2000 |
| JP | 2001-97894 A1 | 4/2001 |
| JP | 2005-146344 A1 | 6/2005 |
| JP | 2011-94194 A1 | 5/2011 |
| JP | 2013-532228 A1 | 8/2013 |

* cited by examiner

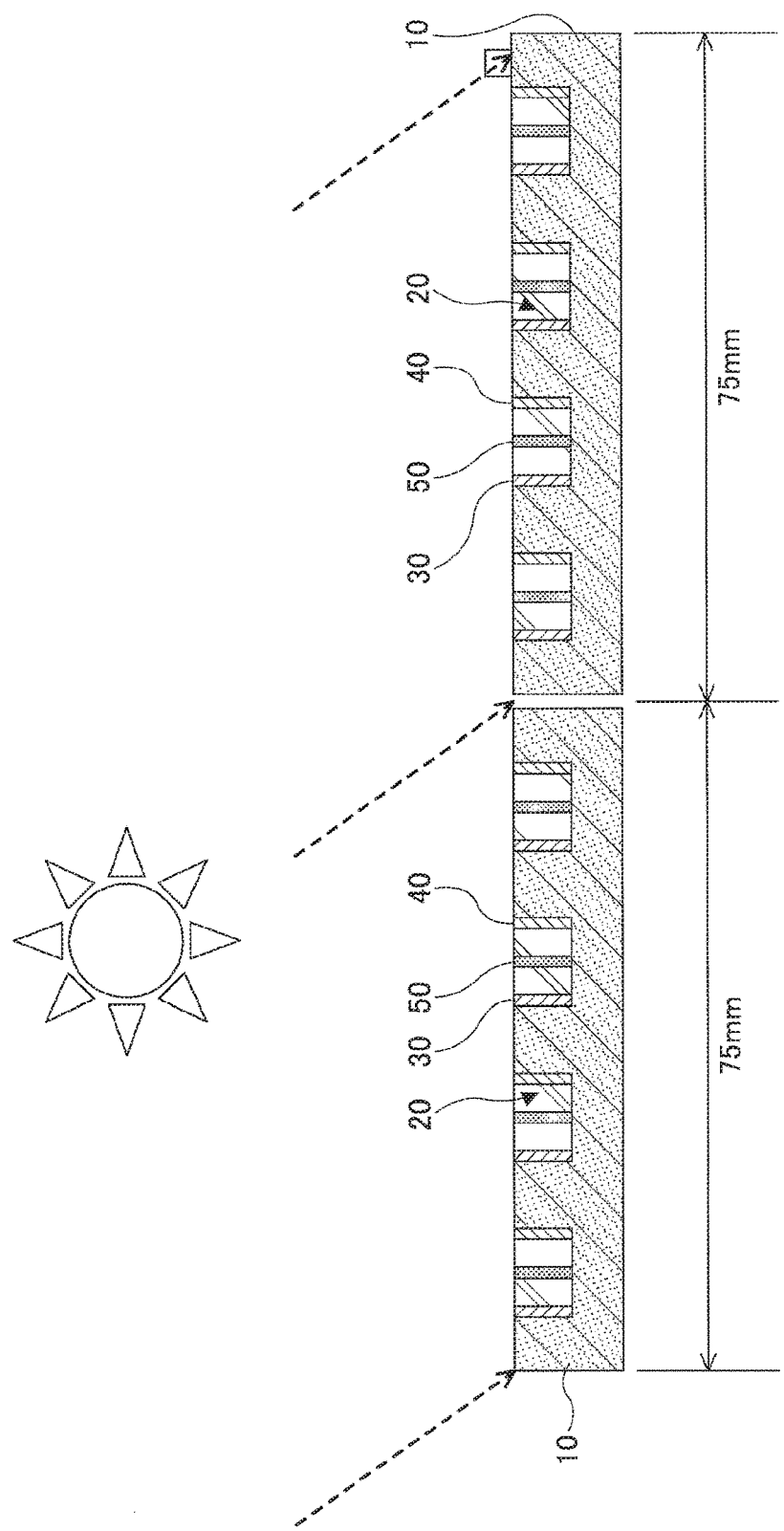

PHOTOSYNTHESIS APPARATUS

CROSS-REFERENCE TO RELATED APPLICATION

This application is a U.S. continuation application filed under 35 USC 111(a) claiming benefit under 35 USC 120 and 365(c) of PCT Application PCT/JP2014/060628 filed on Apr. 14, 2014, the entire contents of which are incorporated herein by reference.

FIELD

The embodiments discussed herein are related to a photosynthesis apparatus.

BACKGROUND

Presently, carbon dioxide ($CO_2$), which is a greenhouse effect gas, is increasing at a rate of 2 ppm per year, and global warming is in a serious status. If the density of carbon dioxide continues to increase, in the year 2050, it is predicted that 15% through 34% of the organism species will become extinct. The increase of carbon dioxide that affects global warming described above is occurring mainly in industrialized nations such as the US, EU, and Japan; and China. The responsibility of nations that are generating a large amount of carbon dioxide is grave. Under these circumstances, in order to reduce the emission of carbon dioxide and to absorb the carbon dioxide that has been emitted, approximately one third of the land on earth has to be greened. Otherwise, it is considered to be difficult to maintain the present density level of carbon dioxide until the year 2050.

As a method of solving the above problem, there are expectations for artificial photosynthesis. FIG. 1 is a diagram illustrating an artificial photosynthesis system that is a photosynthesis apparatus for performing artificial photosynthesis according to the related art. In the artificial photosynthesis system, in a water tank 920 containing water 910 including carbon dioxide, an $H_2O$ oxidation electrode 930 and a $CO_2$ reduction electrode 940 are disposed. A proton diaphragm 950 is disposed between the $H_2O$ oxidation electrode 930 and the $CO_2$ reduction electrode 940. By radiating light such as sunlight to the $H_2O$ oxidation electrode 930 and the $CO_2$ reduction electrode 940, in the $H_2O$ oxidation electrode 930, $O_2$ and $H^+$ (hydrogen ion) are generated from $H_2O$. The generated $H^+$ passes through the proton diaphragm 950, and in the $CO_2$ reduction electrode 940, the $H^+$ reacts with $CO_2$, and formic acid (HCOOH) is generated. Note that in order for the $CO_2$ to be reduced in the $CO_2$ reduction electrode 940, high-energy electrons are needed. Therefore, the conduction band in the $CO_2$ reduction electrode 940 has to be formed of a material by which the energy becomes higher than that of the conduction band in the $H_2O$ oxidation electrode 930.

For example, Non-patent Document 1 discloses that the $H_2O$ oxidation electrode 930 is formed of titanium dioxide-supported platinum ($TiO_2$/Pt) and the $CO_2$ reduction electrode 940 is formed of p-type semiconductor materials such as InP, GaP, nitrogen-doped $Ta_2O_5$, etc., and a ruthenium composite polymer. Furthermore, the proton diaphragm 950 is formed of Nafion117 (manufactured by DuPont). On the other hand, Non-patent Document 2 discloses that the $H_2O$ oxidation electrode 930 is formed of NiO/AlGaN/$n^+$-GaN and the $CO_2$ reduction electrode 940 is formed of a Cu plate. In this case, the $CO_2$ reduction electrode 940 itself is not excited by light; however, this example has a mechanism in which the electrons photoexcited in the $H_2O$ oxidation electrode 930 are transported to the $CO_2$ reduction electrode 940.

Non-patent Document 1: Sato, et al., J. Am. Chem. Soc. 133 (2011) 15240-15243

Non-patent Document 2: Yotsuhashi, et al., Appl. Phys. Lett. 100 (2012) 243904

However, in the artificial photosynthesis system of FIG. 1, the radiated light such as sunlight is absorbed by the glass of the water tank 920 and the water 910 contained in the water tank 920, and therefore the intensity of the light is attenuated and the efficiency is decreased. Furthermore, the artificial photosynthesis system of FIG. 1 is disadvantageous in that the weight is heavy, the efficiency per area is low, and the installation locations are limited.

FIG. 2A is a diagram illustrating a case where a plurality of the water tanks 920 of the artificial photosynthesis system of the related art illustrated in FIG. 1 are installed. The water tanks 920 are formed of glass having a thickness of 10 mm. The inside of the water tank 920, where the water is to be contained, has a width of 72.5 mm. The $H_2O$ oxidation electrode 930 and the $CO_2$ reduction electrode 940 are disposed at positions that are spaced apart from the walls of the water tank 920 by 10 mm. Therefore, the space between the $H_2O$ oxidation electrode 930 and the $CO_2$ reduction electrode 940 is approximately 52.5 mm.

At the center of the water tank 920, between the $H_2O$ oxidation electrode 930 and the $CO_2$ reduction electrode 940, the proton diaphragm 950 is formed. The plurality of water tanks 920 are disposed such that the space between the areas, where water is contained in adjacent water tanks 920, is approximately 52.5 mm. The space between the water tanks 920 is empty. The $H_2O$ oxidation electrode 930 and the $CO_2$ reduction electrode 940 are formed of a three inch wafer. The $H_2O$ oxidation electrode 930 and the $CO_2$ reduction electrode 940 are disposed such that, even when sunlight enters at an angle of 55°, neither forms a shadow on the other.

FIG. 2B is a graph indicating the relationship between the wavelength of light and the transmittance of water. Specifically, the graph indicates the relationship between the wavelength of light and the transmittance of light that has transmitted through quartz glass having a thickness of 10 mm and water having a width of 10 mm, and the relationship between the wavelength of light and the transmittance of light that has transmitted through quartz glass having a thickness of 10 mm and water having a width of 100 mm. As indicated in FIG. 2B, in a long wavelength area in which the wavelength of light is greater than 0.7 μm, the transmittance rapidly decreases. Note that FIG. 2C is a graph illustrating the solar spectrum, indicating the relationship between the wavelength and the intensity of sunlight detected above ground.

In a case where the water tanks 920 are disposed as illustrated in FIG. 2A, based on the information of FIG. 2B, the intensity of light reaching the $H_2O$ oxidation electrode 930 and the $CO_2$ reduction electrode 940 was calculated in a case where light having a wavelength of 0.3 μm through 1.1 μm enters the water tank 920 at an angle of 55°. As a result, it was found that the light attenuates to 46% in the light reception area of the $H_2O$ oxidation electrode 930, the light attenuates to 35% through 50% in the $CO_2$ reduction electrode 940, and the light attenuates to approximately 44% on average. Furthermore, if the sizes of the $H_2O$ oxidation electrode 930 and the $CO_2$ reduction electrode 940 are increased, the light, which reaches the areas of the $H_2O$ oxidation electrode 930 and the CO$_2$ reduction electrode 940 near the bottom surface of the water tank 920, is further attenuated. Therefore, the space between the water tanks 920 has to be increased. Accordingly, a large area will be needed for installing the artificial photosynthesis system having the structure illustrated in FIG. 1.

SUMMARY

According to an aspect of the embodiments, a photosynthesis apparatus includes a groove part formed in a semiconductor substrate; a first conductive type area formed on one side surface of the groove part in the semiconductor substrate; a second conductive type area formed on another side surface of the groove part in the semiconductor substrate; an oxidation electrode formed in contact with the first conductive type area on the one side surface of the groove part; a reduction electrode formed in contact with the second conductive type area on the other side surface of the groove part; and a proton diaphragm formed at a center part of the groove part, wherein water including carbon dioxide is supplied to the groove part, and light is radiated to the oxidation electrode or the reduction electrode to generate oxygen and a hydrogen ion from the water at the oxidation electrode, and the generated hydrogen ion penetrates the proton diaphragm and reacts with the carbon dioxide to generate formic acid at the reduction electrode.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 4 is a diagram for describing the photosynthesis apparatus according to the first embodiment of the present invention;

DESCRIPTION OF EMBODIMENTS

Figure 1:
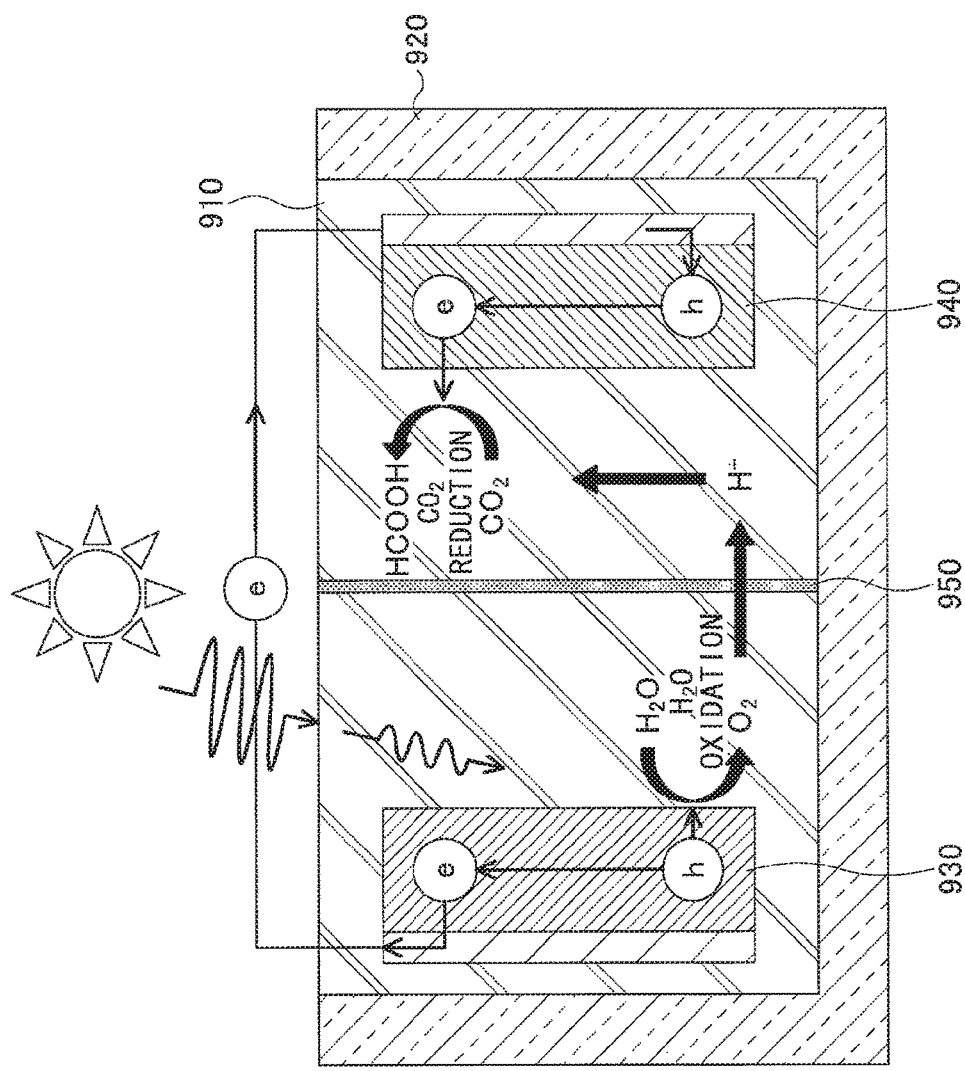
FIG. 1 is a diagram illustrating a photosynthesis apparatus according to the related art.

Preferred embodiments of the present invention will be explained with reference to accompanying drawings. Note that the same elements are denoted by the same reference numerals throughout the drawings and redundant descriptions are omitted.

First Embodiment

Figure 2A:
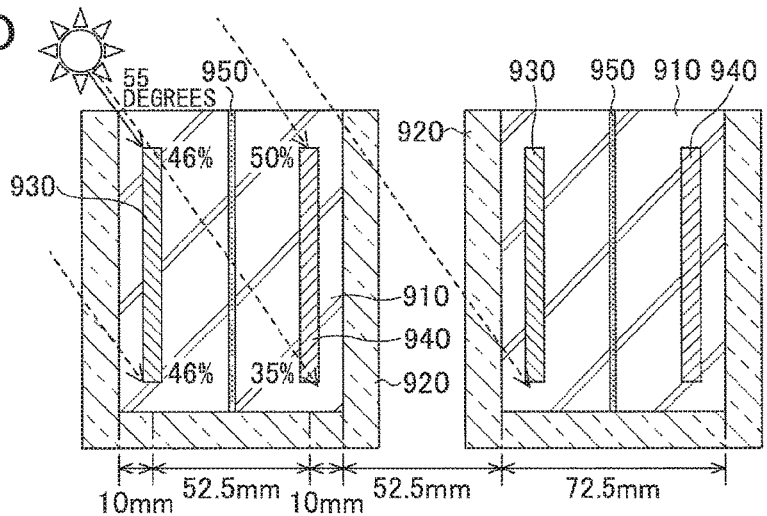
FIGS. 2A through 2C are diagrams for describing the photosynthesis apparatus illustrated in FIG. 1.
Figure 2B:
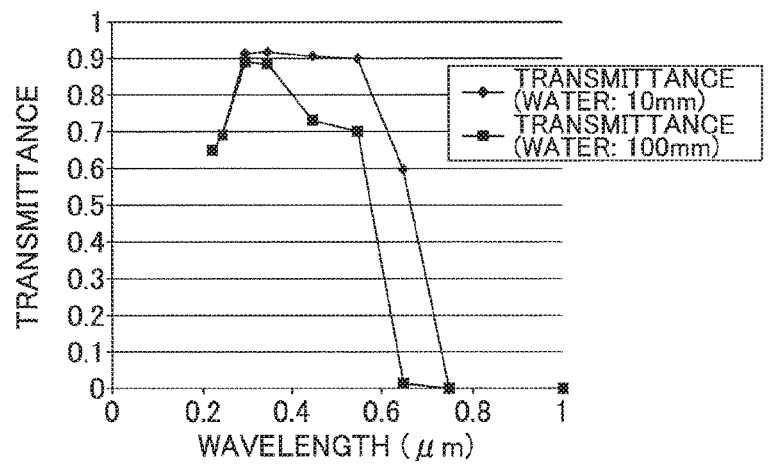
Figure 2C:
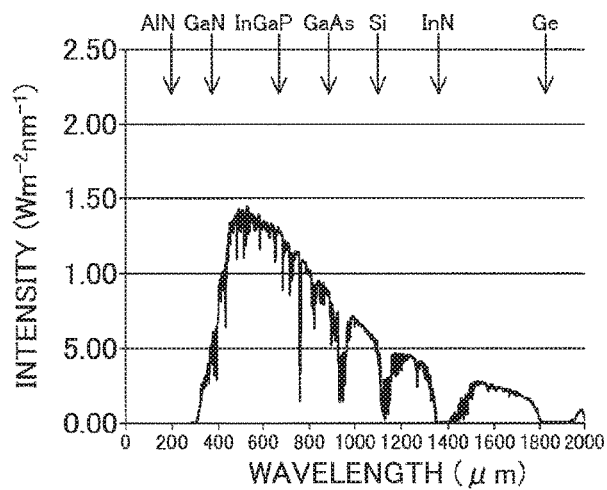

Incidentally, as indicated in FIG. 2C, in the solar spectrum, light having a wavelength of 0.3 µm through 1.1 µm has high intensity. This wavelength area matches the band gap of a semiconductor material such as Si, GaAs, GaN, etc. Therefore, a photosynthesis apparatus may be manufactured by using these semiconductor materials.

Photosynthesis Apparatus—First Embodiment

Figure 3:
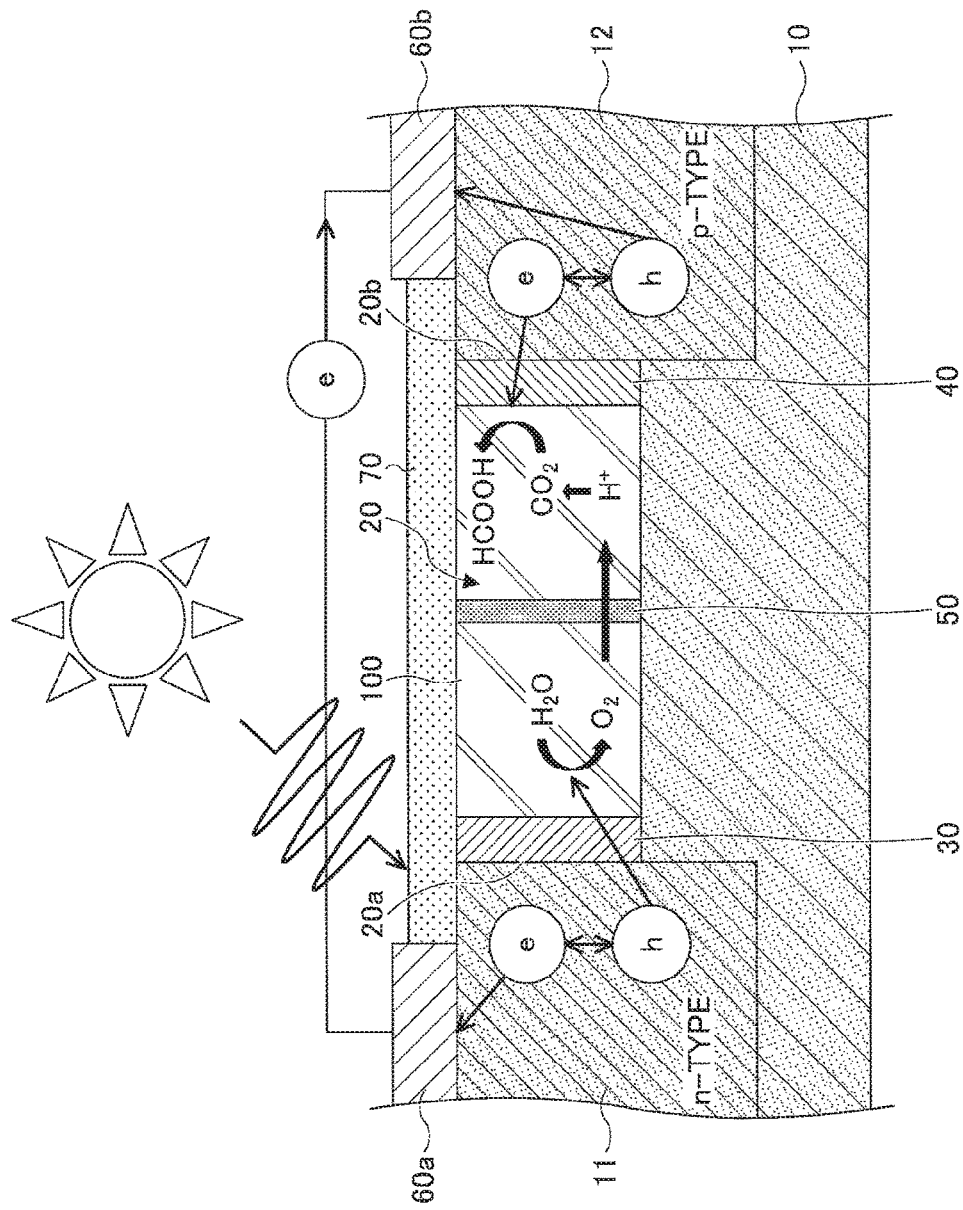
FIG. 3 is a diagram illustrating a structure of a photosynthesis apparatus according to a first embodiment of the present invention.

Next, a description is given of a photosynthesis apparatus according to the present embodiment, referring to FIG. 3. FIG. 3 is a cross-sectional view of a photosynthesis apparatus according to the present embodiment. In the photosynthesis apparatus according to the present embodiment, a groove part 20 is formed on the surface of a semiconductor substrate 10 made of Si (silicon). To the groove part 20, water 100 including carbon dioxide is supplied. The groove part 20 is a microchannel water tank that acts as a flow channel where the water 100 including carbon dioxide flows. In the present embodiment, the groove part 20 is formed by a groove having a width of approximately 95 µm and a depth of approximately 10 µm. The groove part 20 is an area surrounded by the bottom surface of the groove part 20 and side surfaces 20a and 20b on the respective sides. In the groove part 20, one of the side surfaces 20a faces the other one of the side surfaces 20b.

On one of the side surfaces 20a of the groove part 20, an n-type area 11 is formed by doping P (phosphorus), which is an impurity element that becomes an n-type, in a semiconductor material. A $H_2O$ oxidation electrode 30 is formed in contact with the n-type area 11, on one of the side surfaces 20a of the groove part 20. On the other one of the side surfaces 20b of the groove part 20, a p-type area 12 is formed by doping Al (aluminum), which is an impurity element that becomes a p-type, in a semiconductor material. A $CO_2$ reduction electrode 40 is formed in contact with the p-type area 12, on the other one of the side surfaces 20b of the groove part 20. Note that on the n-type area 11, one of wiring electrodes 60a is formed, and on the p-type area 12, the other one of the wiring electrodes 60b is formed.

A proton diaphragm 50 is a film for transmitting protons. The proton diaphragm 50 is formed at the center part of the groove part 20. The proton diaphragm 50 is formed between the $H_2O$ oxidation electrode 30 and the $CO_2$ reduction electrode 40 along the groove part 20, so as to divide the groove part 20 into two parts. Therefore, the proton diaphragm 50 is formed along the direction in which the water 100 including carbon dioxide flows. Furthermore, in the groove part 20, a surface cover film 70 is formed so as to cover the groove part 20. The water 100 including carbon dioxide supplied to the groove part 20 flows in the groove part 20 that is covered by the surface cover film 70. Note that either one of the $H_2O$ oxidation electrode 30 or the $CO_2$ reduction electrode 40 is formed so as to be irradiated by light such as sunlight.

In the photosynthesis apparatus according to the present embodiment, by radiating light such as sunlight to the $H_2O$ oxidation electrode 30, $O_2$ and $H^+$ (hydrogen ion) are generated from $H_2O$ in the $H_2O$ oxidation electrode 30. The generated $H^+$ passes through the proton diaphragm 50, and in the $CO_2$ reduction electrode 40, the $H^+$ reacts with $CO_2$, and formic acid (HCOOH) is generated.

FIG. 4 is a diagram illustrating a structure in which a plurality of the groove parts 20 for forming the photosynthesis apparatus according to the present embodiment, are formed on the surface of the three inch wafer made of Si that is the semiconductor substrate 10. In the photosynthesis apparatus illustrated in FIG. 4, the groove parts 20 formed on the surface of the semiconductor substrate 10 are formed such that the ratio of areas where the groove parts 20 are formed and the areas where the groove parts 20 are not formed, is 1:1. Note that in the photosynthesis apparatus illustrated in FIG. 4, illustrations of the n-type area 11, the p-type area 12, one of the wiring electrodes 60a, and the other one of the wiring electrodes 60b, etc., are omitted.

In the photosynthesis apparatus according to the present embodiment, light such as sunlight is radiated on the surface of the semiconductor substrate 10, and the light such as sunlight reaches the surface of the semiconductor substrate 10 by an intensity of 100% without attenuating. However, as illustrated in FIG. 4, the light reception surface of the semiconductor substrate 10 receiving light such as sunlight is approximately half of the entire surface of the semiconductor substrate 10, and therefore the light receiving rate is substantially 50%. Thus, in the photosynthesis apparatus according to the present embodiment, even when the semiconductor substrates 10, in which a plurality of photosynthesis apparatuses are formed, are densely arranged, the semiconductor substrates 10 may be arranged at high density without blocking the light such as sunlight from one another. Furthermore, the photosynthesis apparatus according to the present embodiment is thin and light, and therefore the options of installation locations are increased.

Figure 5A:
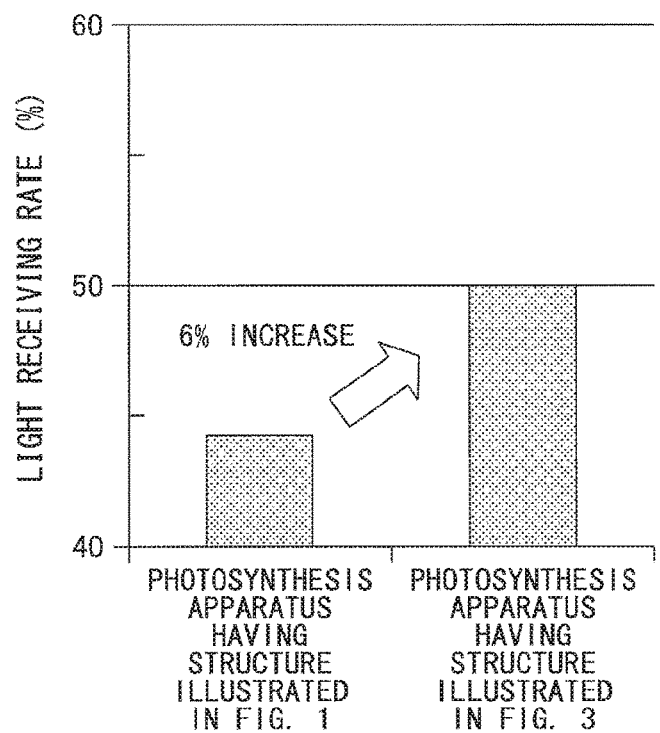
FIGS. 5A and 5B are diagrams for comparing properties of the photosynthesis apparatus illustrated in FIG. 1 and the photosynthesis apparatus according to the first embodiment of the present invention.

Referring to FIG. 5A, a description is given of the light receiving rate in the photosynthesis apparatus according to the related art having the structure illustrated in FIG. 1, and the light receiving rate in the photosynthesis apparatus according to the present embodiment having the structure illustrated in FIG. 3. As described above, in the photosynthesis apparatus having the structure illustrated in FIG. 1, when the $H_2O$ oxidation electrode 930 and the $CO_2$ reduction electrode 940 are formed on a three inch wafer, the light receiving rate is approximately 44%. On the other hand, in the photosynthesis apparatus according to the present embodiment having the structure illustrated in FIG. 3, when a plurality of groove parts 20 are formed in a three inch wafer made of Si, the light receiving rate is approximately 50%. Therefore, the photosynthesis apparatus according to the present embodiment having the structure illustrated in FIG. 3 is able to increase the light receiving rate by approximately 6%, compared to the photosynthesis apparatus according to the related art having the structure illustrated in FIG. 1.

Figure 5B:
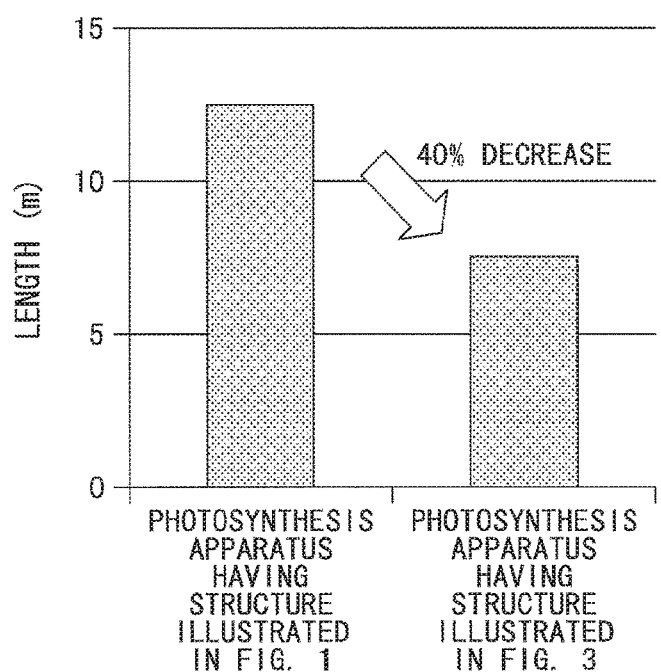

Next, referring to FIG. 5B, a description is given of the length of the photosynthesis apparatus according to the related art having the structure illustrated in FIG. 1, and the length of the photosynthesis apparatus according to the present embodiment having the structure illustrated in FIG. 3. As described above, in the photosynthesis apparatus according to the related art having the structure illustrated in FIG. 1, when a plurality of the water tanks 920 are installed, the water tanks 920 have to be spaced apart from each other by a predetermined space; otherwise, the $H_2O$ oxidation electrode 930 and the $CO_2$ reduction electrode 940 form shadows on each other, and the efficiency decreases. For example, the total length is approximately 12.5 m, when 100 water tanks 920 are arranged in a line such that the $H_2O$ oxidation electrode 930 and the $CO_2$ reduction electrode 940 do not form shadows on each other when light such as sunlight enters at an angle of 55°. On the other hand, in the photosynthesis apparatus according to the present embodiment having the structure illustrated in FIG. 3, the total length is approximately 7.5 m, when 100 three inch wafers in which the photosynthesis apparatuses are formed, are arranged in a line. Therefore, when a plurality of photosynthesis apparatuses are arranged, the photosynthesis apparatuses according to the present embodiment having the structure illustrated in FIG. 3 has a total length that is approximately 40% shorter than the total length of the photosynthesis apparatuses according to the related art having the structure illustrated in FIG. 1, and therefore it is possible to arrange the photosynthesis apparatuses at high density.

Method of Manufacturing Photosynthesis Apparatus—First Embodiment)

Next, a description is given of a method of manufacturing the photosynthesis apparatus according to the present embodiment, referring to FIGS. 6A through 16B. The photosynthesis apparatus according to the present embodiment is a p-n junction-type photosynthesis apparatus.

Figure 6A:
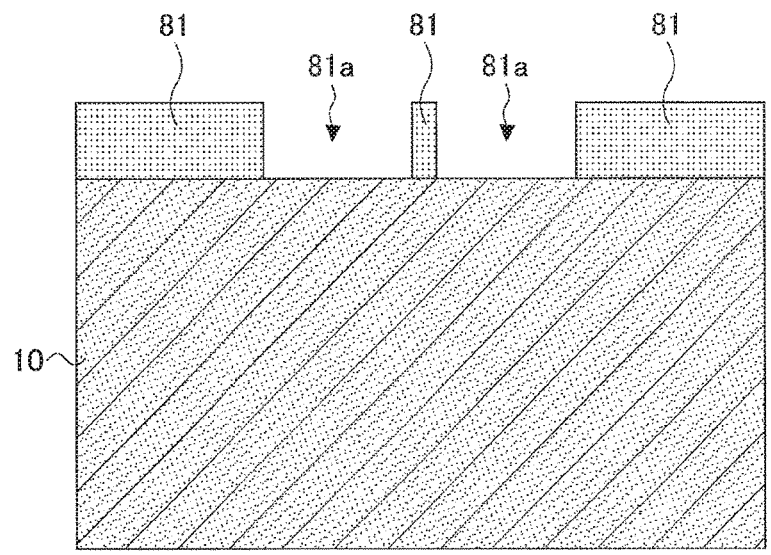
FIGS. 6A and 6B are process diagrams of a method of manufacturing the photosynthesis apparatus according to the first embodiment of the present invention (part 1)

First, as illustrated in FIG. 6A, a resist pattern 81 is formed on the semiconductor substrate 10 formed of Si. The resist pattern 81 includes an opening part 81a in the area where the groove part 20 is to be formed. Specifically, photoresist is applied on the surface of the semiconductor substrate 10, and an exposing device is used to perform exposing and developing to form the resist pattern 81 including the opening part 81a in the area where the groove part 20 is to be formed. At this time, the resist pattern 81 is also formed at the center part of the groove part 20, in the area where a proton diaphragm supporting part 51 for supporting the proton diaphragm 50 described below is to be formed.

Figure 6B:
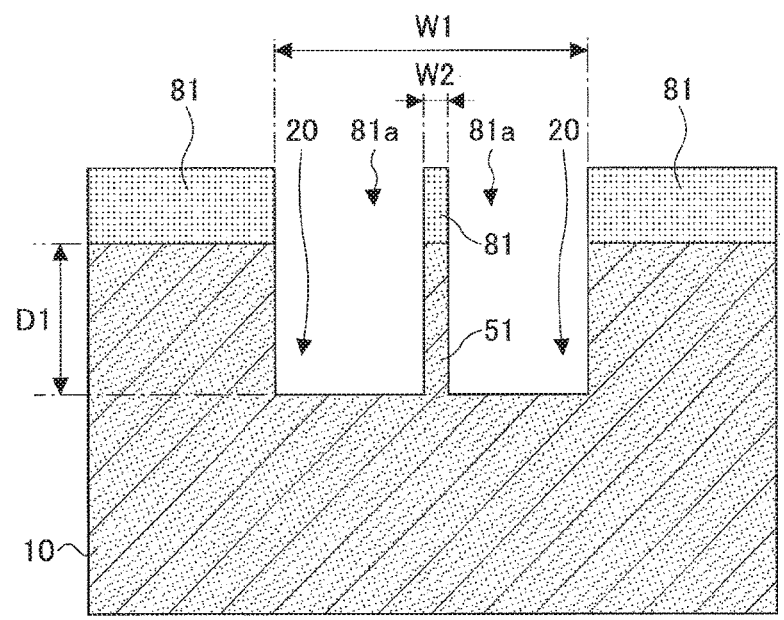

Next, as illustrated in FIG. 6B, the part of the semiconductor substrate 10 at the opening part 81a of the resist pattern 81 is removed to form the groove part 20. Specifically, the part of the semiconductor substrate 10 at the opening part 81a of the resist pattern 81 is removed by RIE (Reactive Ion Etching), etc., to form the groove part 20. At this time, at the center part of the groove part 20 formed as above, the proton diaphragm supporting part 51 is formed. The proton diaphragm supporting part 51 is for supporting the proton diaphragm 50 along the groove part 20. The groove part 20 that is formed as above have a width W1 of 91 μm and a depth D1 of 10 μm. Furthermore, the proton diaphragm supporting part 51 has a width W2 of 10 μm and is formed at the center part of the groove part 20 along the groove part 20. The proton diaphragm supporting part 51 is formed such that the length of the proton diaphragm supporting part 51 in the direction along the groove part 20 is 30 μm, and an interval between adjacent proton diaphragm supporting parts 51 is 10 μm.

Figure 7A:
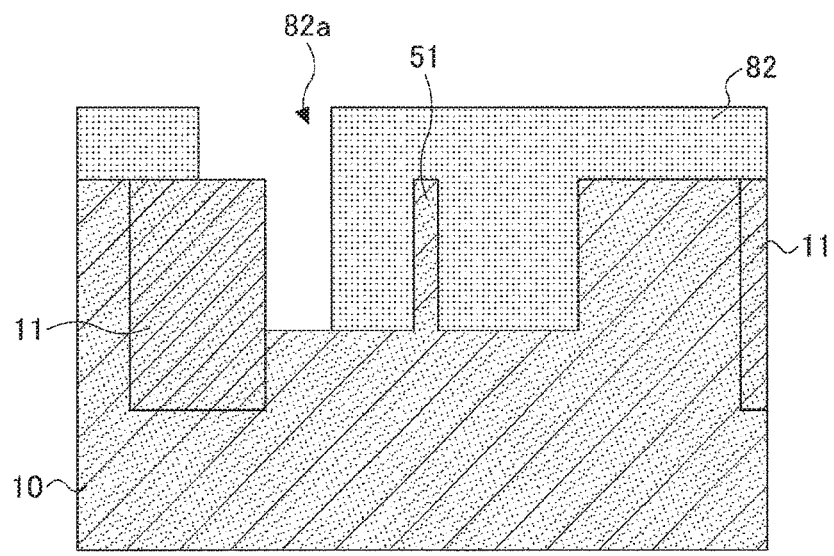
FIGS. 7A and 7B are process diagrams of a method of manufacturing the photosynthesis apparatus according to the first embodiment of the present invention (part 2)

Next, as illustrated in FIG. 7A, the resist pattern 81 is removed by an organic solvent, etc., and then a resist pattern 82 is formed on the semiconductor substrate 10. The resist pattern 82 includes an opening part 82a at the part where the n-type area 11 is to be formed. Then, P is ion-implanted on the semiconductor substrate 10 at the opening part 82a. Specifically, the resist pattern 81 is removed by an organic solvent, etc., and subsequently, photoresist is applied again. Then, an exposing device is used to perform exposing and developing to form the resist pattern 82 including the opening part 81a in the part where the n-type area 11 is to be formed, in the semiconductor substrate 10. Subsequently, P, which is an impurity element that becomes an n-type, is ion-implanted in the semiconductor substrate 10 at the opening part 82a of the resist pattern 82. In the present embodiment, when ion-implanting P in the semiconductor substrate 10, P is ion-implanted from an oblique direction, such that the n-type area 11 is formed on the entirety of one of the side surfaces 20a of the groove part 20.

Figure 7B:
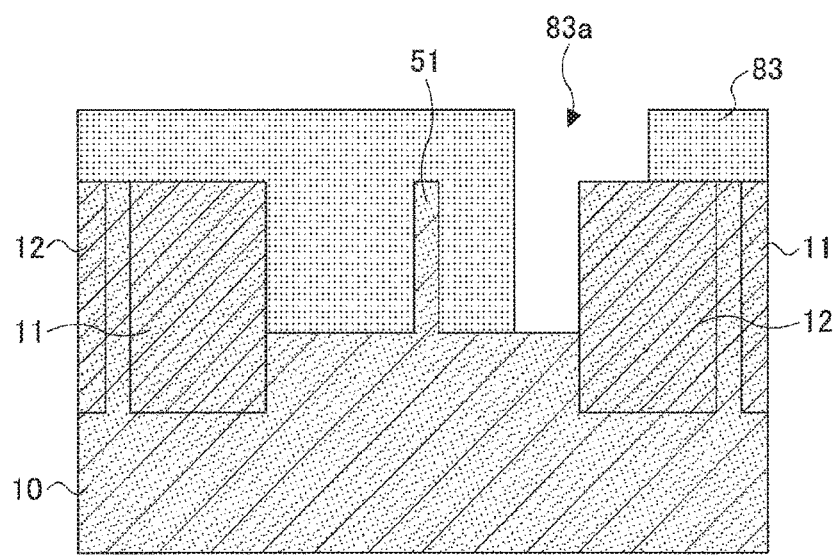

Next, as illustrated in FIG. 7B, the resist pattern 82 is removed by an organic solvent, etc., and then a resist pattern 83 is formed on the semiconductor substrate 10. The resist pattern 83 includes an opening part 83a at the part where the p-type area 12 is to be formed. Then, Al is ion-implanted on the semiconductor substrate 10 at the opening part 83a. Specifically, the resist pattern 82 is removed by an organic solvent, etc., and subsequently, photoresist is applied again. Then, an exposing device is used to perform exposing and developing to form the resist pattern 83 including the opening part 83a in the part where the p-type area 12 is to be formed, in the semiconductor substrate 10. Subsequently, Al, which is an impurity element that becomes a p-type, is ion-implanted in the semiconductor substrate 10 at the opening part 83a of the resist pattern 83. In the present embodiment, when ion-implanting Al in the semiconductor substrate 10, Al is ion-implanted from an oblique direction, such that the p-type area 12 is formed on the entirety of the other one of the side surfaces 20b of the groove part 20.

Figure 8A:
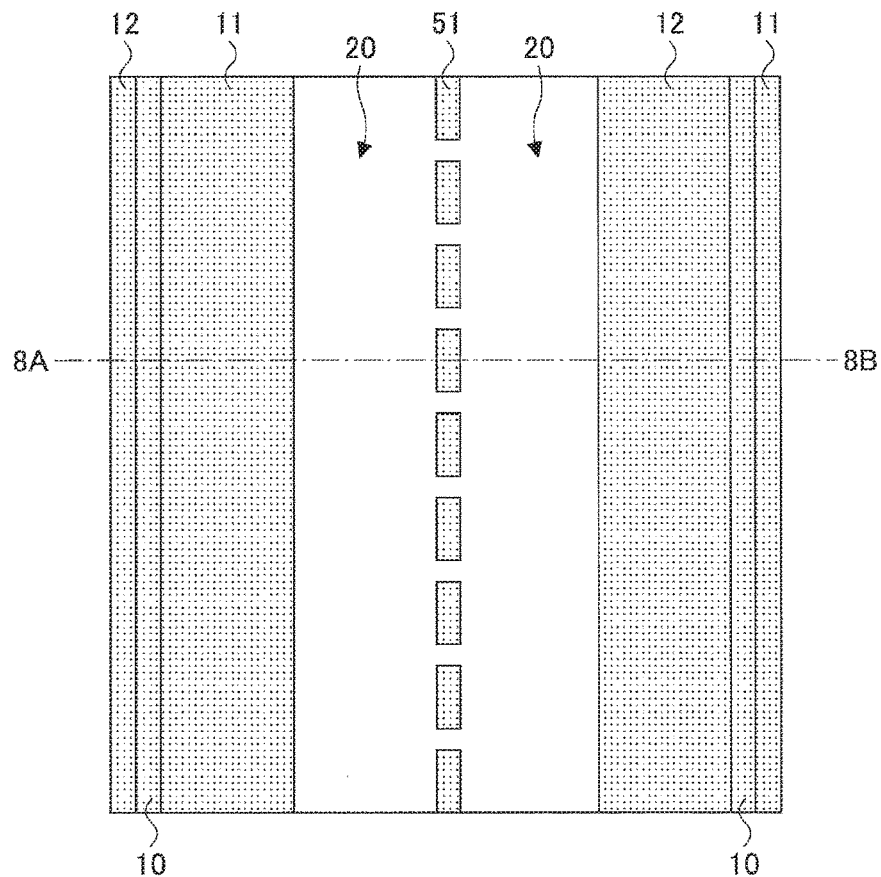
FIGS. 8A and 8B are process diagrams of a method of manufacturing the photosynthesis apparatus according to the first embodiment of the present invention (part 3)
Figure 8B:
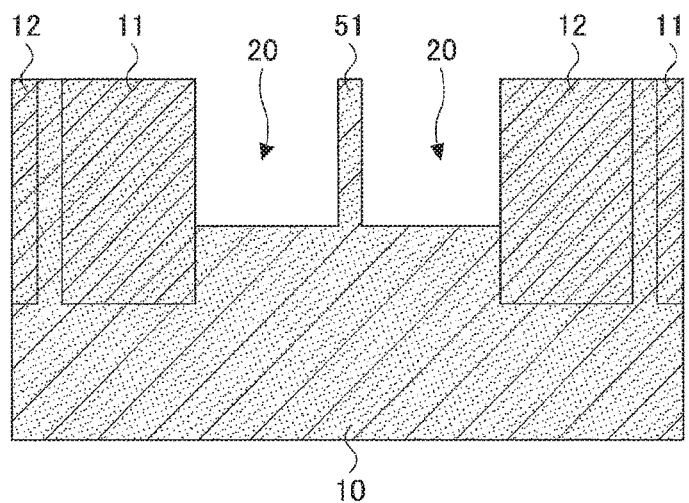

Next, as illustrated in FIGS. 8A and 8B, the resist pattern 83 is removed and activation annealing is performed to activate the n-type area 11 and the p-type area 12. Accordingly, the groove part 20 is formed in the semiconductor substrate 10, the n-type area 11 is formed on one of the side surfaces 20a, and the p-type area 12 is formed on the other one of the side surfaces 20b. Furthermore, at the center part of the groove part 20, the proton diaphragm supporting part 51 is formed along the groove part 20. Note that FIG. 8A is a top view of the photosynthesis apparatus during this process, and FIG. 8B is a cross-sectional view cut along a dashed-dotted line 8A-8B in FIG. 8A.

Figure 9A:
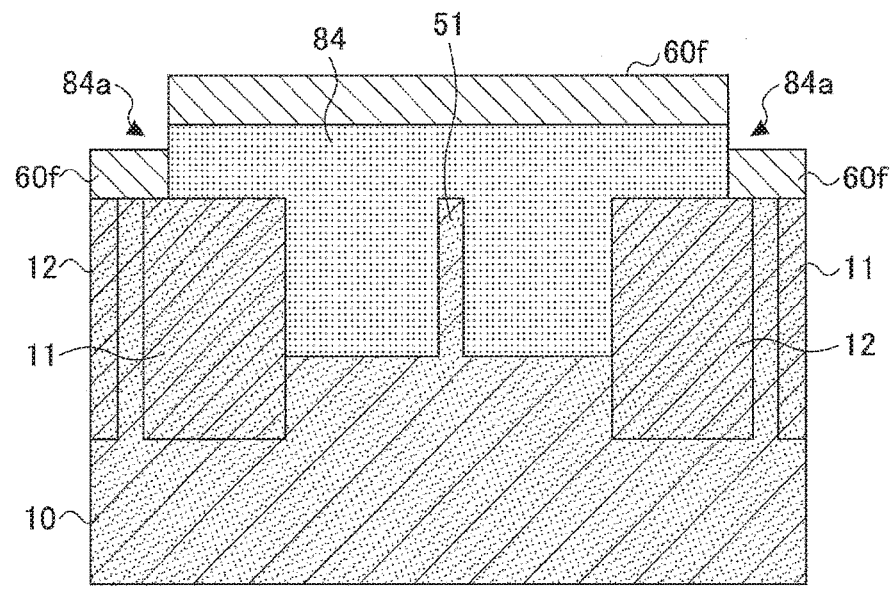
FIGS. 9A and 9B are process diagrams of a method of manufacturing the photosynthesis apparatus according to the first embodiment of the present invention (part 4)

Next, as illustrated in FIG. 9A, a resist pattern 84 is formed. The resist pattern 84 includes opening parts 84a in areas where the wiring electrodes 60a and 60b are to be formed. Subsequently, an Al film 60f is formed by vacuum vapor deposition. Specifically, photoresist is applied on the surface on which the groove part 20 is formed, and an exposing device is used to perform exposing and developing to form the resist pattern 84 including the opening parts 84a in areas where the wiring electrodes 60a and 60b are to be formed. Subsequently, the Al film 60f is formed by vacuum vapor deposition.

Figure 9B:
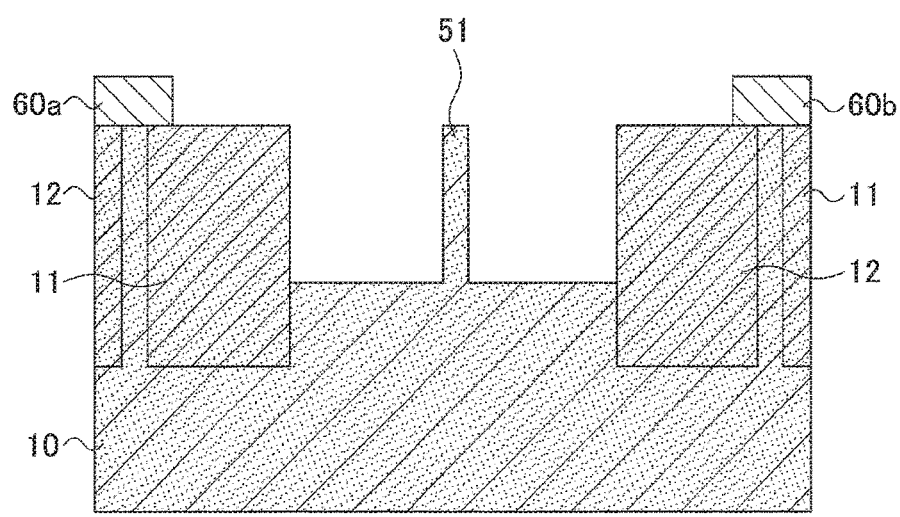

Next, as illustrated in FIG. 9B, the Al film 60f formed on the resist pattern 84 is removed by being lifted off, together with the resist pattern 84, by immersion in an organic solvent, etc. Accordingly, the wiring electrodes 60a and 60b are formed by the Al film 60f remaining at the opening parts 84a in the resist pattern 84. The wiring electrodes 60a and 60b may be integrally formed on the n-type area 11 and the p-type area 12 that are adjacent to each other so as to connect the n-type area 11 and the p-type area 12 that are adjacent to each other.

Figure 10A:
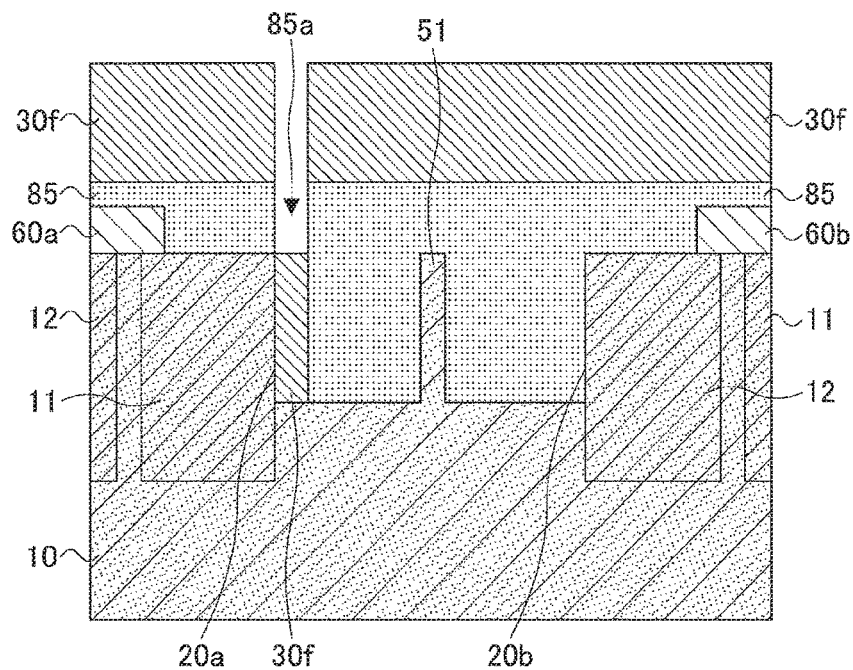
FIGS. 10A and 10B are process diagrams of a method of manufacturing the photosynthesis apparatus according to the first embodiment of the present invention (part 5)

Next, as illustrated in FIG. 10A, a resist pattern 85 is formed. The resist pattern 85 includes an opening part 85a in the area where the $H_2O$ oxidation electrode 30 is to be formed. Subsequently, a $TiO_2$/Pt film 30f is formed by sputtering. Specifically, photoresist is applied on the surface on which the groove part 20 is formed, and an exposing device is used to perform exposing and developing to form the resist pattern 85 including the opening part 85a in the area where the $H_2O$ oxidation electrode 30 is to be formed. Subsequently, the $TiO_2$/Pt film 30f is formed by sputtering.

Figure 10B:
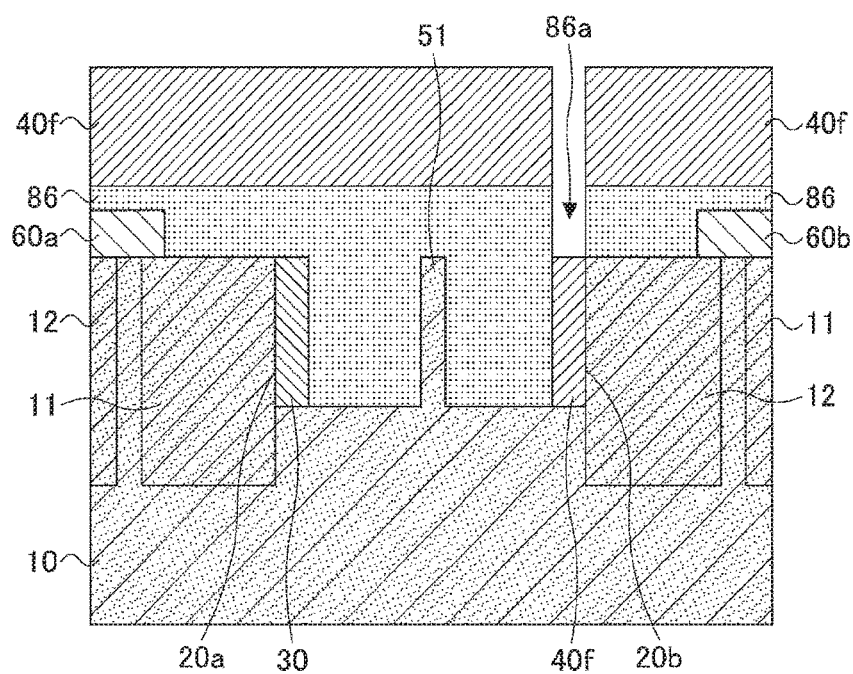

Next, as illustrated in FIG. 10B, the $H_2O$ oxidation electrode 30 is formed by the $TiO_2$/Pt film 30f by a lift-off process. Then, a resist pattern 86 is formed. The resist pattern 86 includes an opening part 86a in the area where the $CO_2$ reduction electrode 40 is to be formed. Subsequently, a Cu film 40f is formed by sputtering. Specifically, the photosynthesis apparatus on which the $TiO_2$/Pt film 30f is formed is immersed in an organic solvent, etc., to remove the $TiO_2$/Pt film 30f formed on the resist pattern 85 together with the resist pattern 85, by a lift-off process. Accordingly, the $H_2O$ oxidation electrode 30 is formed by the remaining $TiO_2$/Pt film 30f. The $H_2O$ oxidation electrode 30 formed in this way is formed in contact with the n-type area 11 on one of the side surfaces 20a of the groove part 20. Subsequently, photoresist is applied again on the surface on which the groove part 20 is formed, and an exposing device is used to perform exposing and developing to form the resist pattern 86 including the opening part 86a in the area where the $CO_2$ reduction electrode 40 is to be formed. Subsequently, the Cu film 40f is formed by sputtering.

Figure 11A:
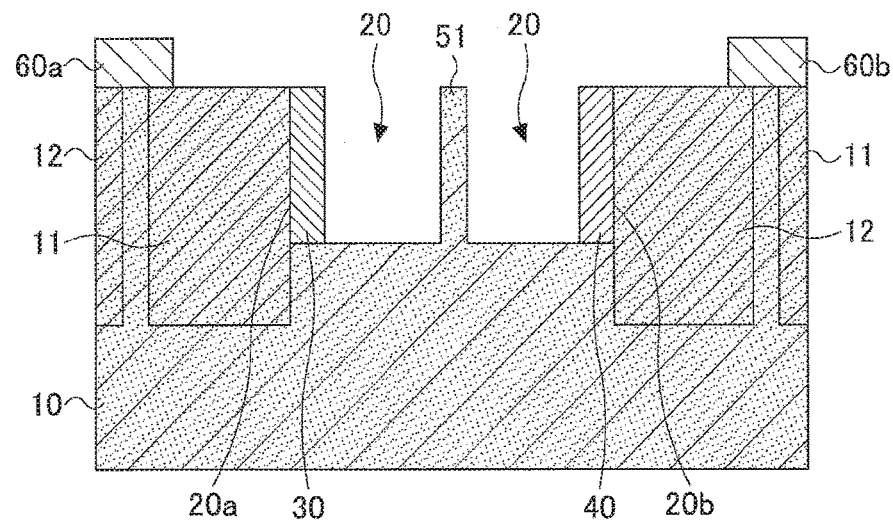
FIGS. 11A and 11B are process diagrams of a method of manufacturing the photosynthesis apparatus according to the first embodiment of the present invention (part 6)

Next, as illustrated in FIG. 11A, the Cu film 40f formed on the resist pattern 86 is removed by being lifted off, together with the resist pattern 86, by immersion in an organic solvent, etc. Accordingly, the $CO_2$ reduction electrode 40 is formed by the remaining Cu film 40f. The $CO_2$ reduction electrode 40 formed in this way is formed in contact with the p-type area 12 on the other one of the side surfaces 20b of the groove part 20.

Figure 11B:
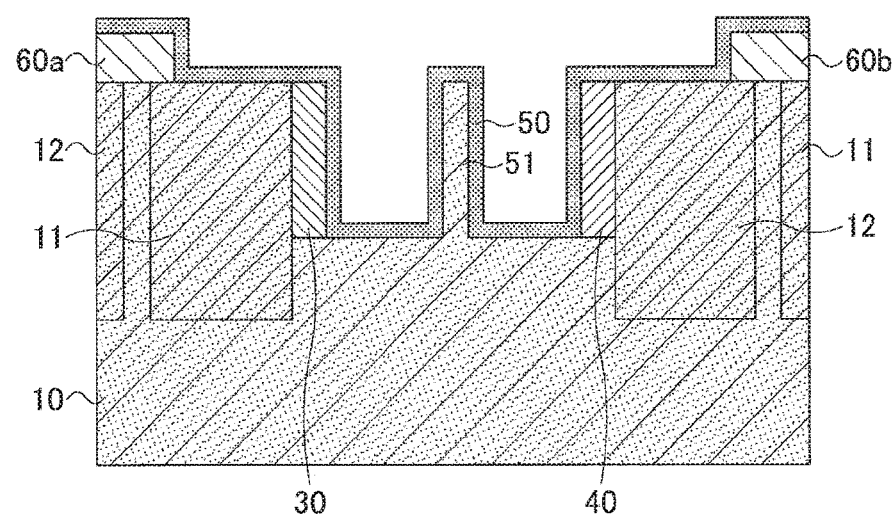

Next, as illustrated in FIG. 11B, the proton diaphragm 50 is formed by repeatedly applying and curing a material by spray coating, etc., on the surface on which the groove part 20 is formed. By forming the proton diaphragm 50 in this way, the space between adjacent proton diaphragm supporting parts 51 is filled by the proton diaphragm 50. As the material used for forming the proton diaphragm 50, $SiO_2$—$P_2O_5$, and Nafion117 (manufactured by DuPont), etc., may be used. Furthermore, the proton diaphragm 50 may be formed by a method other than spray coating, such as CVD (chemical vapor deposition).

Figure 12A:
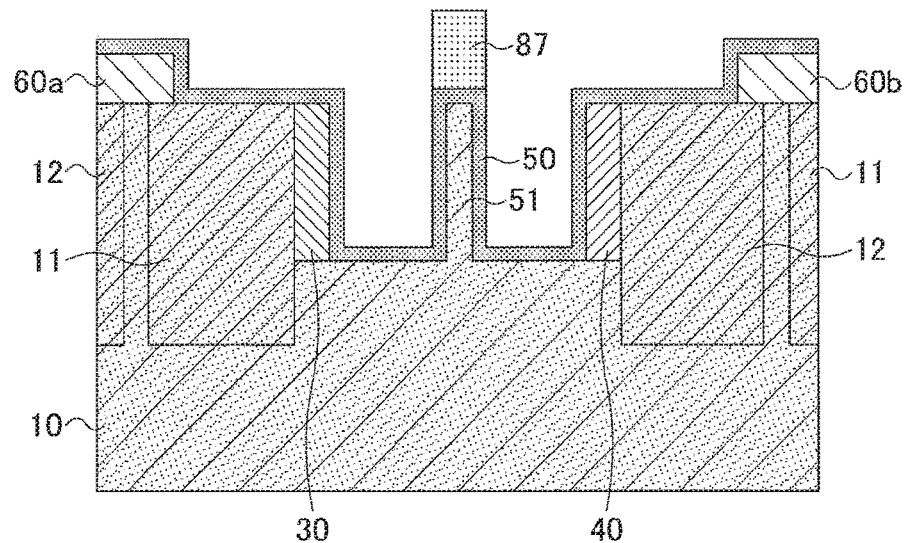
FIGS. 12A and 12B are process diagrams of a method of manufacturing the photosynthesis apparatus according to the first embodiment of the present invention (part 7)

Next, as illustrated in FIG. 12A, a resist pattern 87 is formed on the proton diaphragm supporting part 51 and on the proton diaphragm 50 between the proton diaphragm supporting part 51 and the proton diaphragm supporting part 51. Specifically, photoresist is applied on the proton diaphragm 50 and an exposing device is used to perform exposing and developing. Accordingly, the resist pattern 87 is formed on the proton diaphragm supporting part 51 and on the proton diaphragm 50 between the proton diaphragm supporting part 51 and the proton diaphragm supporting part 51.

Figure 12B:
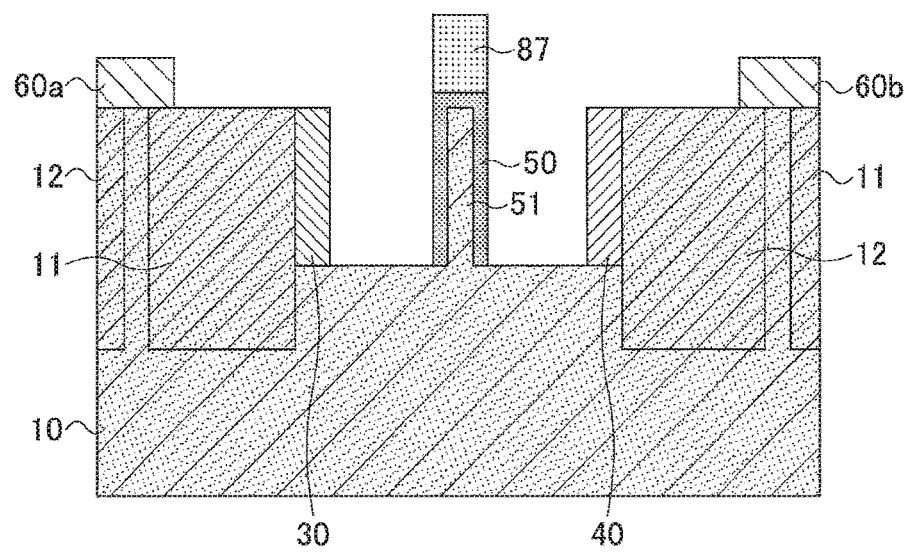

Next, as illustrated in FIG. 12B, the proton diaphragm 50 in the area where the resist pattern 87 is not formed is removed by RIE, etc. Accordingly, the surfaces of the $H_2O$ oxidation electrode 30 and the $CO_2$ reduction electrode 40 are exposed.

Figure 13A:
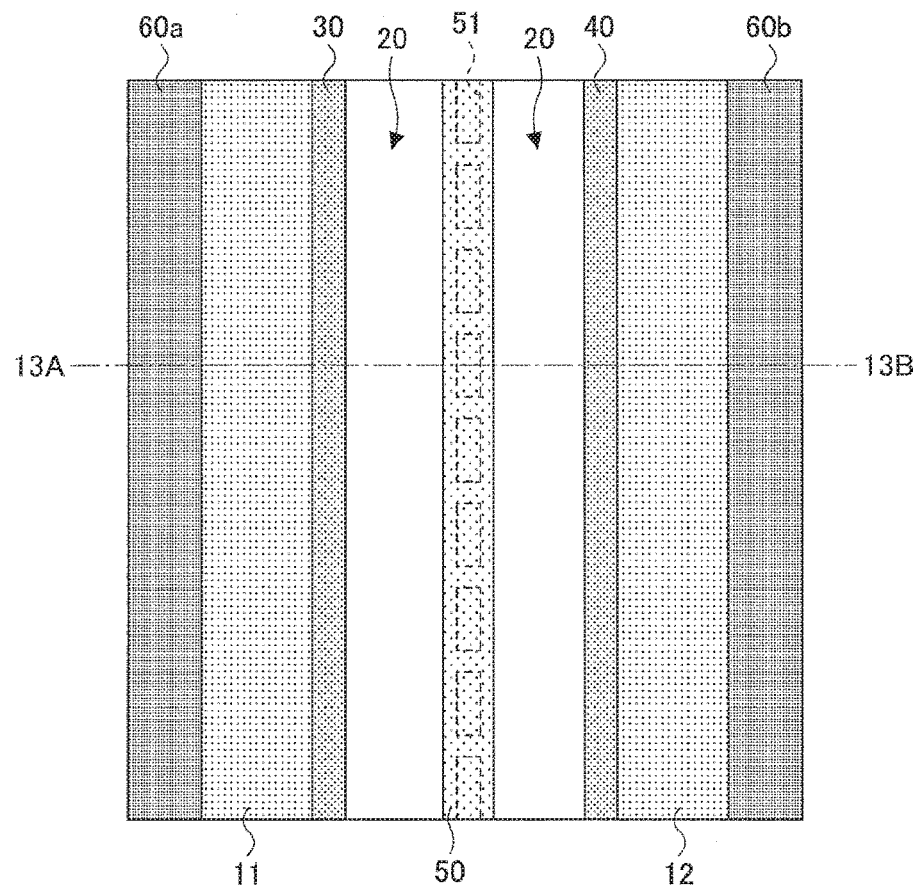
FIGS. 13A and 13B are process diagrams of a method of manufacturing the photosynthesis apparatus according to the first embodiment of the present invention (part 8)
Figure 13B:
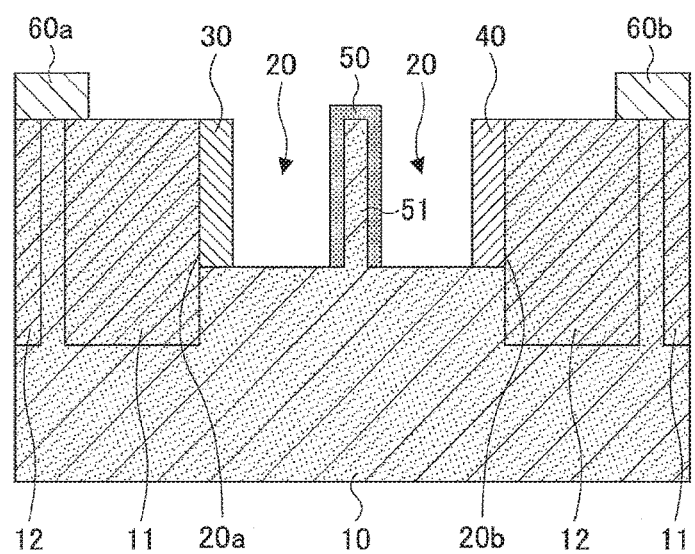

Next, as illustrated in FIGS. 13A and 13B, the resist pattern 87 is removed by an organic solvent, etc. Accordingly, the proton diaphragm 50 is formed between proton diaphragm supporting parts 51 and around the proton diaphragm supporting part 51. Note that FIG. 13A is a top view of the photosynthesis apparatus during this process, and FIG. 13B is a cross-sectional view cut along a dashed-dotted line 13A-13B in FIG. 13A.

Figure 14A:
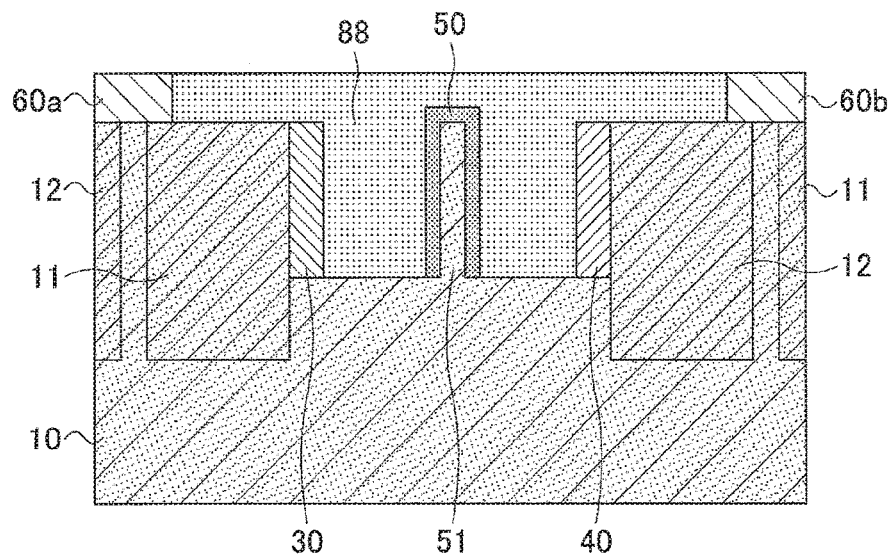
FIGS. 14A and 14B are process diagrams of a method of manufacturing the photosynthesis apparatus according to the first embodiment of the present invention (part 9)

Next, as illustrated in FIG. 14A, a soluble polymer 88 is applied by spin coating, etc., to fill the groove part 20 with the soluble polymer 88. As the soluble polymer 88, PMGI (Polymethylglutarimide), PVA (polyvinyl alcohol), etc., may be used.

Figure 14B:
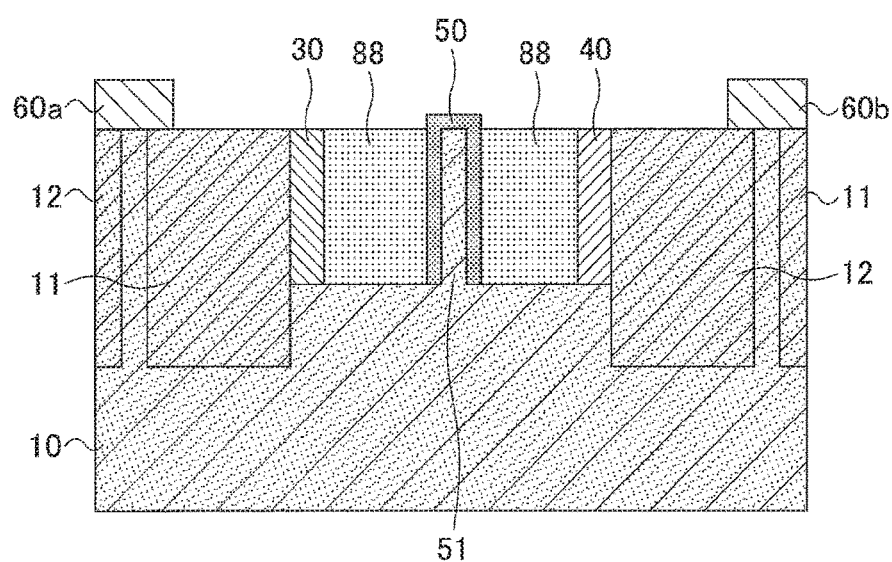

Next, as illustrated in FIG. 14B, etch back is performed by oxygen asking until the surface of the semiconductor substrate 10 is exposed, to remove part of the soluble polymer 88.

Figure 15A:
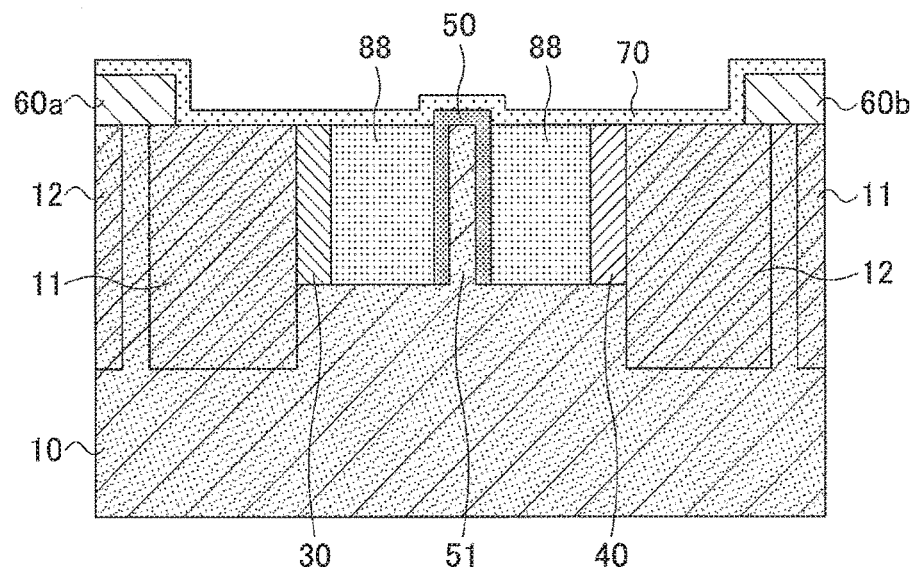
FIGS. 15A and 15B are process diagrams of a method of manufacturing the photosynthesis apparatus according to the first embodiment of the present invention (part 10)

Next, as illustrated in FIG. 15A, the surface cover film 70 is formed on the semiconductor substrate 10 and the soluble polymer 88. The surface cover film 70 is formed of a $SiO_2$ film, a SiN film, and a silica system porous film. The surface cover film 70 is formed by repeatedly applying and curing the material by spin coating, or by CVD.

Figure 15B:
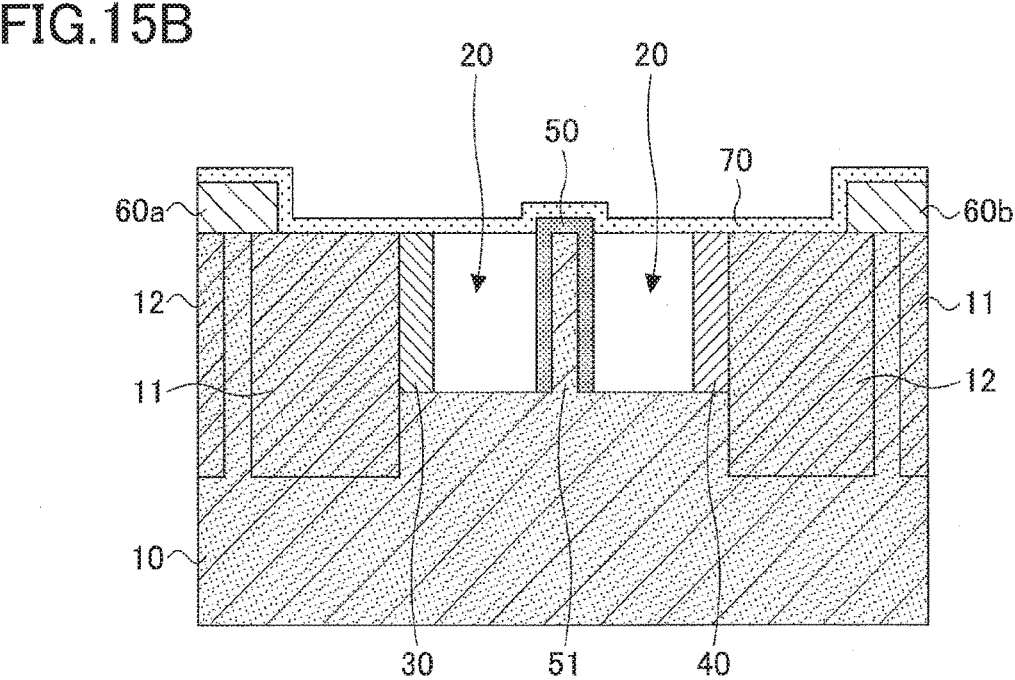

Next, as illustrated in FIG. 15B, the remaining soluble polymer 88 is removed by dissolving the soluble polymer 88. Specifically, when the soluble polymer 88 is formed by PMGI, the soluble polymer 88 is dissolved by an organic solvent such as pyrrolidone, and when the soluble polymer 88 is formed by PVA, the soluble polymer 88 is dissolved and removed by warm water. Accordingly, the photosynthesis apparatus according to the present embodiment is manufactured.

Figure 16A:
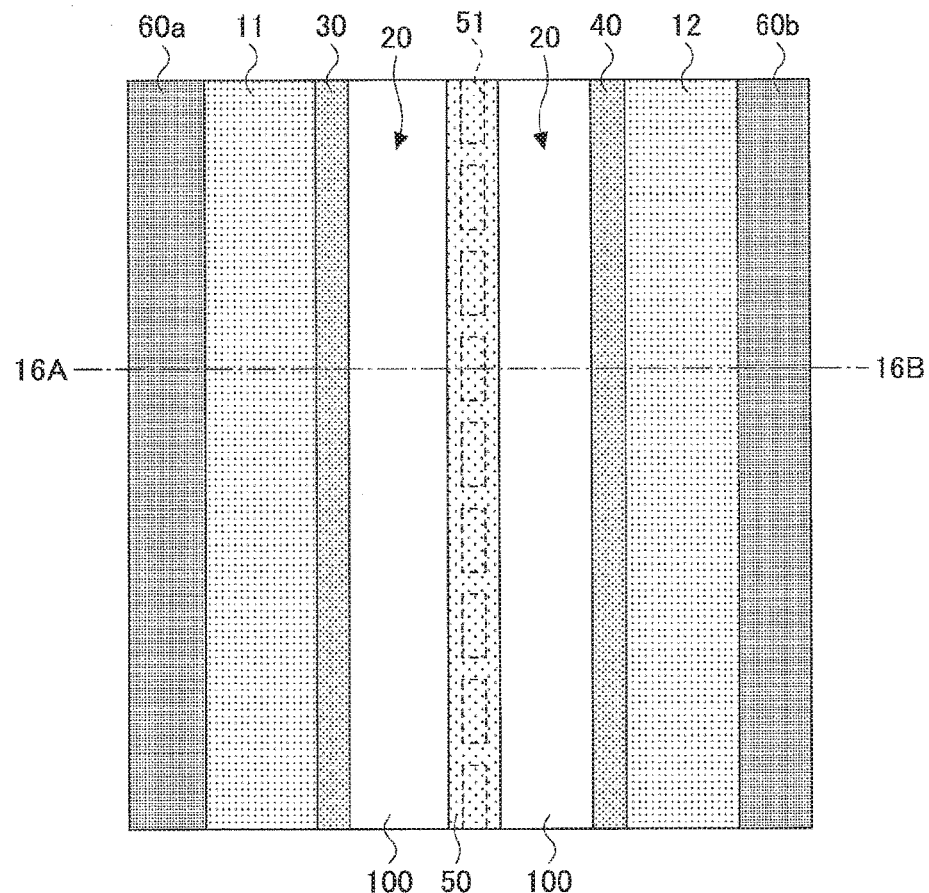
FIGS. 16A and 16B are process diagrams of a method of manufacturing the photosynthesis apparatus according to the first embodiment of the present invention (part 11)
Figure 16B:
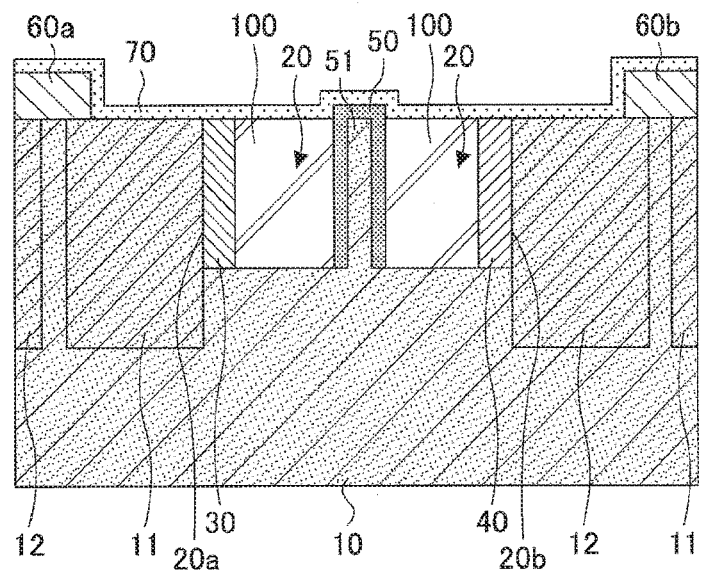

As illustrated in FIGS. 16A and 16B, the photosynthesis apparatus according to the present embodiment manufactured as described above functions as a photosynthesis apparatus by supplying the water 100 including carbon dioxide to the groove part 20 formed in the semiconductor substrate 10, so that the water 100 flows in the groove part 20, and radiating light such as sunlight. Note that FIG. 16A is a top view of the photosynthesis apparatus according to the present embodiment viewed through the surface cover film 70, and FIG. 16B is a cross-sectional view cut along a dashed-dotted line 16A-16B in FIG. 16A.

Second Embodiment

Next, a description is given of a second embodiment. Incidentally, in the photosynthesis apparatus according to the first embodiment uses Si as the semiconductor material; however, Si is an indirect transition semiconductor similar to a solar cell, and thus has a low solar energy conversion efficiency. On the other hand, a direct transition semiconductor such as GaAs, InP, GaN, etc., has a higher solar energy conversion efficiency than Si. When Si is used as a semiconductor material, ion implantation is performed when forming the p-n junction. However, when GaAs, InP, GaN, etc., is used as a semiconductor material, the p-n junction is formed by regrowth.

Method of Manufacturing Photosynthesis Apparatus—Second Embodiment

Next, a description is given of a method of manufacturing the photosynthesis apparatus according to the present embodiment, referring to FIGS. 17A through 24B. The photosynthesis apparatus according to the present embodiment is a p-n junction-type photosynthesis apparatus, for example, using GaN as the semiconductor material.

Figure 17A:
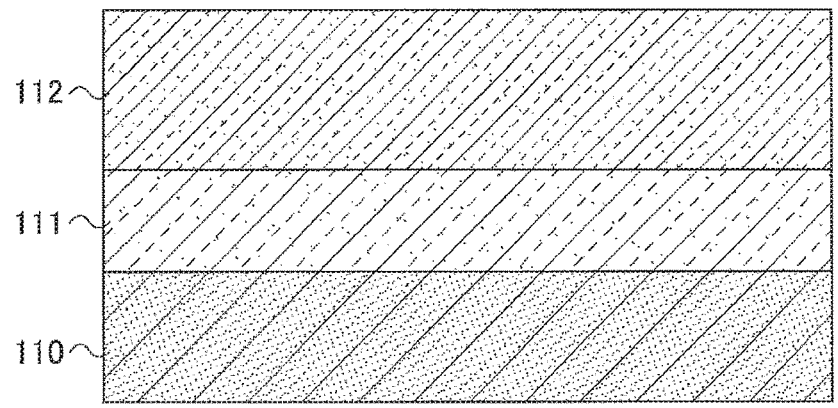
FIGS. 17A and 17B are process diagrams of a method of manufacturing the photosynthesis apparatus according to a second embodiment of the present invention (part 1)

First, as illustrated in FIG. 17A, on a semiconductor substrate 110 formed of Si, a GaN layer 111 and a p-GaN layer 112 are sequentially deposited by epitaxial growth. Examples of the method of epitaxial growth are MOCVD (Metal Organic Chemical Vapor Deposition) or PAMBE (Plasma assisted molecular beam epitaxy), etc. In the present embodiment, the GaN layer 111 has a thickness of approximately 1 μm and the p-GaN layer 112 has a thickness of approximately 10 μm.

Figure 17B:
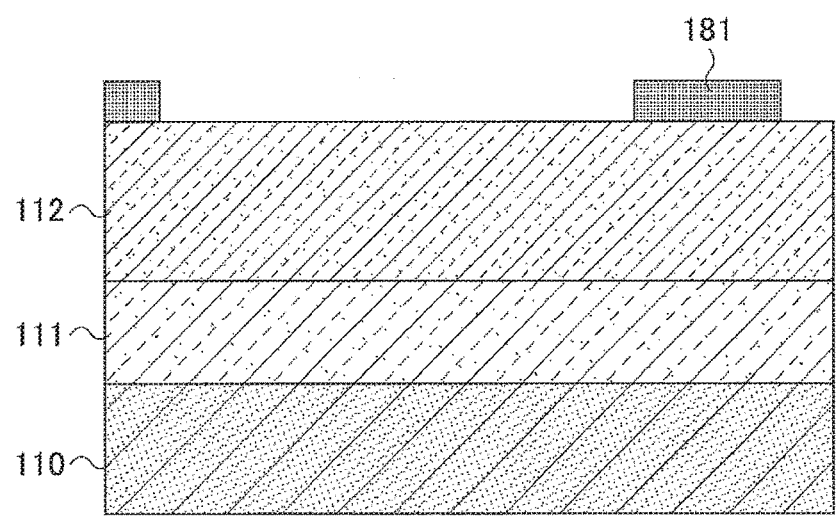

Next, as illustrated in FIG. 17B, a hard mask 181 is formed on the p-GaN layer 112. The hard mask 181 is formed of SiN, and is formed on the area where the p-GaN layer 112 remains as a p-GaN area. Specifically, a SiN film is formed by plasma CVD on the p-GaN layer 112, photoresist is applied on the formed SiN film, and an exposing device is used to perform exposing and developing. Accordingly, a resist pattern (not illustrated) is formed in the area where the hard mask 181 is to be formed. Subsequently, the SiN film in the area where the resist pattern (not illustrated) is not formed is removed by dry etching, to form the hard mask 181 made of SiN. Subsequently, the resist pattern (not illustrated) is removed by an organic solvent, etc.

Figure 18A:
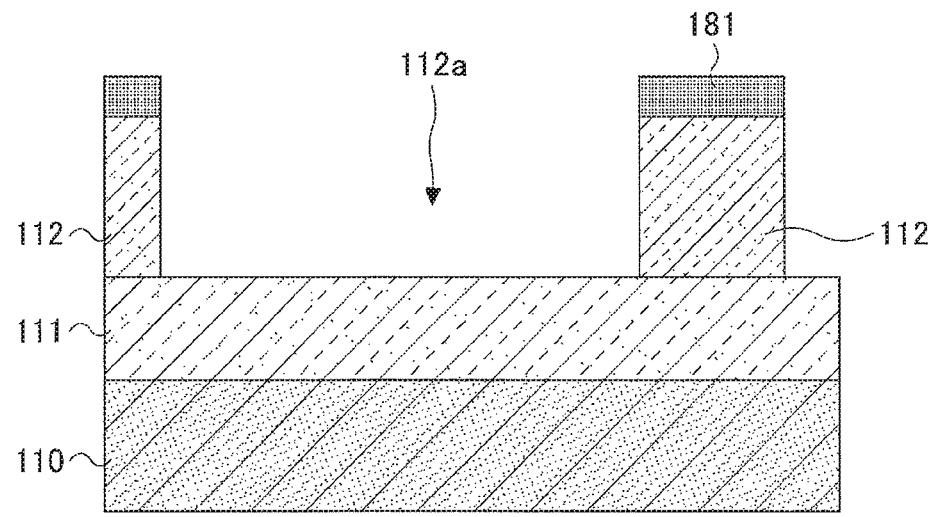
FIGS. 18A and 18B are process diagrams of a method of manufacturing the photosynthesis apparatus according to the second embodiment of the present invention (part 2)

Next, as illustrated in FIG. 18A, the p-GaN layer 112 in the area where the hard mask 181 is not formed is removed by RIE, etc., and the surface of the GaN layer 111 is exposed, to form an opening part 112a.

Figure 18B:
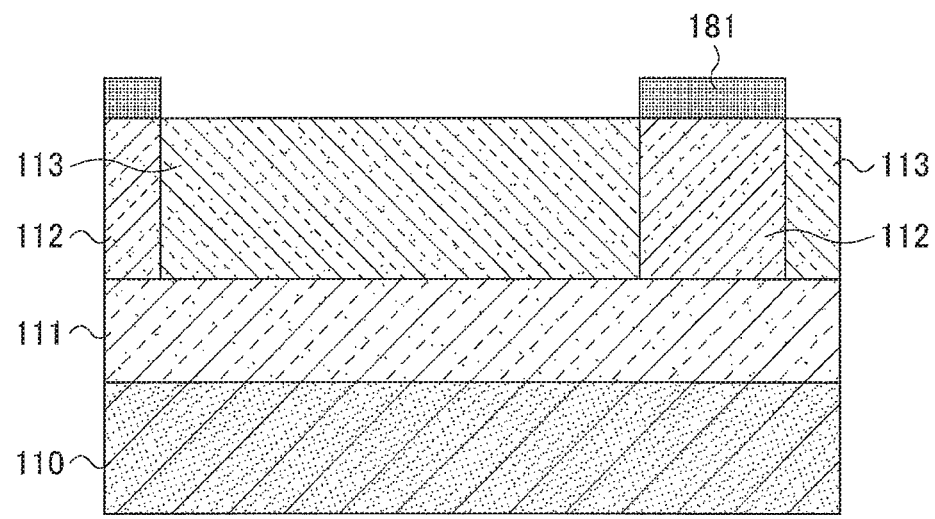

Next, as illustrated in FIG. 18B, n-GaN is epitaxially grown on the GaN layer 111 in the opening part 112a of the p-GaN layer 112, to form an n-GaN layer 113. Examples of the method of epitaxial growth for forming the n-GaN layer 113, are MOCVD or PAMBE, etc. Note that the hard mask 181 formed of SiN is amorphous, and therefore n-GaN will not be deposited on the hard mask 181 formed of SiN.

Figure 19A:
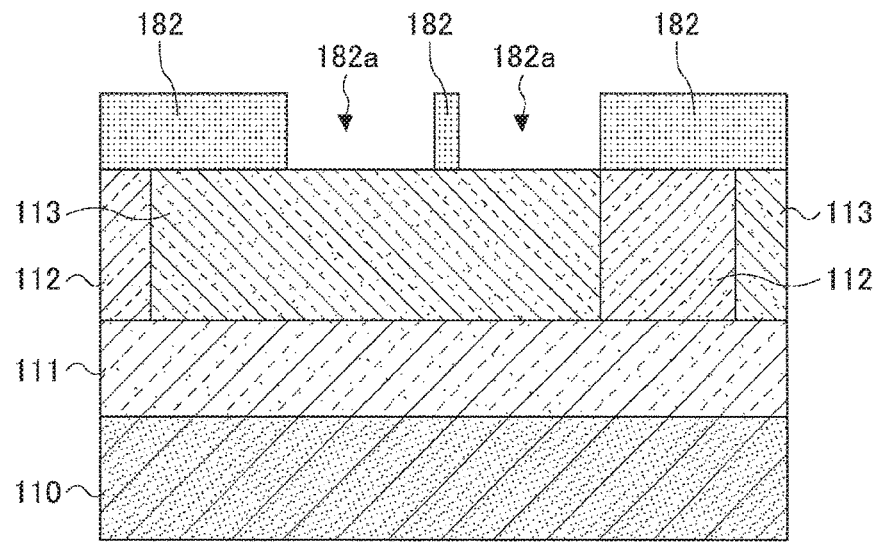
FIGS. 19A and 19B are process diagrams of a method of manufacturing the photosynthesis apparatus according to the second embodiment of the present invention (part 3)

Next, as illustrated in FIG. 19A, after removing the hard mask 181, a resist pattern 182 including an opening part 182a in the area where a groove part 120 is to be formed, is formed on the p-GaN layer 112 and the n-GaN layer 113. Specifically, the hard mask 181 formed of SiN is removed by wet etching with the use of hydrofluoric acid, etc., and then photoresist is applied on the p-GaN layer 112 and the n-GaN layer 113, and an exposing device is used to perform exposing and developing. Accordingly, the resist pattern 182 including the opening part 182a in the area where the groove part 120 is to be formed, is formed. At this time, the resist pattern 182 is also formed at the center part of the groove part 120, in the area where a proton diaphragm supporting part 151, which is for supporting the proton diaphragm 150 described below, is to be formed.

Figure 19B:
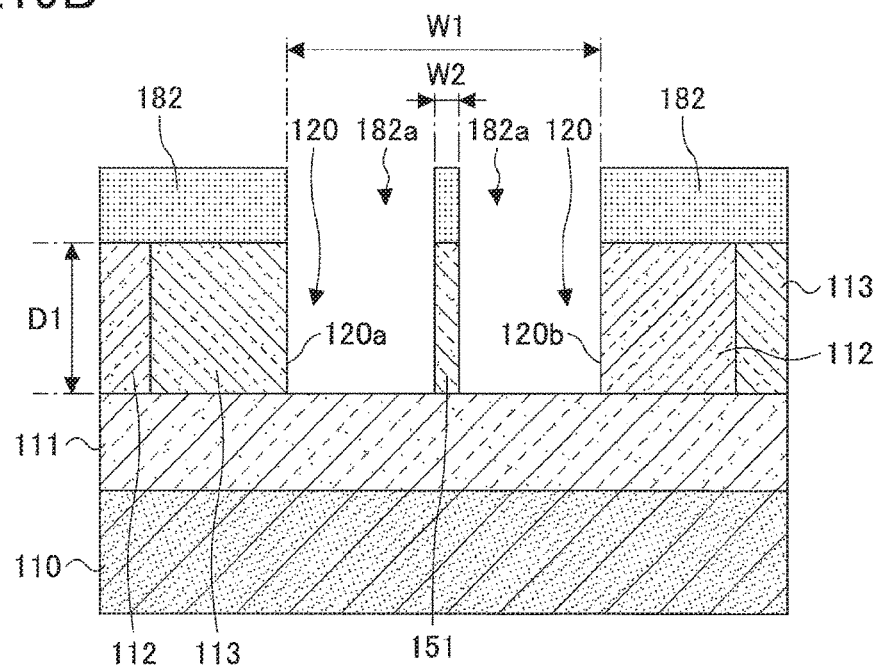

Next, as illustrated in FIG. 19B, the n-GaN layer 113 in the opening part 182a of the resist pattern 182 is removed and the surface of the GaN layer 111 is exposed, to form the groove part 120. Specifically, the n-GaN layer 113 in the opening part 182a of the resist pattern 182 is removed by dry etching such as RIE, etc., to form the groove part 120. Furthermore, at the center part of the groove part 120 as described above, the proton diaphragm supporting part 151 for supporting the proton diaphragm 150 is formed along the groove part 120. The groove part 120 that is formed in this way has a width W1 of 95 μm and a depth D1 of 10 μm. Furthermore, the proton diaphragm supporting part 151 is formed at the center of the groove part 120, to have a width W2 of 10 μm, along the groove part 120. The proton diaphragm supporting part 151 is formed such that the length of the proton diaphragm supporting part 151 in the direction along the groove part 120 is 30 μm, and an interval between adjacent proton diaphragm supporting parts 151 is 10 μm. Note that in the present embodiment, an n-type area is formed by the n-GaN layer 113 remaining on one of side surfaces 120a of the groove part 120, and a p-type area is formed by the p-GaN layer 112 remaining on another one of side surfaces 120b of the groove part 120.

Figure 20A:
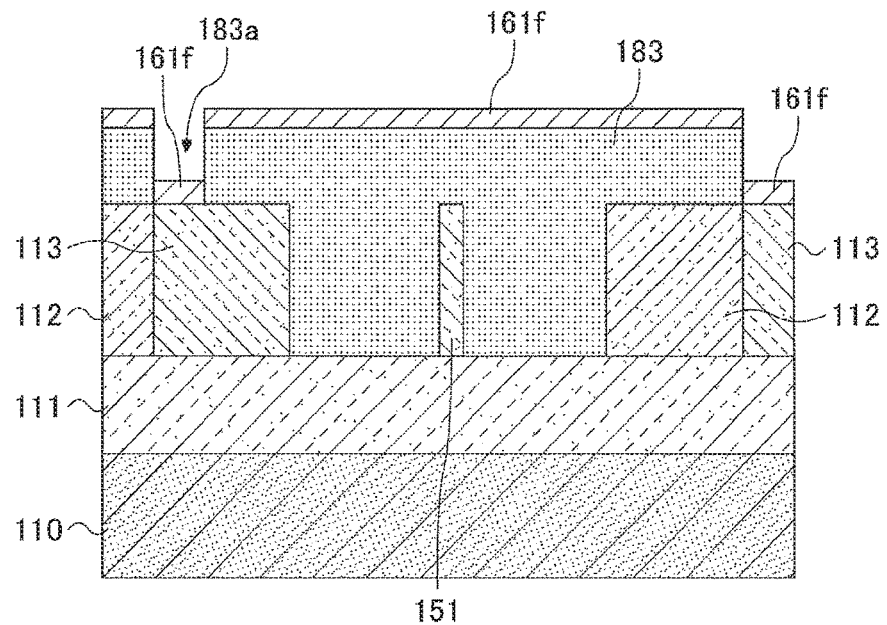
FIGS. 20A and 20B are process diagrams of a method of manufacturing the photosynthesis apparatus according to the second embodiment of the present invention (part 4)

Next, as illustrated in FIG. 20A, the resist pattern 182 is removed by an organic solvent, etc., and then a resist pattern 183 including an opening part 183a in the area where a first wiring electrode 161 is to be formed, is formed, to form a Ti/Al film 161f. Specifically, the resist pattern 182 is removed by an organic solvent, etc., and subsequently, photoresist is applied again. Then, an exposing device is used to perform exposing and developing to form a resist pattern 183 including an opening part 183a in the area where the first wiring electrode 161 is to be formed. Subsequently, the Ti/Al film 161f for forming the first wiring electrode 161, is formed by vacuum vapor deposition.

Figure 20B:
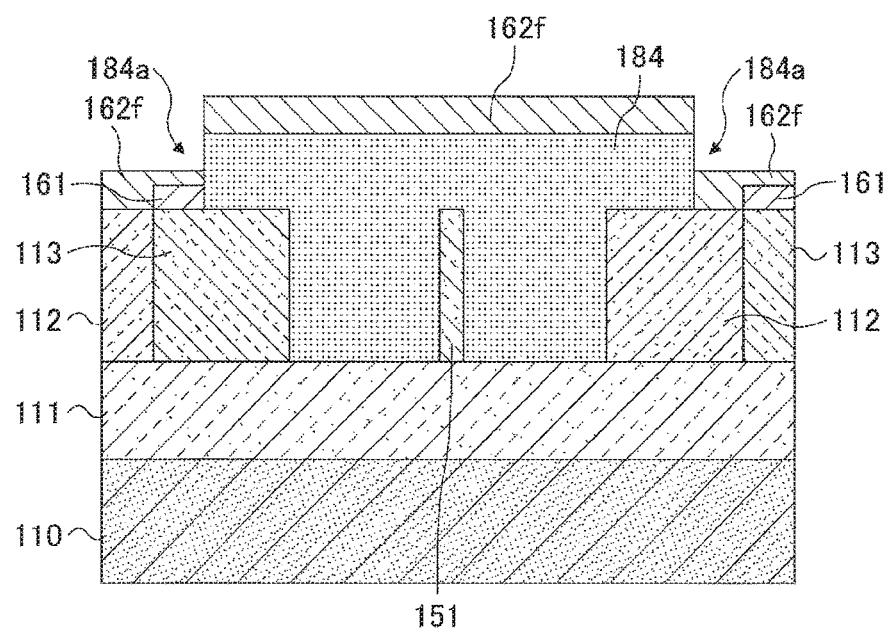

Next, as illustrated in FIG. 20B, the first wiring electrode 161 is formed by the Ti/Al film 161f, and then a resist pattern 184 including an opening part 184a in the area where a second wiring electrode 162 is to be formed, is formed to form a Ni/Au film 162f. Specifically, after forming the Ti/Al film 161f, the photosynthesis apparatus is immersed in an organic solvent, etc., to remove the Ti/Al film 161f formed on the resist pattern 183 together with the resist pattern 183, by a lift-off process. Accordingly, the first wiring electrode 161 is formed by the remaining Ti/Al film 161f. The first wiring electrode 161 formed in this way is formed on the n-GaN layer 113 that is to become the n-type area. Subsequently, photoresist is applied again, and an exposing device is used to perform exposing and developing to form the resist pattern 184 including the opening part 184a in the area where the second wiring electrode 162 is to be formed. Subsequently, the Ni/Au film 162f for forming the second wiring electrode 162, is formed by vacuum vapor deposition.

Figure 21A:
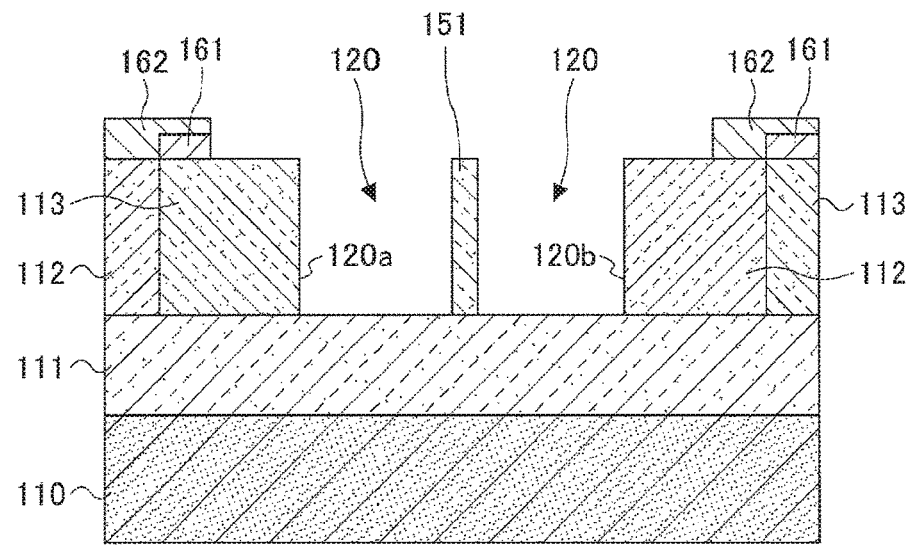
FIGS. 21A and 21B are process diagrams of a method of manufacturing the photosynthesis apparatus according to the second embodiment of the present invention (part 5)

Next, as illustrated in FIG. 21A, the Ni/Au film 162f formed on the resist pattern 184 is removed by being lifted off, together with the resist pattern 184, by immersion in an organic solvent, etc. Accordingly, the second wiring electrode 162 is formed by the remaining Ni/Au film 162f. The second wiring electrode 162 formed in this way is formed on the p-GaN layer 112 and the first wiring electrode 161. Subsequently, rapid thermal annealing (RTA) is performed to attain Ohmic contact.

Figure 21B:
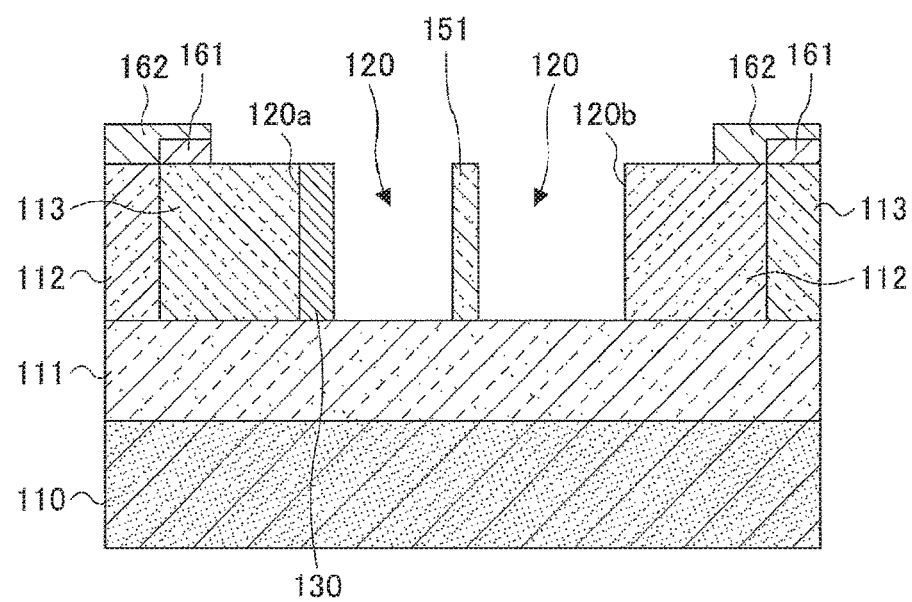

Next, as illustrated in FIG. 21B, a $H_2O$ oxidation electrode 130 is formed in contact with the n-GaN layer 113 to be the n-type area on one of the side surfaces 120a of the groove part 120. Specifically, photoresist is applied on the surface on which the groove part 120 is formed, and an exposing device is used to perform exposing and developing to form a resist pattern (not illustrated) including an opening part in the area where the $H_2O$ oxidation electrode 130 is to be formed. Subsequently, a $TiO_2/Pt$ film is formed by sputtering, and then the photosynthesis apparatus is immersed in an organic solvent, etc., to remove the $TiO_2/Pt$ film formed on the resist pattern together with the resist pattern, by a lift off process. Accordingly, the $H_2O$ oxidation electrode 130 is formed by the remaining $TiO_2/Pt$ film. The $H_2O$ oxidation electrode 130 formed in this way is formed in contact with the n-GaN layer 113 to be the n-type area, on one of the side surfaces 120a of the groove part 120.

Figure 22A:
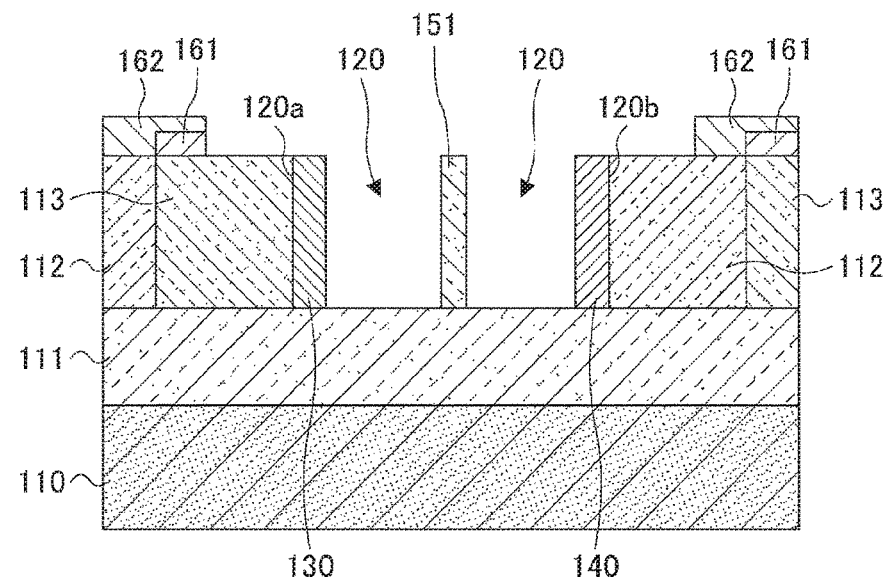
FIGS. 22A and 22B are process diagrams of a method of manufacturing the photosynthesis apparatus according to the second embodiment of the present invention (part 6)

Next, as illustrated in FIG. 22A, a $CO_2$ reduction electrode 140 is formed in contact with the p-GaN layer 112 to be the p-type area on the other one of the side surfaces 120b of the groove part 120. Specifically, photoresist is applied on the surface on which the groove part 120 is formed, and an exposing device is used to perform exposing and developing to form a resist pattern (not illustrated) including an opening part in the area where the $CO_2$ reduction electrode 140 is to be formed. Subsequently, a Cu film is formed by sputtering, and then the photosynthesis apparatus is immersed in an organic solvent, etc., to remove the Cu film formed on the resist pattern together with the resist pattern, by a lift off process. Accordingly, the $CO_2$ reduction electrode 140 is formed by the remaining Cu film. The $CO_2$ reduction electrode 140 formed in this way is formed in contact with the p-GaN layer 112 to be the p-type area, on the other one of the side surfaces 120b of the groove part 120.

Figure 22B:
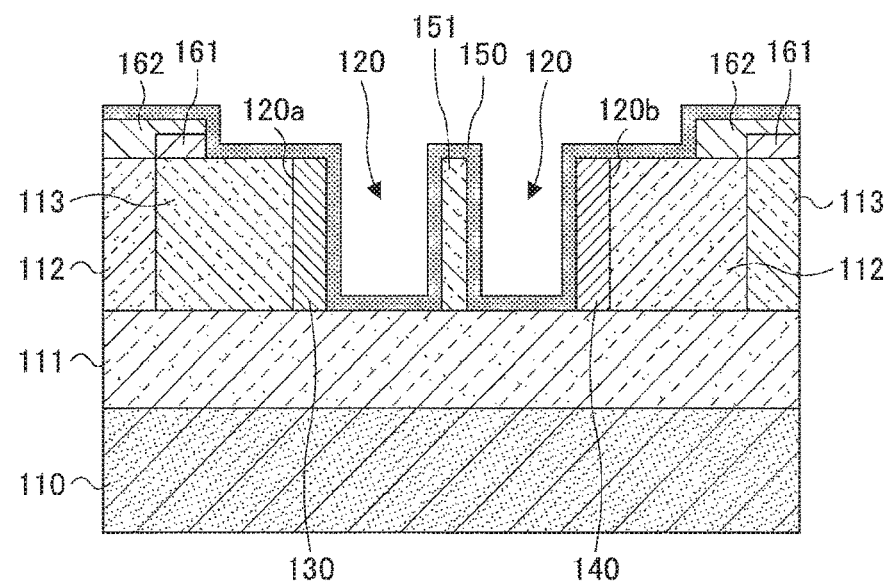

Next, as illustrated in FIG. 22B, the proton diaphragm 150 is formed by repeatedly applying and curing a material by spray coating, etc., on the surface on which the groove part 120 is formed. By forming the proton diaphragm 150 in this way, the space between adjacent proton diaphragm supporting parts 151 is filled by the proton diaphragm 150. As the material used for forming the proton diaphragm 150, $SiO_2$—$P_2O_5$, and Nafion117 (manufactured by DuPont), etc., may be used. Furthermore, the proton diaphragm 150 may be formed by a method other than spray coating, such as CVD.

Figure 23A:
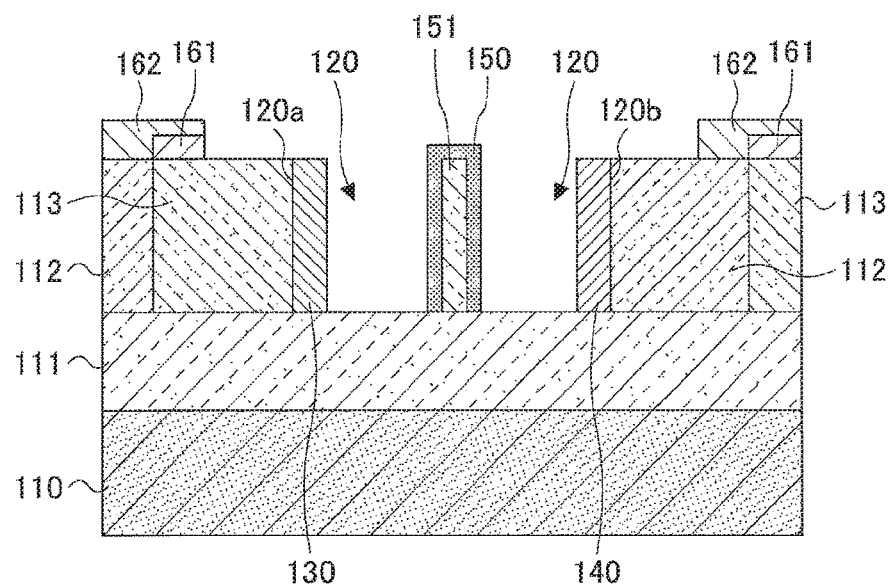
FIGS. 23A and 23B are process diagrams of a method of manufacturing the photosynthesis apparatus according to the second embodiment of the present invention (part 7)

Next, as illustrated in FIG. 23A, the proton diaphragm 150 is formed between proton diaphragm supporting parts 151 and around the proton diaphragm supporting part 151. Specifically, photoresist is applied on the proton diaphragm 150, and an exposing device is used to perform exposing and developing. Accordingly a resist pattern (not illustrated) is formed on the proton diaphragm supporting part 151 and on the proton diaphragm 150 between the proton diaphragm supporting parts 151. Subsequently, the proton diaphragm 150 in the area where the resist pattern (not illustrated) is not formed is removed by RIE, etc., to expose the surfaces of the $H_2O$ oxidation electrode 130 and the $CO_2$ reduction electrode 140. Subsequently, the resist pattern (not illustrated) is removed by an organic solvent, etc. Accordingly, the proton diaphragm 150 is formed between proton diaphragm supporting parts 151 and around the proton diaphragm supporting part 151.

Figure 23B:
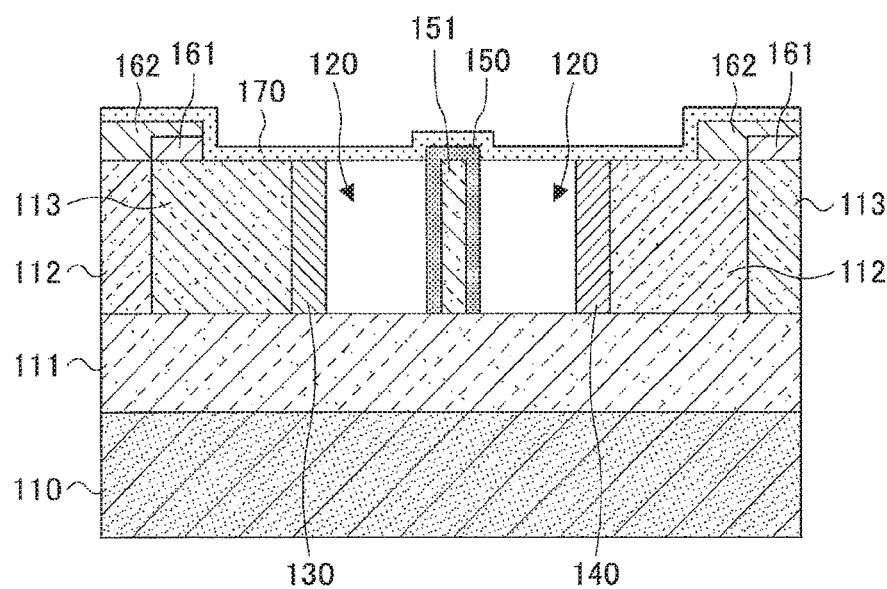

Next, as illustrated in FIG. 23B, a surface cover film 170 for covering the groove part 120 is formed. Specifically, a soluble polymer is applied by spin coating, etc., to fill the groove part 120 with the soluble polymer (not illustrated). As the soluble polymer, PMGI, PVA, etc., may be used. Subsequently, etch back is performed by oxygen asking to remove part of the soluble polymer. Then, the surface cover film 170 is formed on the p-GaN layer 112, the n-GaN layer 113, and the soluble polymer. The surface cover film 170 is formed of a $SiO_2$ film, a SiN film, and a silica system porous film. The surface cover film 170 is formed by repeatedly applying and curing the material by spin coating, or by CVD. Subsequently, the remaining soluble polymer (not illustrated) is removed by dissolving the soluble polymer. Specifically, when the soluble polymer is formed by PMGI, the soluble polymer is dissolved by an organic solvent such as pyrrolidone, and when the soluble polymer is formed by PVA, the soluble polymer is dissolved and removed by warm water. Accordingly, the photosynthesis apparatus according to the present embodiment is manufactured.

Figure 24A:
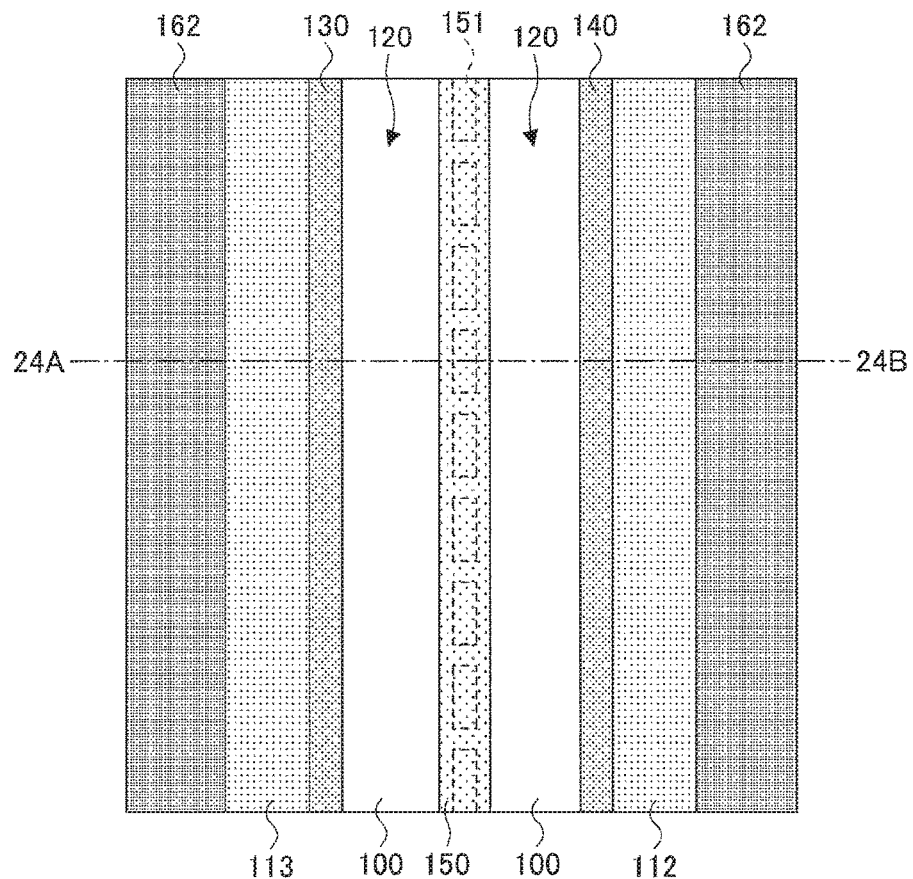
FIGS. 24A and 24B are diagrams illustrating a structure of the photosynthesis apparatus according to the second embodiment of the present invention.
Figure 24B:
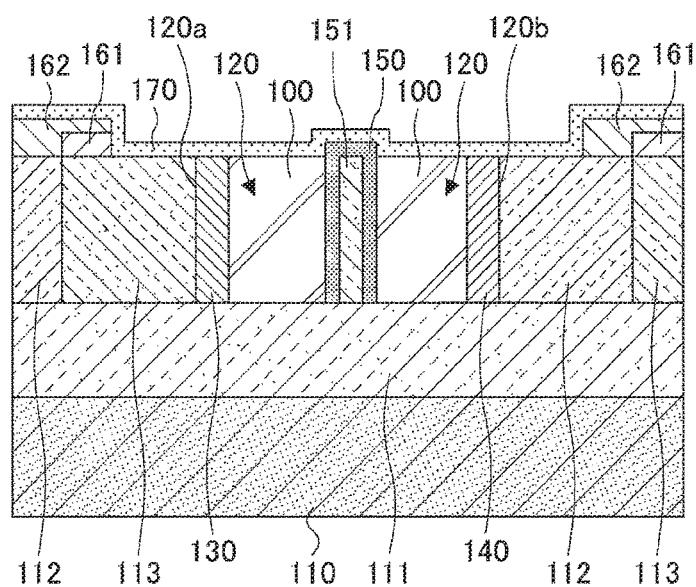

As illustrated in FIGS. 24A and 24B, the photosynthesis apparatus according to the present embodiment manufactured as described above functions as a photosynthesis apparatus by supplying the water 100 including carbon dioxide to the groove part 120 so that the water 100 flows in the groove part 120, and radiating light such as sunlight. Note that FIG. 24A is a top view of the photosynthesis apparatus according to the present embodiment viewed through the surface cover film 170, and FIG. 24B is a cross-sectional view cut along a dashed-dotted line 24A-24B in FIG. 24A.

The photosynthesis apparatus according to the present embodiment is capable of further increasing the solar energy conversion efficiency.

Third Embodiment

Next, a description is given of a third embodiment. The photosynthesis apparatus according to the present embodiment is a photosynthesis apparatus of a tandem junction-type. In the photosynthesis apparatus according to the present embodiment, the n-type area and the p-type area are formed by depositing a plurality of semiconductor layers having different band gaps.

Photosynthesis Apparatus—Third Embodiment

Figure 25A:
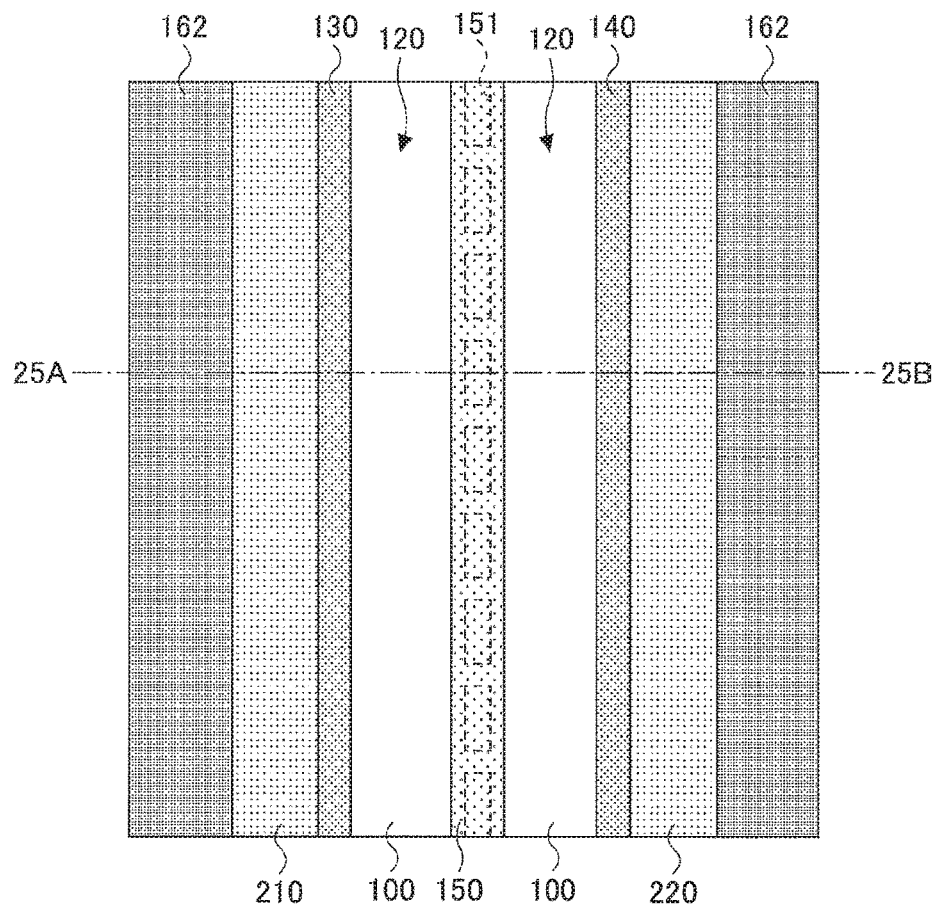
FIGS. 25A and 25B are diagrams illustrating a structure of the photosynthesis apparatus according to a third embodiment of the present invention.
Figure 25B:
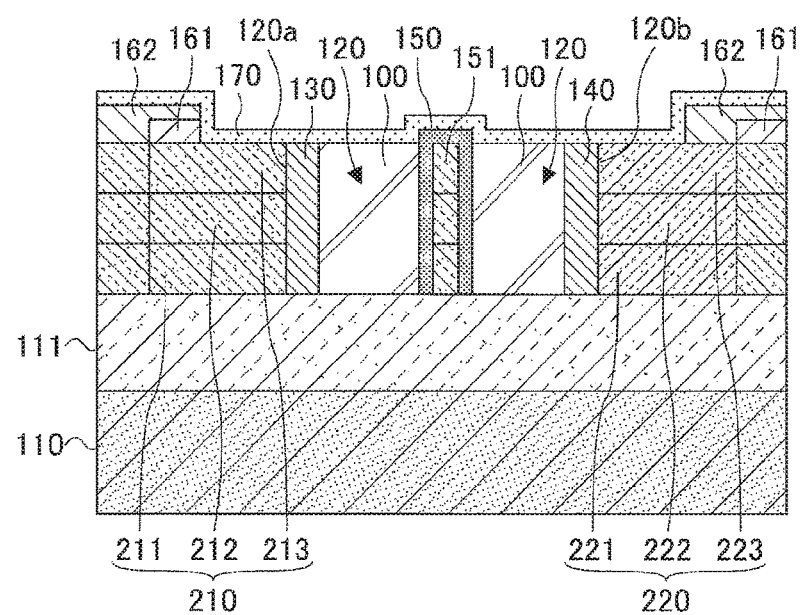

Referring to FIGS. 25A and 25B, a description is given of the photosynthesis apparatus according to the present embodiment. Note that FIG. 25A is a top view of the photosynthesis apparatus according to the present embodiment viewed through the surface cover film 170, and FIG. 25B is a cross-sectional view cut along a dashed-dotted line 25A-25B in FIG. 25A.

In the photosynthesis apparatus according to the present embodiment, the GaN layer 111 is formed on the semiconductor substrate 110, and the groove part 120 is formed on the GaN layer 111. Furthermore, an n-type area 210 and a p-type area 220, which are formed by depositing materials having different band gaps, are formed on the respective sides of the groove part 120 formed on the GaN layer 111. Specifically, the n-type area 210 is formed by a n-InGaN layer 211, a n-GaN layer 212, and a n-AlGaN layer 213 that have been deposited. The p-type area 220 is formed by a p-InGaN layer 221, a p-GaN layer 222, and a p-AlGaN layer 223 that have been deposited.

The $H_2O$ oxidation electrode 130 formed on one of the side surfaces 120a of the groove part 120 is formed in contact with the n-InGaN layer 211, the n-GaN layer 212, and the n-AlGaN layer 213 that are forming the n-type area 210 on one of the side surfaces 120a of the groove part 120. Furthermore, the $CO_2$ reduction electrode 140 formed on the other one of the side surfaces 120b of the groove part 120 is formed in contact with the p-InGaN layer 221, the p-GaN layer 222, and the p-AlGaN layer 223 that are forming the p-type area 220 on the other one of the side surfaces 120b of the groove part 120.

Method of Manufacturing Photosynthesis Apparatus—Third Embodiment

The manufacturing method according to the present embodiment is the same as that of the second embodiment, except that the n-InGaN layer 211, the n-GaN layer 212, the n-AlGaN layer 213, the p-InGaN layer 221, the p-GaN layer 222, and the p-AlGaN layer 223 are formed on the GaN layer 111.

Figure 26A:
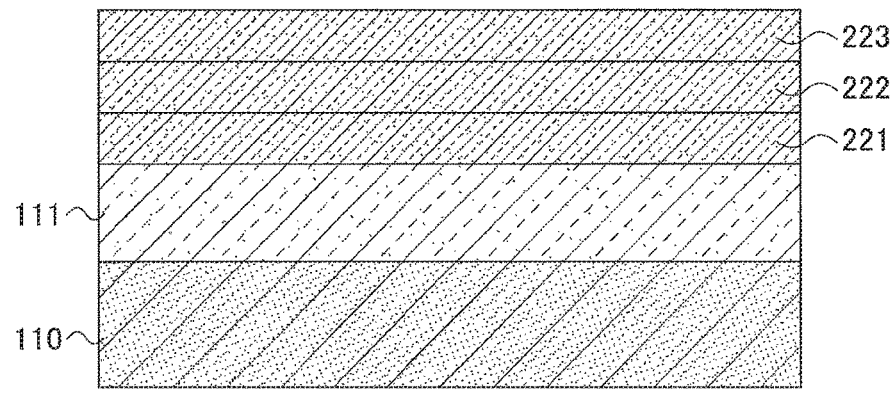
FIGS. 26A and 26B are process diagrams of a method of manufacturing the photosynthesis apparatus according to the third embodiment of the present invention (part 1)

Specifically, first, as illustrated in FIG. 26A, the GaN layer 111, the p-InGaN layer 221, the p-GaN layer 222, and the p-AlGaN layer 223 are formed by being sequentially deposited by epitaxial growth, on the semiconductor substrate 110. Note that the semiconductor substrate 110 is formed of Si. Examples of the method of epitaxial growth are MOCVD or PAMBE, etc. In the present embodiment, the formed GaN layer 111 has a thickness of approximately 1 μm, the p-InGaN layer 221 has a thickness of approximately 3.3 μm, the p-GaN layer 222 has a thickness of approximately 3.3 μm, and the p-AlGaN layer 223 has a thickness of approximately 3.3 μm.

Figure 26B:
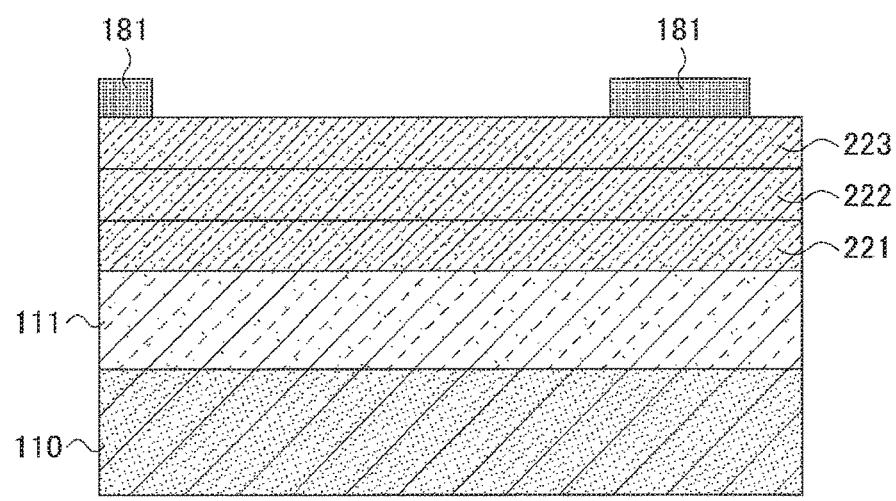

Next, as illustrated in FIG. 26B, the hard mask 181 is formed on the p-AlGaN layer 223. The hard mask 181 is formed of SiN, and is formed on the area where the p-type area 220 is to be formed by the p-InGaN layer 221, the p-GaN layer 222, and the p-AlGaN layer 223. Specifically, a SiN film is formed by plasma CVD on the p-AlGaN layer 223, photoresist is applied on the formed SiN film, and an exposing device is used to perform exposing and developing. Accordingly, a resist pattern (not illustrated) is formed in the area where the hard mask 181 is to be formed. Subsequently, the SiN film in the area where the resist pattern (not illustrated) is not formed is removed by dry etching, to form the hard mask 181 made of SiN. Subsequently, the resist pattern (not illustrated) is removed by an organic solvent, etc.

Figure 27A:
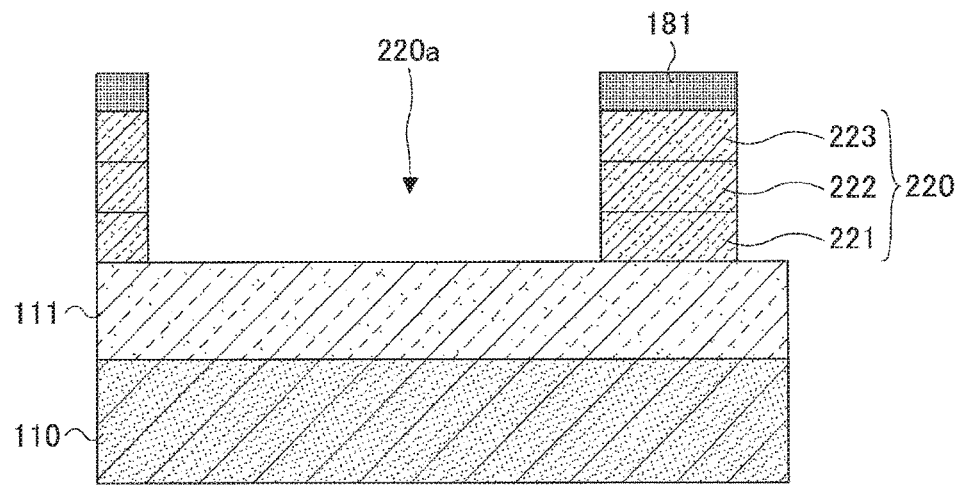
FIGS. 27A and 27B are process diagrams of a method of manufacturing the photosynthesis apparatus according to the third embodiment of the present invention (part 2)

Next, as illustrated in FIG. 27A, the p-InGaN layer 221, the p-GaN layer 222, and the p-AlGaN layer 223 in the area where the hard mask 181 is not formed are removed by RIE, etc. Accordingly, the surface of the GaN layer 111 is exposed, to form an opening part 220a, and the p-type area 220 is formed by the remaining p-InGaN layer 221, the p-GaN layer 222, and the p-AlGaN layer 223.

Figure 27B:
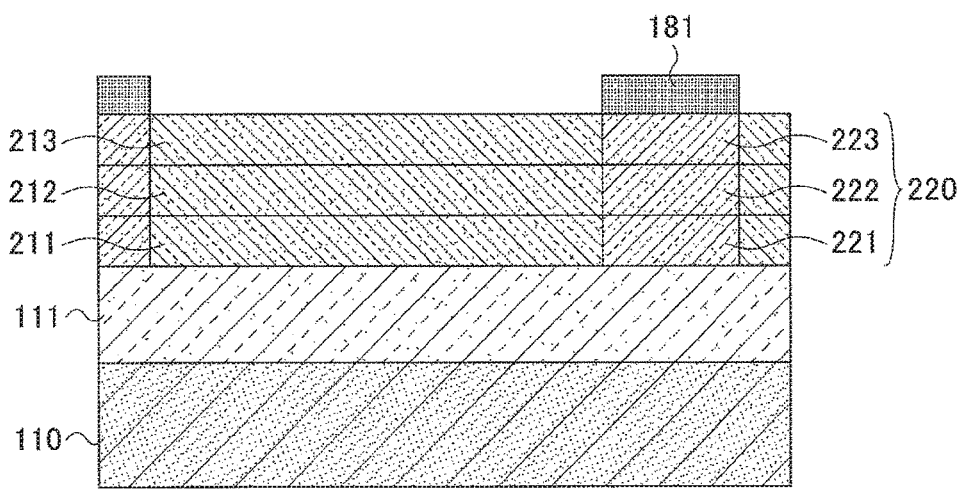

Next, as illustrated in FIG. 27B, the n-InGaN layer 211, the n-GaN layer 212, and the n-AlGaN layer 213 are formed by epitaxial growth on the GaN layer 111 in the opening part 220a. Examples of the method of epitaxial growth for forming the n-InGaN layer 211, the n-GaN layer 212, and the n-AlGaN layer 213, are MOCVD or PAMBE, etc. Note that the hard mask 181 formed of SiN is amorphous, and therefore the layers will not be epitaxially grown on the hard mask 181 formed of SiN.

Next, after removing the hard mask 181 by the same method as that of the second embodiment, parts of the n-InGaN layer 211, the n-GaN layer 212, and the n-AlGaN layer 213 are removed, to form the groove part 120. Accordingly, the n-type area 210 is formed by the remaining parts of the n-InGaN layer 211, the n-GaN layer 212, and the n-AlGaN layer 213. Subsequently, by performing the same processes as those of the second embodiment, the photosynthesis apparatus according to the present embodiment is manufactured.

In the photosynthesis apparatus according to the present embodiment, the n-type area 210 and the p-type area 220 are formed by depositing a plurality of semiconductor layers having different band gaps, and therefore the solar energy conversion efficiency is increased.

Note that in the present embodiment, a description is given of the photosynthesis apparatus in which the n-type area 210 and the p-type area 220 are respectively formed by depositing three layers of an InGaN layer, a GaN layer, and an AlGaN layer of the n-type and the p-type. However, in the photosynthesis apparatus according to the present embodiment, the n-type area 210 and the p-type area 220 may be respectively formed by depositing three layers of an InGaAs layer, a GaAs layer, and an InGaP layer of the n-type and the p-type. Furthermore, the n-type area 210 and the p-type area 220 may be formed by depositing two semiconductor layers having different band gaps, or by depositing four or more semiconductor layers having different band gaps.

Note that contents other than the above are the same as those of the second embodiment.

Fourth Embodiment

Next, a description is given of a fourth embodiment. Incidentally, in a GaN system nitride semiconductor, Mg (magnesium) is doped as an impurity element for forming a p-type area. However, the activation rate of Mg is several percent and significantly low. Thus, the inactive Mg mainly recombines, and therefore the conversion efficiency of the energy of light such as sunlight may decrease. Accordingly, the photosynthesis apparatus according to the present embodiment uses the polarization effect at GaN, without forming a p-type area.

Photosynthesis Apparatus—Fourth Embodiment

Figure 28A:
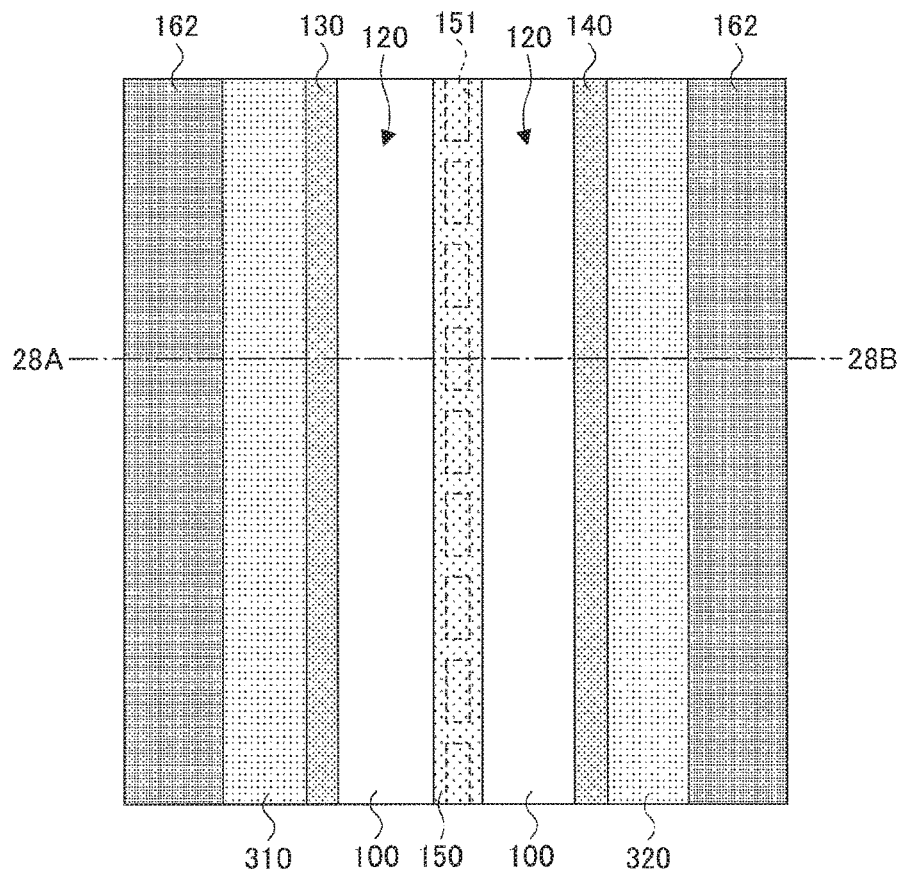
FIGS. 28A and 28B are diagrams illustrating a structure of the photosynthesis apparatus according to a fourth embodiment of the present invention.
Figure 28B:
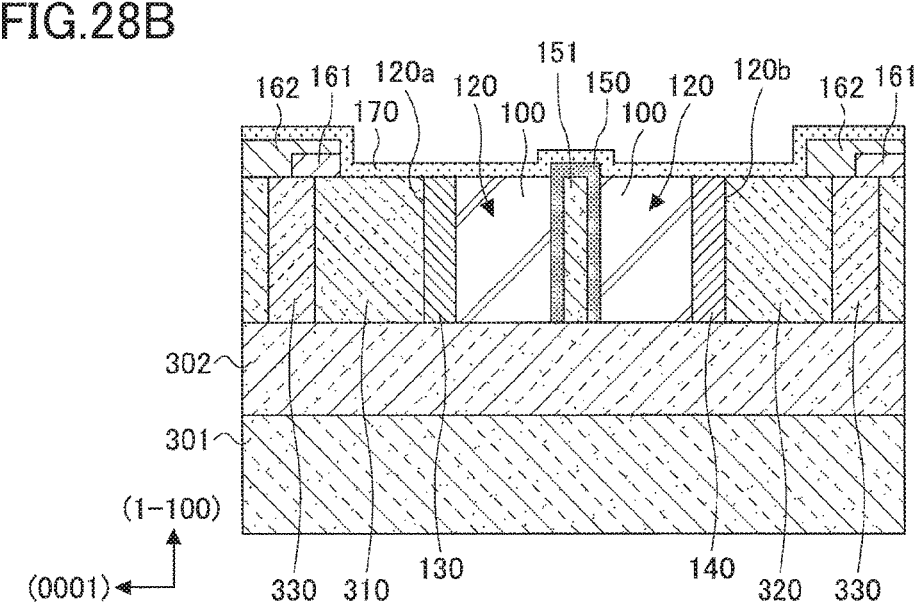
Figure 29:
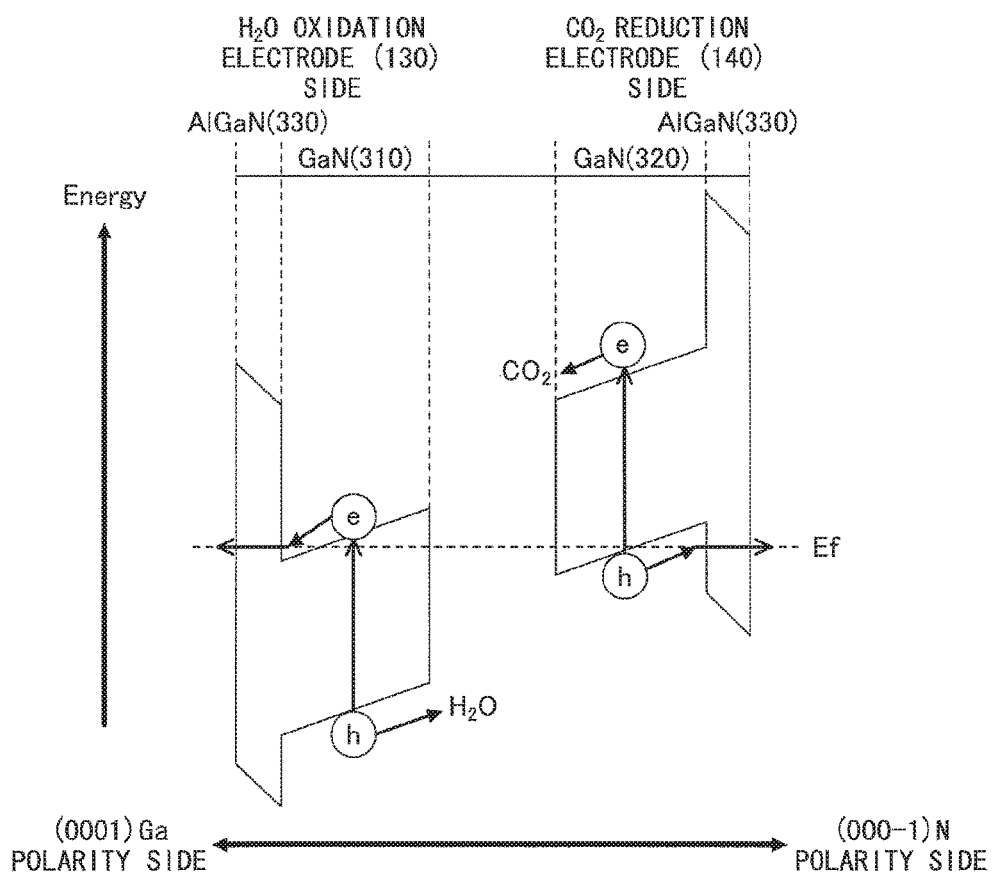
FIG. 29 is a diagram for describing the photosynthesis apparatus according to the fourth embodiment of the present invention.

Referring to FIGS. 28A through 29, a description is given of the photosynthesis apparatus according to the present embodiment. Note that FIG. 28A is a top view of the photosynthesis apparatus according to the present embodiment viewed through the surface cover film 170, and FIG. 28B is a cross-sectional view cut along a dashed-dotted line 28A-28B in FIG. 28A.

In the present embodiment, a GaN substrate is used as a substrate 301, and a GaN layer 302 is formed on the substrate 301. Part of a GaN layer, which is formed on the GaN layer 302, is removed, to form the groove part 120 on the GaN layer 302. Furthermore, on both sides of the groove part 120, a first GaN area to become a first semiconductor area 310 and a second GaN area to become a second semiconductor area 320, are formed by GaN.

On one of the side surfaces 120a of the groove part 120, the $H_2O$ oxidation electrode 130 is formed in contact with the first GaN area to become the first semiconductor area 310 on one of the side surfaces 120a of the groove part 120. On the other one of the side surfaces 120b of the groove part 120, the $CO_2$ reduction electrode 140 is formed in contact with the second GaN area to become the second semiconductor area 320 on other one of the side surfaces 120b of the groove part 120. Furthermore, on a side opposite to one of the side surfaces forming the groove part 120, the first GaN area to become the first semiconductor area 310 is formed. On a side opposite to the other one of the side surfaces forming the groove part 120, the second GaN area to become the second semiconductor area 320 is formed. An AlGaN area to become a third semiconductor area 330 is formed in contact with each of the first GaN area and the second GaN area. In the present embodiment, the third semiconductor area 330 is formed by a semiconductor material having a wider band gap than the semiconductor material forming the first semiconductor area 310 and the second semiconductor area 320. Accordingly, 2DEG (two-dimensional electron gas) is generated in the first semiconductor area 310 near the interface between the first semiconductor area 310 and the third semiconductor area 330. Furthermore, 2 DHG (two-dimensional hole gas) is generated in the second semiconductor area 320 near the interface between the second semiconductor area 320 and the third semiconductor area 330. Note that in the present embodiment, the first semiconductor area 310, the second semiconductor area 320, and the third semiconductor area 330 are formed by a material including GaN.

In the present embodiment, on one of the side surfaces 120a of the groove part 120, an AlGaN/GaN hetero structure is formed by the third semiconductor area 330 and the first semiconductor area 310 grown along a C axis direction, forming a (000-1) N polarity side of the first semiconductor area 310. Thus, the $H_2O$ oxidation electrode 130 is formed in contact with the (000-1) N polarity side of GaN. Furthermore, on the other one of the side surfaces 120b of the groove part 120, an AlGaN/GaN hetero structure is formed by the third semiconductor area 330 and the second semiconductor area 320 grown in the C axis direction, forming a (0001) Ga polarity side of the second semiconductor area 320. Thus, the $CO_2$ reduction electrode 140 is formed in contact with the (0001) Ga polarity side of GaN.

The wurtzite-type GaN crystal has the characteristics of spontaneous polarization and piezoelectric polarization. Thus, as illustrated in FIG. 29, according to these polarization charges, positive fixed charges are generated on the AlGaN/GaN interface that has grown on the (0001) Ga polarity side that becomes the interface between the third semiconductor area 330 and the first semiconductor area 310. Furthermore, negative fixed charges are generated on the AlGaN/GaN interface that has grown on the (000-1) N polarity side that becomes the interface between the third semiconductor area 330 and the second semiconductor area 320. Therefore, it is possible to make the energy level in AlGaN/GaN that has grown on the (000-1) N polarity side higher than the energy level in AlGaN/GaN that has grown on the (0001) Ga polarity side. Accordingly, it is possible to generate high-energy electrons and increase the reduction efficiency of carbon dioxide.

Note that in the present embodiment, the first GaN area that becomes the first semiconductor area 310 and the second GaN area that becomes the second semiconductor area 320 are formed by a remaining GaN layer 303 when forming the groove part 120 as described below. Furthermore, the proton diaphragm supporting part 151 for supporting the proton diaphragm 150 is also formed by the GaN layer 303 remaining at the center part of the groove part 120.

Method of Manufacturing Photosynthesis Apparatus—Fourth Embodiment

Next, a description is given of a method of manufacturing the photosynthesis apparatus according to the present embodiment.

Figure 30A:
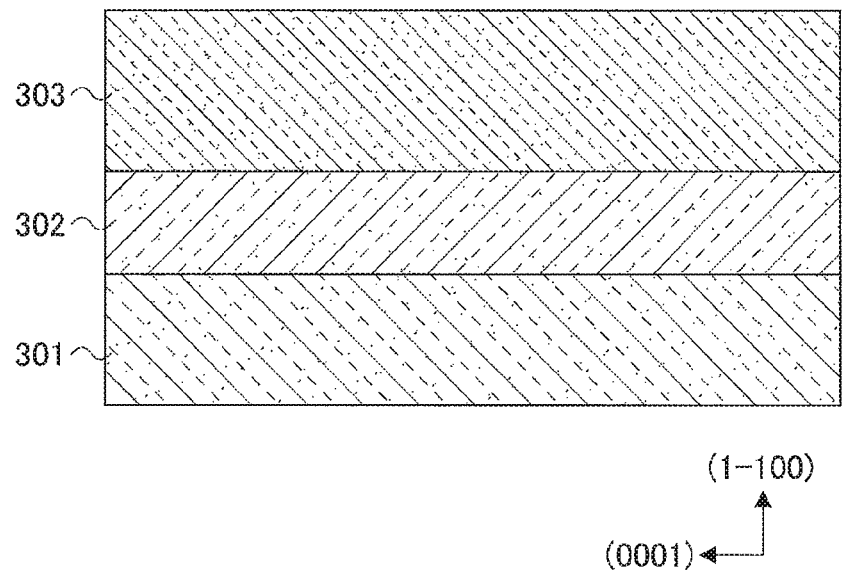
FIGS. 30A and 30B are process diagrams of a method of manufacturing the photosynthesis apparatus according to the fourth embodiment of the present invention (part 1)

First, as illustrated in FIG. 30A, the GaN layer 302 and the GaN layer 303 are sequentially formed by epitaxial growth on a GaN substrate that becomes the substrate 301. In the present embodiment, an m-plane (1-100) GaN substrate is used as the substrate 301. Examples of the method of epitaxial growth are MOCVD or PAMBE, etc. In the present embodiment, the formed GaN layer 302 has a thickness of approximately 1 µm and the GaN layer 303 has a thickness of approximately 10 µm. Note that in the present embodiment, the GaN layer 302 may be expressed as a first semiconductor layer and the GaN layer 303 may be expressed as a second semiconductor layer.

Figure 30B:
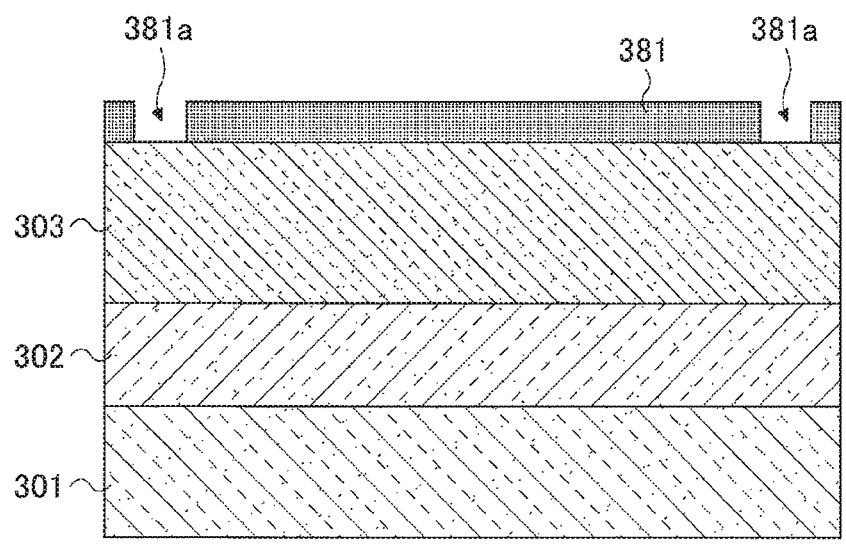

Next, as illustrated in FIG. 30B, a hard mask 381 is formed on the GaN layer 303. The hard mask 381 is formed of SiN, and the hard mask 381 has an opening part 381a in the area where the AlGaN area is to be formed. Specifically, a SiN film is formed by plasma CVD on the GaN layer 303, photoresist is applied on the formed SiN film, and an exposing device is used to perform exposing and developing. Accordingly, a resist pattern (not illustrated) is formed in the area where the hard mask 381 is to be formed. Subsequently, the SiN film in the area where the resist pattern (not illustrated) is not formed is removed by dry etching, to form the hard mask 381 made of SiN. Subsequently, the resist pattern (not illustrated) is removed by an organic solvent, etc.

Figure 31A:
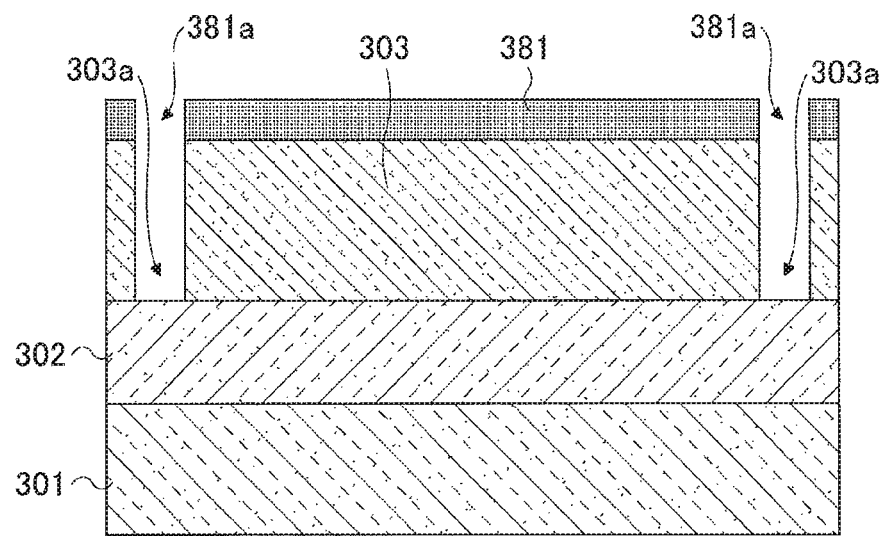
FIGS. 31A and 31B are process diagrams of a method of manufacturing the photosynthesis apparatus according to the fourth embodiment of the present invention (part 2)

Next, as illustrated in FIG. 31A, the GaN layer 303 in the opening part 381a of the hard mask 381 is removed by RIE, etc. Accordingly, the surface of the GaN layer 111 is exposed, to form an opening part 303a.

Figure 31B:
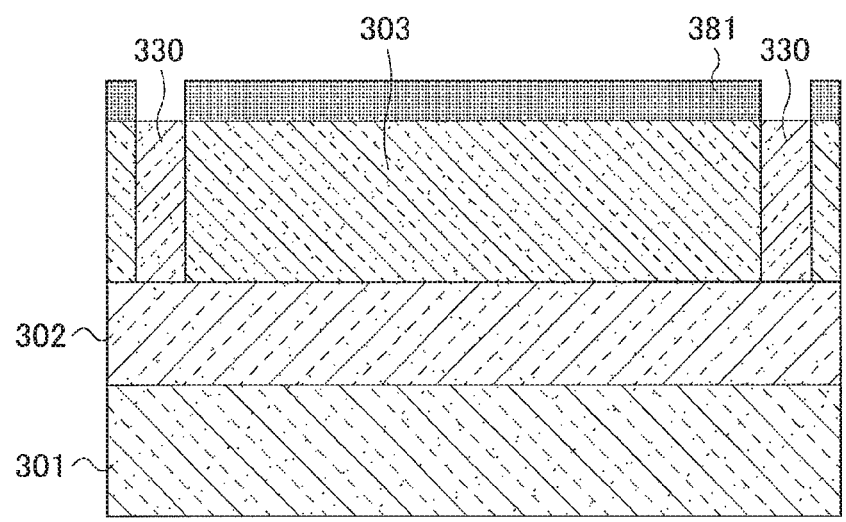

Next, as illustrated in FIG. 31B, the AlGaN area to become the third semiconductor area 330, is formed by epitaxial growth on the GaN layer 302 in the opening part 303a. Accordingly, in the Ga polarity side area of the GaN layer 303 in the opening part 303a, 2DEG is generated at the AlGaN/GaN interface, and in the N polarity side area of the GaN layer 303, 2 DHG is generated at the AlGaN/GaN interface.

Next, after removing the hard mask 381 by the same method as that of the second embodiment, a part of the GaN layer 303 is removed, to form the groove part 120. Accordingly, the first GaN area to become the first semiconductor area 310 and the second GaN area to become the second semiconductor area 320 are formed by the remaining GaN layer 303. In this way, as illustrated in FIGS. 28A and 28B, on one of the side surfaces 120a of the groove part 120, the first GaN area to become the first semiconductor area 310 is formed, and on the other one of the side surfaces 120b of the groove part 120, the second GaN area to become the second semiconductor area 320 is formed. When forming the groove part 120, the groove part 120 is formed such that the length between the AlGaN/GaN interface and one of the side surfaces 120a of the groove part 120 and the length between the AlGaN/GaN interface and the other one of the side surfaces 120b of the groove part 120, are both less than or equal to 1 µm.

Subsequently, by performing the same processes as those of the second embodiment, the photosynthesis apparatus according to the present embodiment is manufactured. Note that the first wiring electrode 161 formed of Ti/Al is formed at the interface between the first GaN area to become the first semiconductor area 310 and the AlGaN area to become the third semiconductor area 330. Furthermore, the second wiring electrode 162 formed of Ni/Au is formed at the interface between the second GaN area to become the second semiconductor area 320 and the AlGaN area to become the third semiconductor area 330. After forming the first wiring electrode 161 and the second wiring electrode 162, rapid thermal annealing is performed to attain Ohmic contact.

The photosynthesis apparatus according to the present embodiment is manufactured by using a GaN system nitride semiconductor material, without using Mg that is hardly activated as a p-type impurity element, and therefore it is possible to increase the solar energy conversion efficiency.

In the description of the present embodiment, an m-plane GaN substrate is used as the substrate 301; however, a GaN substrate is expensive. Therefore, an m-plane or an a-plane GaN epitaxial layer may be formed on an inexpensive substrate such as an Si substrate, and this substrate may be used as the substrate 301. Furthermore, as the substrate 301, m-plane SiC, γ-LiAlO$_2$(100), m-plane ZnO, en-plane sapphire, an a-plane sapphire substrate that has undergone pattern processing, Si(112) that has undergone pattern processing, etc., may be used. Furthermore, an m-plane AlN substrate formed by the same III-V compound semiconductor may be used.

Furthermore, other than a GaN epitaxial layer having a surface that is an m-plane, a GaN epitaxial layer of a nonpolar a-plane that is the same as the m-plane is also in an orthogonal relationship with the c-plane, and therefore by using a substrate on which an a-plane GaN epitaxial layer is formed on the surface, the same effects as the present embodiment may be achieved. Note that examples of a substrate on which an a-plane GaN epitaxial layer may be grown are r-plane sapphire, LiGaO$_2$(010), a-plane SiC, a-plane GaN, a-plane AlN, a-plane ZnO, etc.

Note that the substrate 301 may be used, not only when the surface of the substrate 301 is an nonpolar-plane of an m-plane and an a-plane, but also when the surface of the substrate 301 has other planes; therefore, the substrate 301 having an off angle may be used.

Fifth Embodiment

Next, a description is given of a fifth embodiment. The photosynthesis apparatus according to the present embodiment has a structure in which the first semiconductor layer and the second semiconductor layer of the fourth embodiment are formed by depositing a plurality of semiconductor layers having different band gaps.

Photosynthesis Apparatus—Fifth Embodiment

Figure 32A:
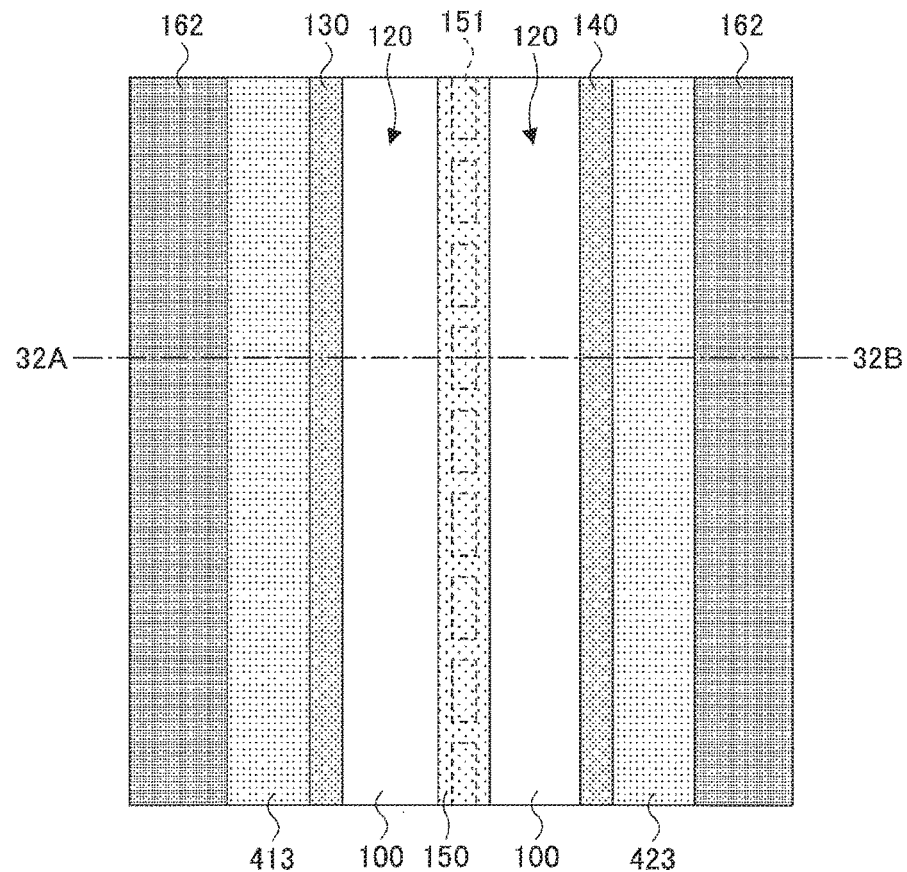
FIGS. 32A and 32B are diagrams illustrating a structure of the photosynthesis apparatus according to a fifth embodiment of the present invention.
Figure 32B:
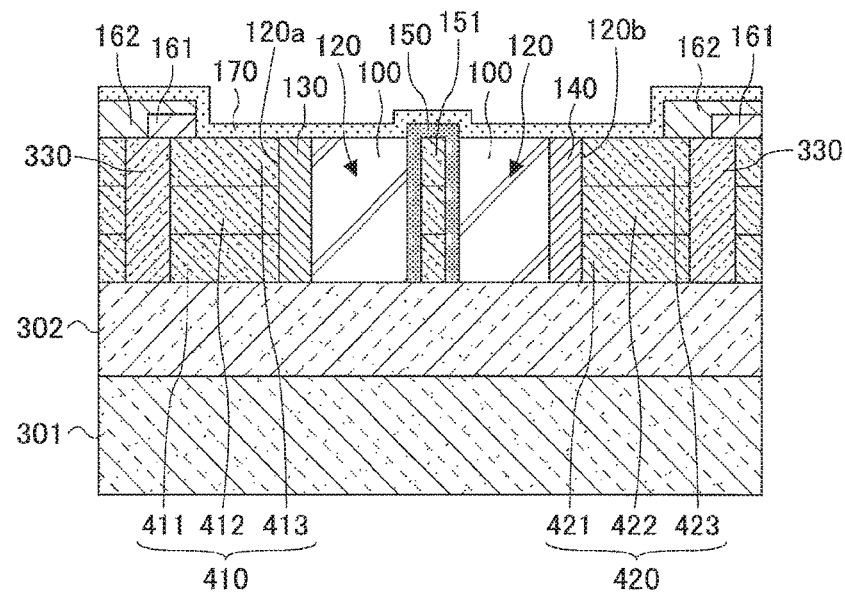

A description is given of the photosynthesis apparatus according to the present embodiment by referring to FIGS. 32A and 32B. Note that FIG. 32A is a top view of the photosynthesis apparatus according to the present embodiment viewed through the surface cover film 170, and FIG. 32B is a cross-sectional view cut along a dashed-dotted line 32A-32B in FIG. 32A.

In the photosynthesis apparatus according to the present embodiment, a GaN substrate is used as the substrate 301. The GaN layer 302 is formed on the substrate 301. The groove part 120 is formed on the GaN layer 302. On one of the side surfaces 120a of the groove part 120, a first semiconductor area 410 is formed. The first semiconductor area 410 is formed by depositing an InGaN layer 411, a GaN layer 412, and an AlGaN layer 413. The H$_2$O oxidation electrode 130 is formed in contact with the first semiconductor area 410 at one of the side surfaces 120a of the groove part 120. Furthermore, on the other one of the side surfaces 120b of the groove part 120, a second semiconductor area 420 is formed. The second semiconductor area 420 is formed by depositing an InGaN layer 421, a GaN layer 422, and an AlGaN layer 423. The CO$_2$ reduction electrode 140 is formed in contact with the second semiconductor area 420 at the other one of the side surfaces 120b of the groove part 120. Furthermore, the third semiconductor area 330 is formed by AlGaN in contact with each of the first semiconductor area 410 and the second semiconductor area 420. In the present embodiment, the third semiconductor area 330 is formed of a semiconductor material having a wider band gap than the semiconductor material forming the first semiconductor area 410 and the second semiconductor area 420.

In the present embodiment, the Al composition ratio in AlGaN forming the third semiconductor area 330 is higher than the Al composition ratio of the AlGaN layer 413 in the first semiconductor area 410 or the Al composition ratio of the AlGaN layer 423 in the second semiconductor area 420. For example, the third semiconductor area 330 is formed of Al$_{0.3}$Ga$_{0.7}$N, and the AlGaN layer 413 in the first semiconductor area 410 and the AlGaN layer 423 in the second semiconductor area 420 are formed of Al$_{0.2}$Ga$_{0.8}$N. Accordingly, 2 DHG is generated in the first semiconductor area 410 near the interface between the first semiconductor area 410 and the third semiconductor area 330, and 2 DEG is generated in the second semiconductor area 420 near the interface between the second semiconductor area 420 and the third semiconductor area 330. Note that in the present embodiment, the first semiconductor area 410, the second semiconductor area 420, and the third semiconductor area 330 are formed of a material including GaN.

Note that in the present embodiment, the proton diaphragm supporting part 151 for supporting the proton diaphragm 150 is formed by a remaining InGaN layer 401, a GaN layer 402, and an AlGaN layer 403, when forming the groove part 120 as described below.

Method of Manufacturing Photosynthesis Apparatus—Fifth Embodiment

Next, a description is given of a method of manufacturing the photosynthesis apparatus according to the present embodiment.

Figure 33A:
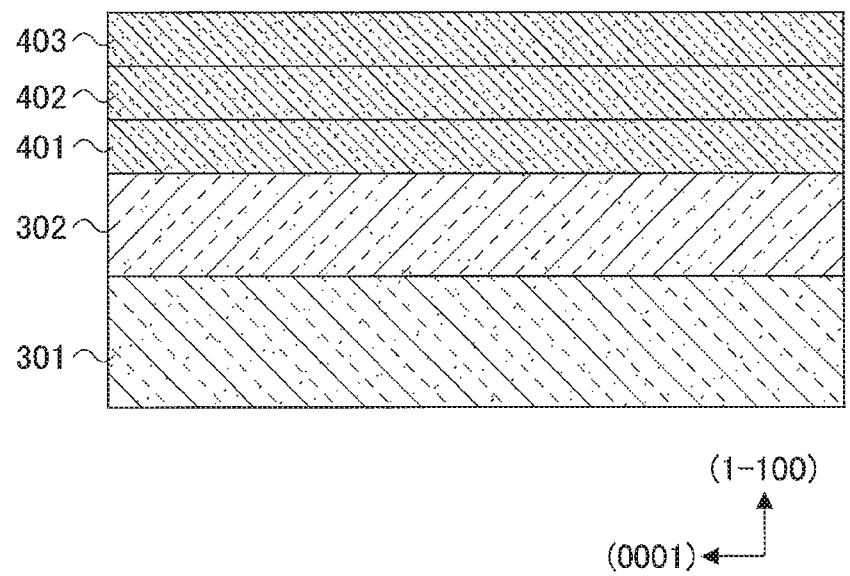
FIGS. 33A and 33B are process diagrams of a method of manufacturing the photosynthesis apparatus according to the fifth embodiment of the present invention (part 1)

First, as illustrated in FIG. 33A, on a GaN substrate that is the substrate 301, the GaN layer 302, the InGaN layer 401, the GaN layer 402, and the AlGaN layer 403 are formed by epitaxial growth. In the present embodiment, an m-plane (1-100) GaN substrate is used as the substrate 301. Examples of the method of epitaxial growth are MOCVD or PAMBE, etc. In the present embodiment, the formed GaN layer 302 has a thickness of approximately 1 μm, the InGaN layer 401 has a thickness of approximately 3.3 μm, the GaN layer 402 has a thickness of approximately 3.3 μm, and the AlGaN layer 403 has a thickness of approximately 3.3 μm.

Figure 33B:
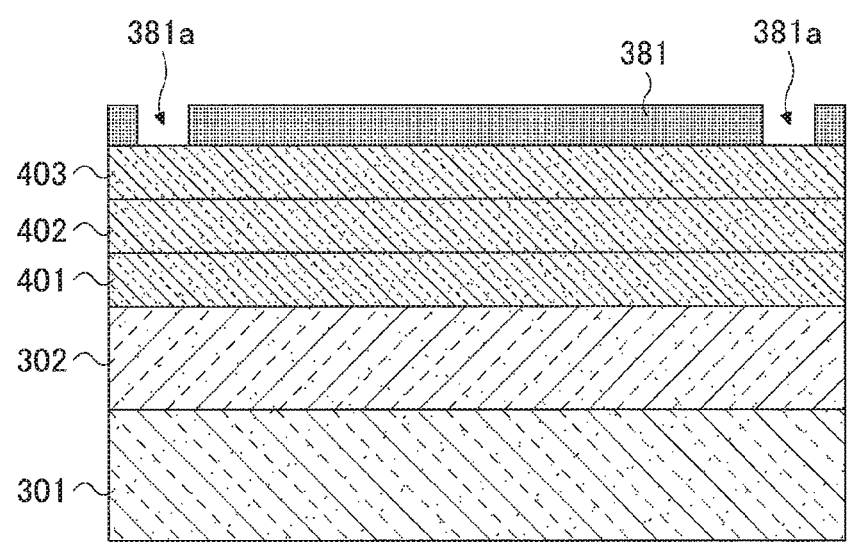

Next, as illustrated in FIG. 33B, the hard mask 381 is formed on the AlGaN layer 403. The hard mask 381 is formed of SiN, and the hard mask 381 has an opening part 381a in the area where the AlGaN area to become the third semiconductor area 330 is to be formed. Specifically, a SiN film is formed by plasma CVD on the AlGaN layer 403, photoresist is applied on the formed SiN film, and an exposing device is used to perform exposing and developing. Accordingly, a resist pattern (not illustrated) is formed in the area where the hard mask 381 is to be formed. Subsequently, the SiN film in the area where the resist pattern (not illustrated) is not formed is removed by dry etching, to form the hard mask 381 made of SiN. Subsequently, the resist pattern (not illustrated) is removed by an organic solvent, etc.

Figure 34A:
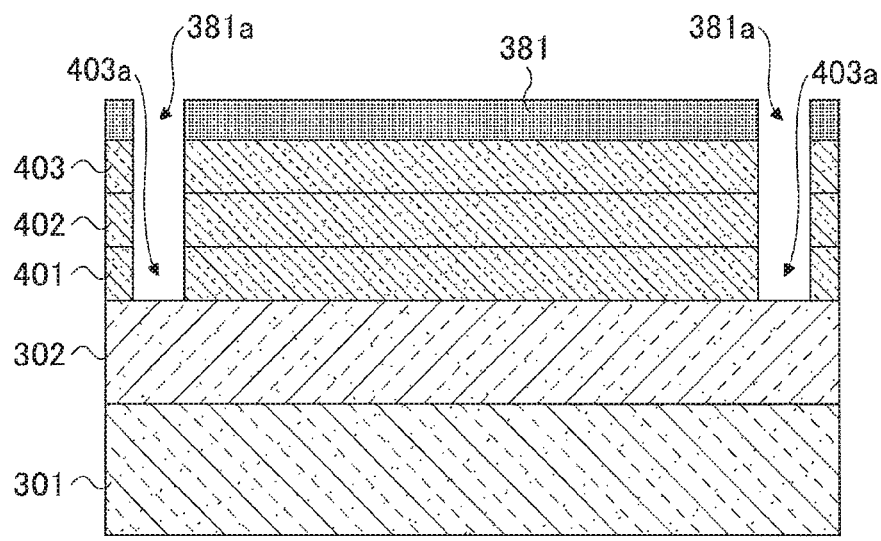
FIGS. 34A and 34B are process diagrams of a method of manufacturing the photosynthesis apparatus according to the fifth embodiment of the present invention (part 2)

Next, as illustrated in FIG. 34A, the InGaN layer 401, the GaN layer 402, and the AlGaN layer 403 in the opening part 381a of the hard mask 381 are removed by RIE, etc. Accordingly, the surface of the GaN layer 302 is exposed, to form an opening part 403a.

Figure 34B:
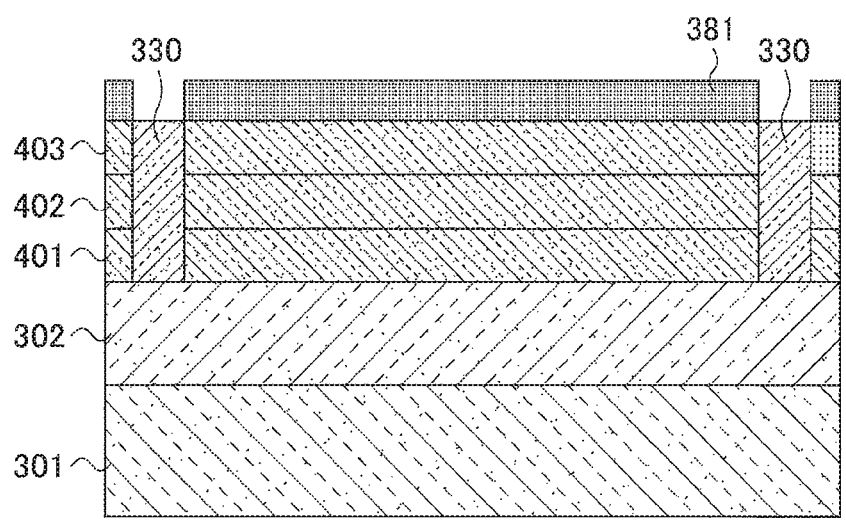

Next, as illustrated in FIG. 34B, the AlGaN area to become the third semiconductor area 330 is formed by epitaxially growing AlGaN on the GaN layer 302 in the opening part 403a. Accordingly, in the Ga polarity side area of the InGaN layer 401, the GaN layer 402, and the AlGaN layer 403 in the opening part 403a, 2 DEG is generated near the interface between the Ga polarity side area and the AlGaN area to become the third semiconductor area 330. In the N polarity side area of the InGaN layer 401, the GaN layer 402, and the AlGaN layer 403 in the opening part 403a, 2 DHG is generated near the interface between the N polarity side area and the AlGaN area to become the third semiconductor area 330.

Next, after removing the hard mask 381 by the same method as that of the second embodiment, the groove part 120 is formed in the InGaN layer 401, the GaN layer 402, and the AlGaN layer 403. Accordingly, the first semiconductor area 410 and the second semiconductor area 420 are formed. The first semiconductor area 410 formed as above is formed by the InGaN layer 411, the GaN layer 412, and the AlGaN layer 413. The second semiconductor area 420 is formed by the InGaN layer 421, the GaN layer 422, and the AlGaN layer 423. Note that the InGaN layer 411, the GaN layer 412, the AlGaN layer 413, the InGaN layer 421, the GaN layer 422, and the AlGaN layer 423 are formed by the remaining InGaN layer 401, the GaN layer 402, and the AlGaN layer 403 when forming the groove part 120.

In the present embodiment, as illustrated in FIGS. 32A and 32B, one of the side surfaces 120a of the groove part 120 is formed by the first semiconductor area 410 and the other one of the side surfaces 120b of the groove part 120 is formed by the second semiconductor area 420. Furthermore, an AlGaN area to become the third semiconductor area 330 is formed in contact with each of the first semiconductor area 410 and the second semiconductor area 420. When forming the groove part 120, the groove part 120 is formed such that the length between the interface between the first semiconductor area 410 and the third semiconductor area 330, and the one of the side surfaces 120a of the groove part 120 is less than or equal to 1 μm; and such that the length between the interface between the second semiconductor area 420 and the third semiconductor area 330, and the other one of the side surfaces 120b of the groove part 120 is less than or equal to 1 μm.

Subsequently, by performing the same processes as those of the fourth embodiment, the photosynthesis apparatus according to the present embodiment is manufactured. Note that the first wiring electrode 161 formed of Ti/Al is formed at the interface between the first semiconductor area 410 and the third semiconductor area 330. Furthermore, the second wiring electrode 162 formed of Ni/Au is formed at the interface between the second semiconductor area 420 and the third semiconductor area 330. After forming the first wiring electrode 161 and the second wiring electrode 162, rapid thermal annealing is performed to attain Ohmic contact.

Note that contents other than the above are the same as the fourth embodiment.

Sixth Embodiment

Figure 35A:
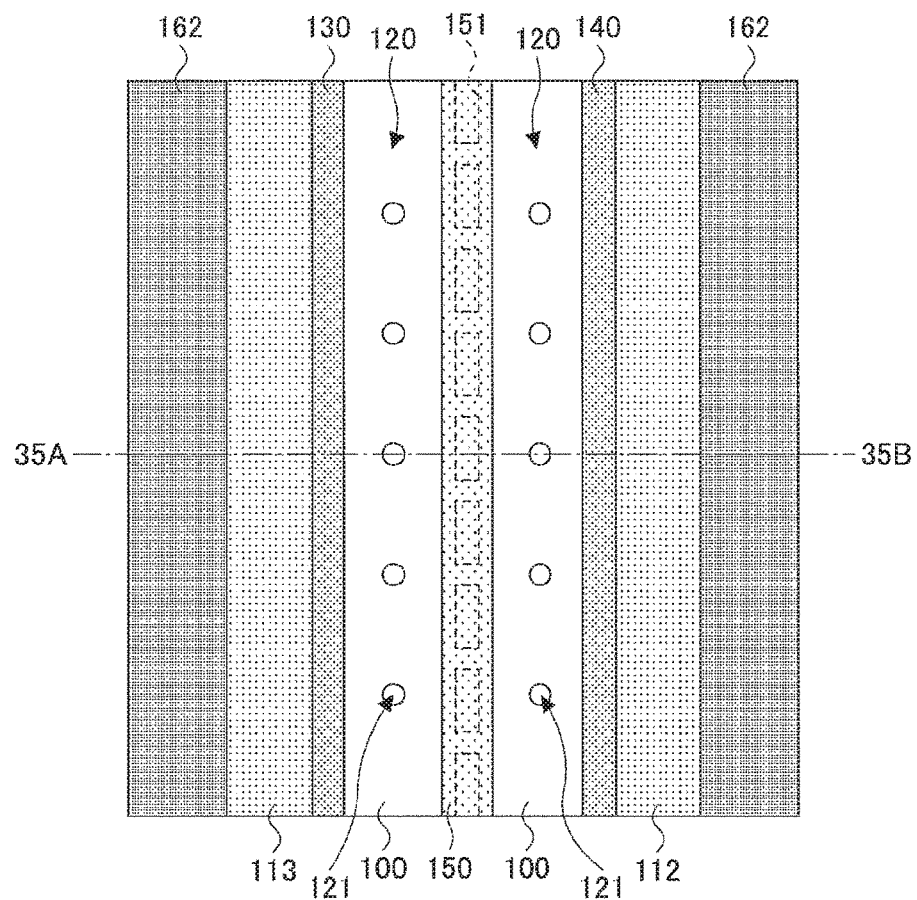
FIGS. 35A and 35B are diagrams illustrating a structure of the photosynthesis apparatus according to a sixth embodiment of the present invention.
Figure 35B:
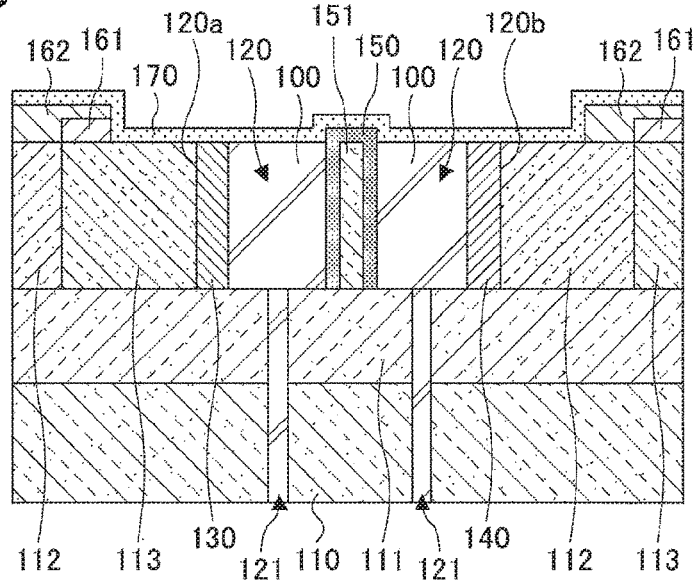

Next, a description is given of a sixth embodiment. As illustrated in FIGS. 35A and 35B, the photosynthesis apparatus according to the present embodiment has a structure in which a through-hole 121 connecting the groove part 120 and the back side of the semiconductor substrate 110 is formed in the photosynthesis apparatus according to the second embodiment. Note that FIG. 35A is a top view of the photosynthesis apparatus according to the present embodiment viewed through the surface cover film 170, and FIG. 35B is a cross-sectional view cut along a dashed-dotted line 35A-35B in FIG. 35A.

The through-hole 121 is formed by performing dry etching or wet etching to remove the semiconductor substrate 110 and the GaN layer 111 in the area where the groove part 120 is formed, to penetrate through the semiconductor substrate 110 and the GaN layer 111. By forming the through-hole 121 connecting the back side of the semiconductor substrate 110 and the groove part 120 in this way, it is possible to supply the water 100 including carbon dioxide from the back side of the semiconductor substrate 110 to the groove part 120 by a capillary action, etc., in the through-hole 121.

Furthermore, in the present embodiment, the surface cover film 170 is formed by a silica system porous film. A silica system porous film has a rough film texture, and therefore part of the water flowing in the groove part 120 may be caused to evaporate through the silica system porous film. Thus, the photosynthesis apparatus according to the present embodiment does not only have a function of absorbing carbon dioxide but also has a cooling function.

Note that contents other than the above are the same as the second embodiment. Furthermore, the present embodiment is also applicable to the first and third through fifth embodiments.

Seventh Embodiment

Figure 36:
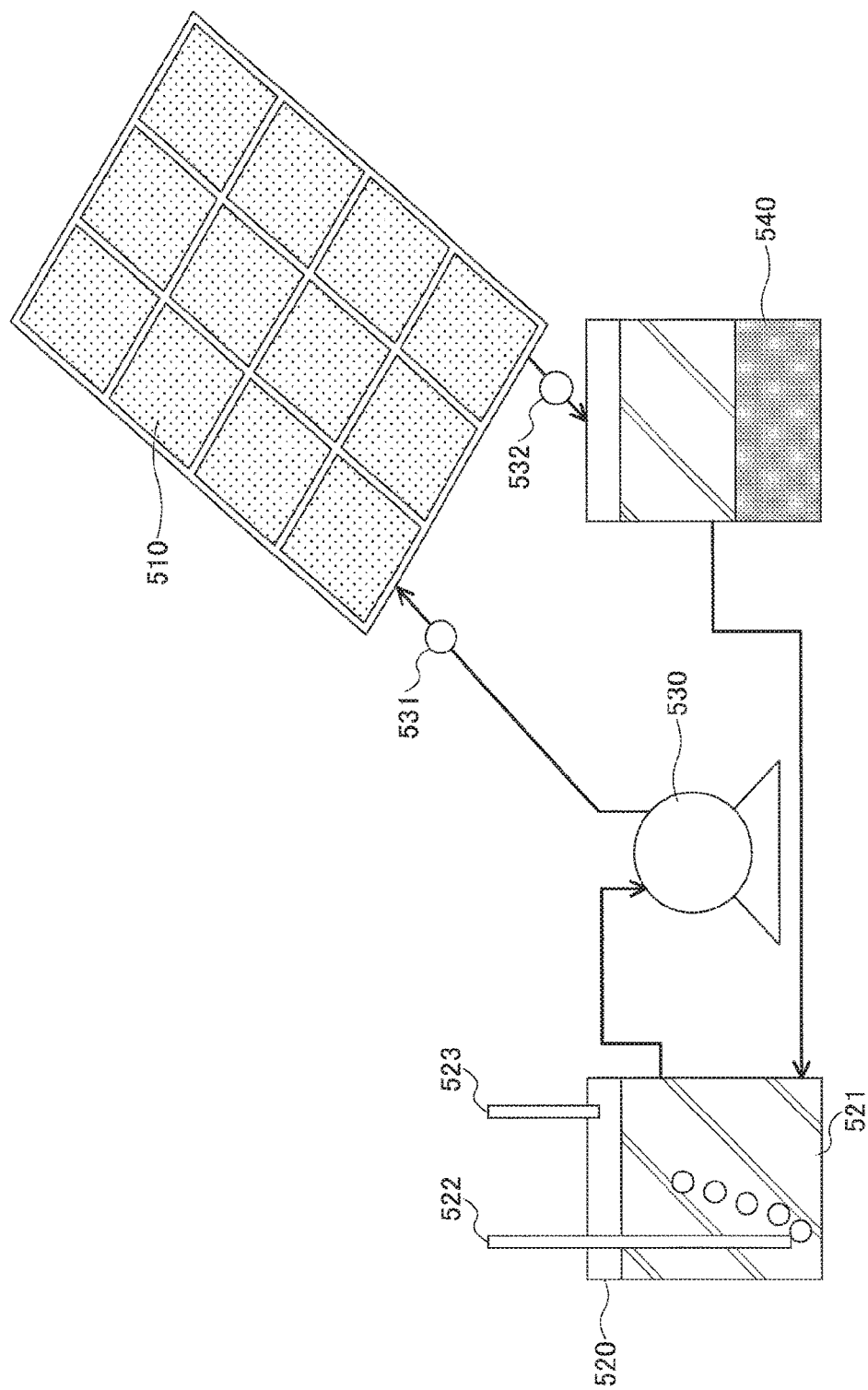
FIG. 36 is a diagram illustrating a carbon dioxide absorption system according to a seventh embodiment of the present invention.
Figure 37:
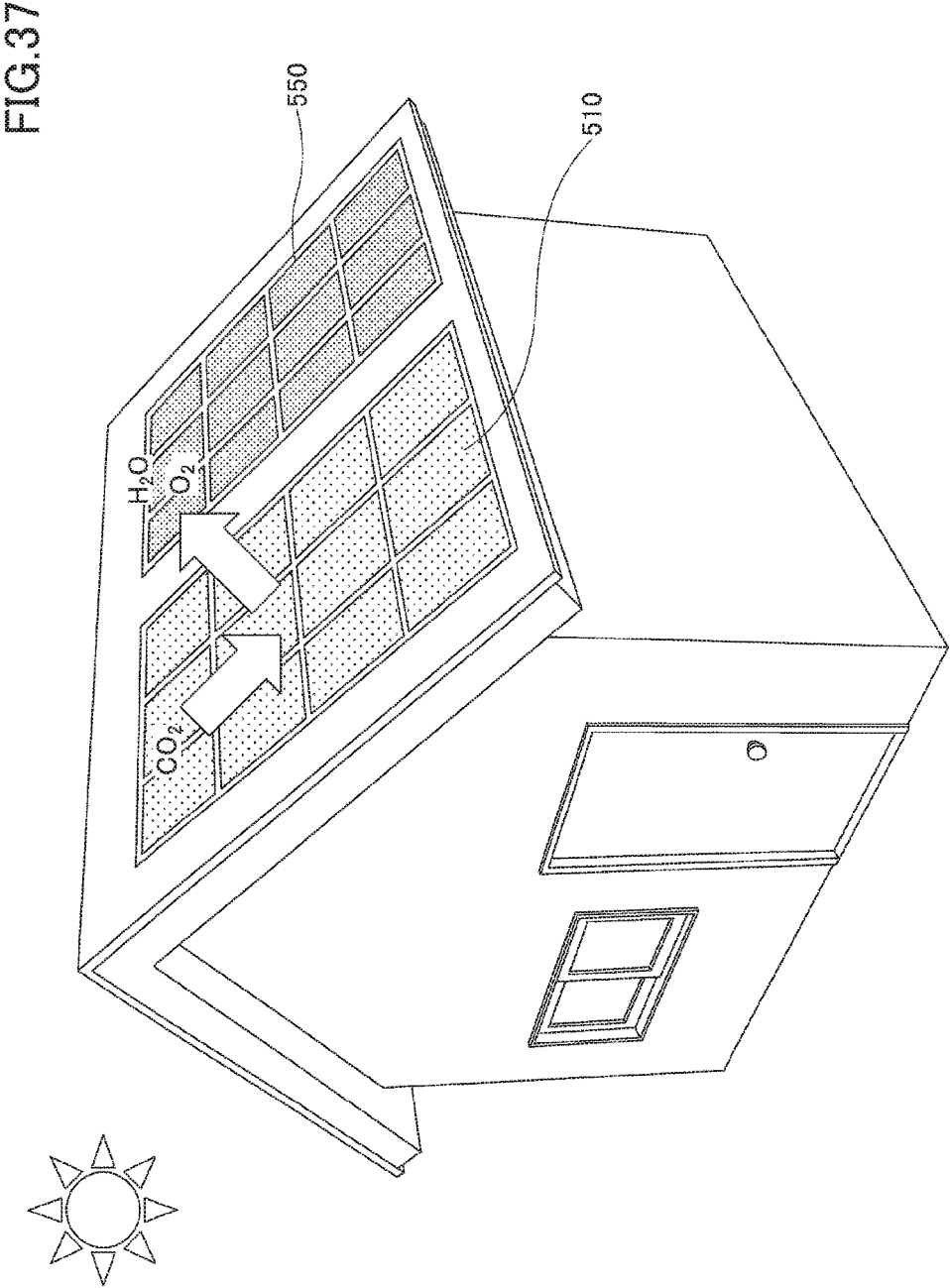
FIG. 37 is a diagram illustrating a cooling system according to an eighth embodiment of the present invention.

Next, a description is given of a seventh embodiment. The present embodiment is a carbon dioxide absorption system using a photosynthesis unit, in which the photosynthesis apparatuses according to the first through sixth embodiments form a unit. As illustrated in FIG. 36, the carbon dioxide absorption system according to the present embodiment includes a photosynthesis unit 510 in which the photosynthesis apparatuses according to the first through sixth embodiments form a unit, a carbon dioxide dissolving tank 520, a water pump 530, and a carbon fixing device 540.

In the carbon dioxide absorption system according to the present embodiment, the atmospheric air is introduced into the carbon dioxide dissolving tank 520 containing water, from an atmospheric air introduction inlet 522, and the carbon dioxide included in the atmospheric air is dissolved by the water contained in the carbon dioxide dissolving tank 520. At this time, the excess atmospheric air in the carbon dioxide dissolving tank 520 is discharged outside the carbon dioxide dissolving tank 520 from a discharge outlet 523. Note that the solubility of the carbon dioxide in room temperature is approximately 0.08 $cm^3$ with respect to 1 $cm^3$ of water.

The water in which the carbon dioxide has been dissolved in the carbon dioxide dissolving tank 520 is sent to the photosynthesis unit 510 by the water pump 530 connected to the carbon dioxide dissolving tank 520. In the present embodiment, the water in the carbon dioxide absorption system may be circulated by the water pump 530. Furthermore, in the present embodiment, a ph meter 531 is disposed between the water pump 530 and the photosynthesis unit 510, and therefore the density of the carbon dioxide included in the water may be measured by measuring the ph of water supplied to the photosynthesis unit 510.

In the photosynthesis unit 510, formic acid is generated from the carbon dioxide included in the supplied water, and water including formic acid is sent to the carbon fixing device 540. In the present embodiment, a ph meter 532 is disposed between the photosynthesis unit 510 and the carbon fixing device 540, and therefore the density of the formic acid included in the water may be measured by measuring the ph of water supplied to the carbon fixing device 540. Inside the carbon fixing device 540, for example, a catalyst and a chemical are provided, by which the formic acid may be converted into a chemical substance that may be preserved, such as methane, ethanol, etc. Accordingly, the formic acid may be removed from the water including the formic acid. The chemical substance that may be preserved such as methane, ethanol, etc., converted from formic acid by the catalyst and the chemical in the carbon fixing device 540, is stored inside the carbon fixing device 540. The water from which the formic acid has been removed in the carbon fixing device 540 is sent to the carbon dioxide dissolving tank 520 from the carbon fixing device 540.

As described above, the carbon dioxide absorption system according to the present embodiment is able to absorb the carbon dioxide included in the atmospheric air.

Eighth Embodiment

Next, a description is given of an eighth embodiment. The present embodiment is a cooling system using the photosynthesis unit 510 in which the photosynthesis apparatuses according to the first through sixth embodiments form a unit. The photosynthesis apparatuses according to the first through sixth embodiments have the same transpiration function as plants, and thus have a cooling effect by evaporation heat. Accordingly, the cooling system according to the present embodiment includes the photosynthesis unit 510 in which the photosynthesis apparatuses according to the first through sixth embodiments form a unit, and a solar panel 550 in which solar cells form a unit. The cooling system is installed on the roof, etc., of a house. In the present embodiment, as the power for driving a water pump (not illustrated) needed for supplying water to the photosynthesis unit 510, the power generated at the solar panel 550 is used. Therefore, the cooling system according to the present embodiment is an independent system that does not depend on other energy sources. The cooling system according to the present embodiment is not only used in houses but also in facilities that need nature and cooling.

Ninth Embodiment

Figure 38:
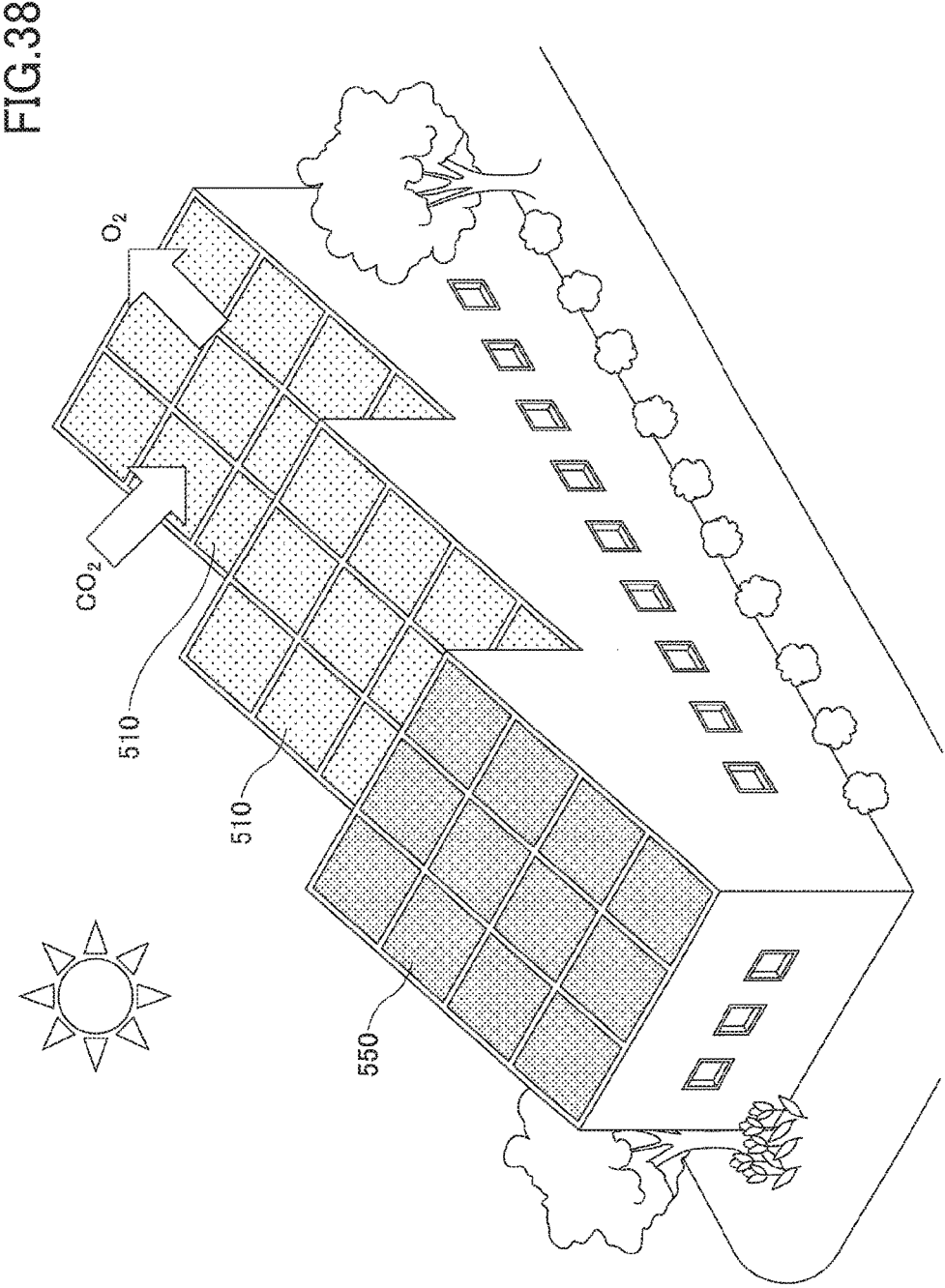
FIG. 38 is a diagram illustrating a zero-emission type data center according to a ninth embodiment of the present invention.

Next, a description is given of a ninth embodiment. In the present embodiment, the photosynthesis unit 510, in which the photosynthesis apparatuses according to the first through sixth embodiments form a unit, is installed in a factory or a data center. As illustrated in FIG. 38, in the present embodiment, the photosynthesis unit 510 and the solar panel 550 in which in which solar cells form a unit, are installed on the roof of a data center. Accordingly, a zero-emission type data center is realized.

In a data center handling big data, a large amount of power is used, and therefore measures are considered to reduce the emission of carbon dioxide as much as possible, by improving a high-efficiency power source and the air-conditioning system. However, it is difficult to completely reduce the emission of carbon dioxide to zero.

Therefore, in the present embodiment, the photosynthesis unit 510 and the solar panel 550 are installed on the roof of the data center. In the present embodiment, as the power for driving a water pump (not illustrated) needed for supplying water to the photosynthesis unit 510, the power generated at the solar panel 550 is used. Therefore, the system according to the present embodiment is an independent system that does not depend on other energy sources. Accordingly, the carbon dioxide corresponding to the power used at the data center is absorbed by the photosynthesis unit 510, and therefore a zero-emission type data center is formed. In the present embodiment, a data center is described; however, the system according to the present embodiment may applied to any kind of industrial facility using power, other than a data center.

Tenth Embodiment

Next, a description is given of a tenth embodiment. The present embodiment is an earth cooling system in which the photosynthesis units 510, in which the photosynthesis apparatuses according to the first through sixth embodiments form a unit, are installed on the ground, etc., of the earth.

Figure 39:
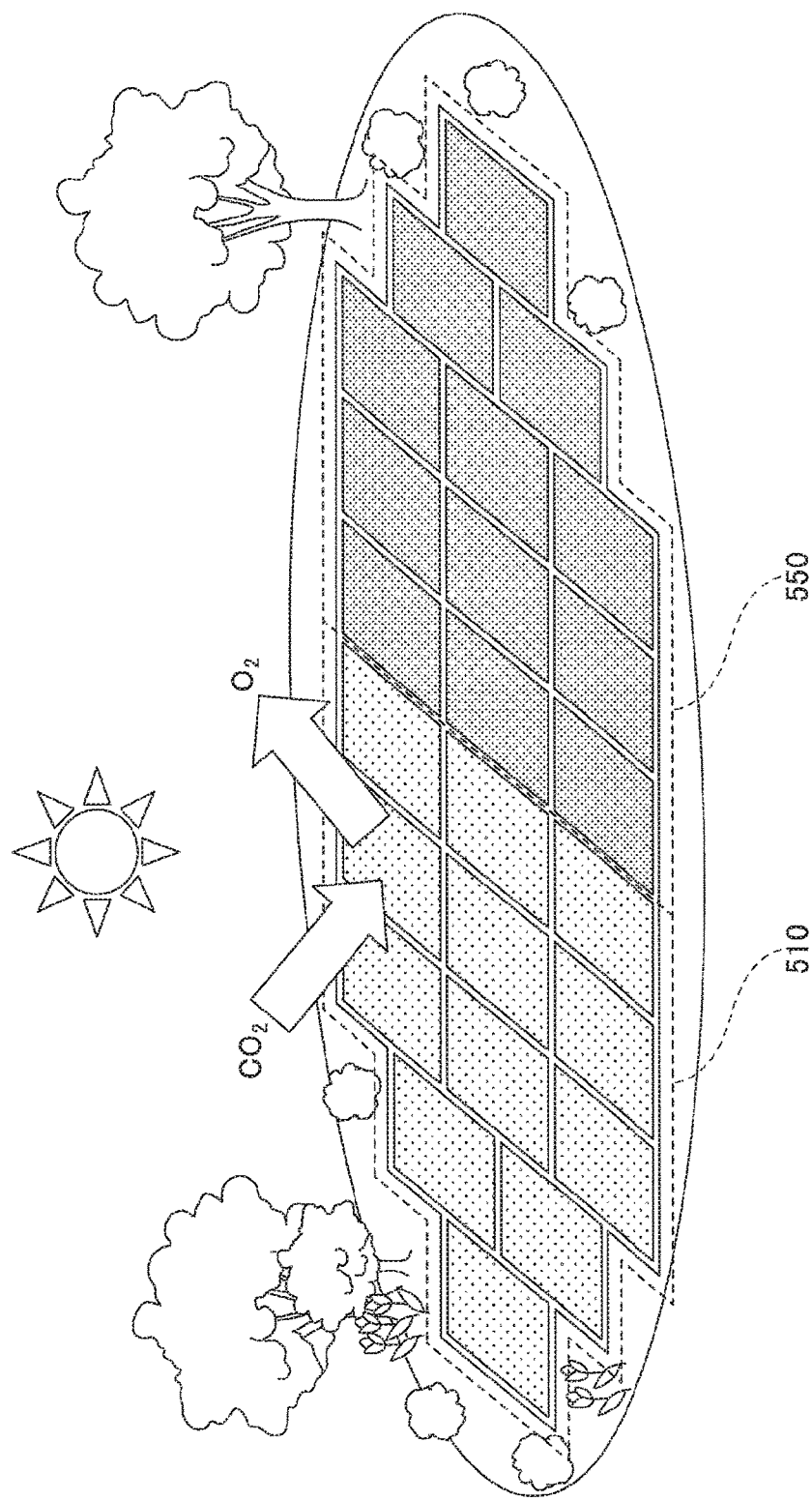
FIG. 39 is a diagram illustrating an earth cooling system according to a tenth embodiment of the present invention.

As illustrated in FIG. 39, in the present embodiment, multiple photosynthesis units 510, in which the photosynthesis apparatuses according to the first through sixth embodiments form a unit, and multiple solar panels 550, are installed on the ground, etc., of the earth. In the present embodiment, as the power for driving a water pump (not illustrated) needed for supplying water to the photosynthesis unit 510, the power generated at the solar panel 550 is used. Therefore, the earth cooling system according to the present embodiment is an independent system that does not depend on other energy sources. Accordingly, the emission of carbon dioxide is reduced on a global basis, and global warming is mitigated.

Eleventh Embodiment

Next, a description is given of an eleventh embodiment. The present embodiment is a system for controlling the density of carbon dioxide in an enclosed space. Specifically, when there are people in an enclosed space such as a crowded train or a gymnasium, the density of carbon dioxide in the enclosed space increases due to the people's breathing. Accordingly, people may fall ill or suffer heat exhaustion or hyperpnea.

Figure 40:
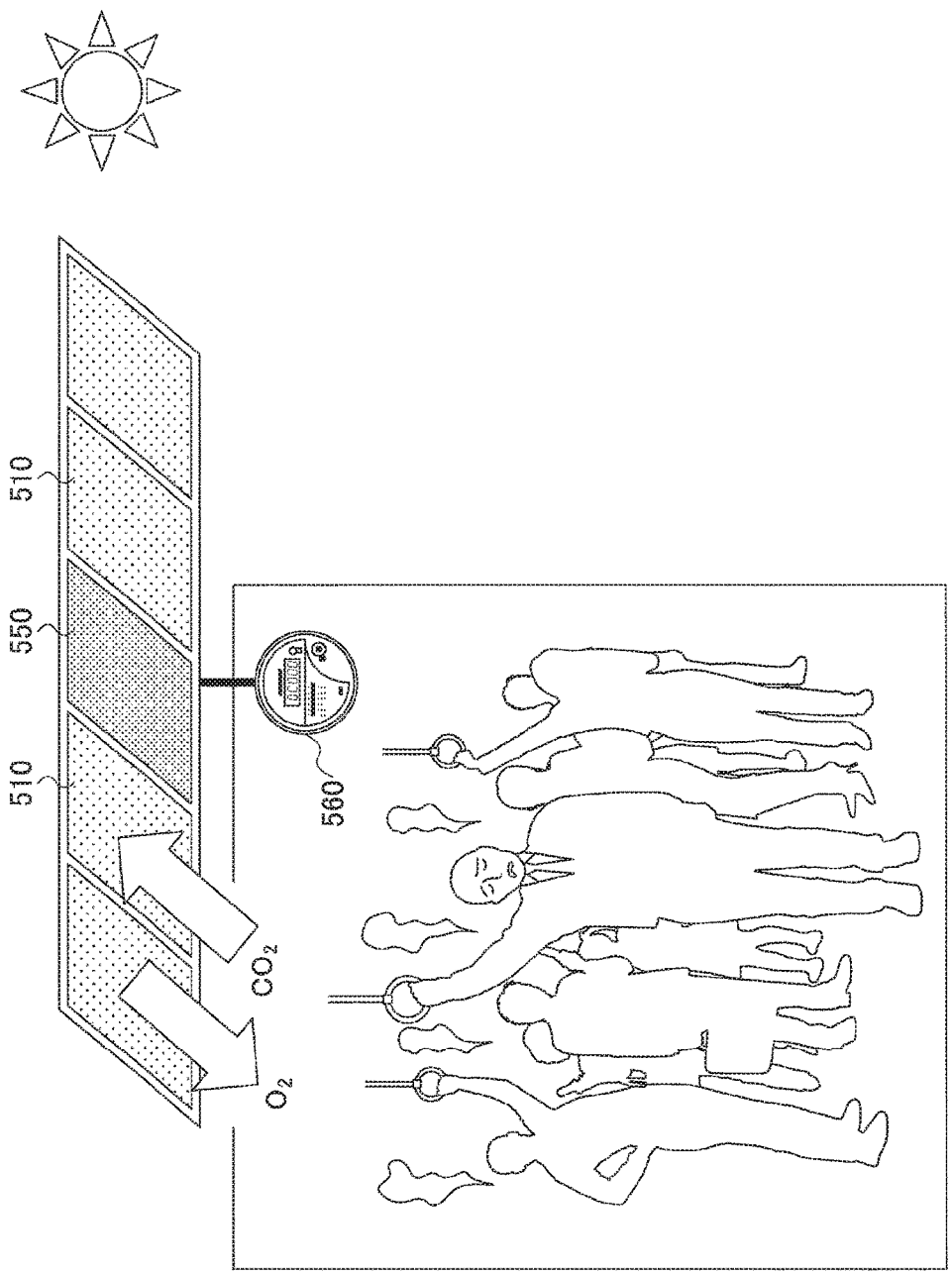
FIG. 40 is a diagram illustrating a system for controlling the density of carbon dioxide according to an eleventh embodiment of the present invention.

In the present embodiment, for example, as illustrated in FIG. 40, the photosynthesis units 510 in which the photosynthesis apparatuses according to the first through sixth embodiments form a unit and the solar panel 550 are installed on the roof of a train, and a carbon dioxide density sensor 560 is installed inside the train. Thus, according to the density of carbon dioxide inside the train detected by the carbon dioxide density sensor 560, the photosynthesis unit 510 removes carbon dioxide from the air inside the train and supplies oxygen. Accordingly, the density of carbon dioxide inside the train is maintained at a predetermined value. In this way, the space inside the train is made comfortable.

Figure 41:
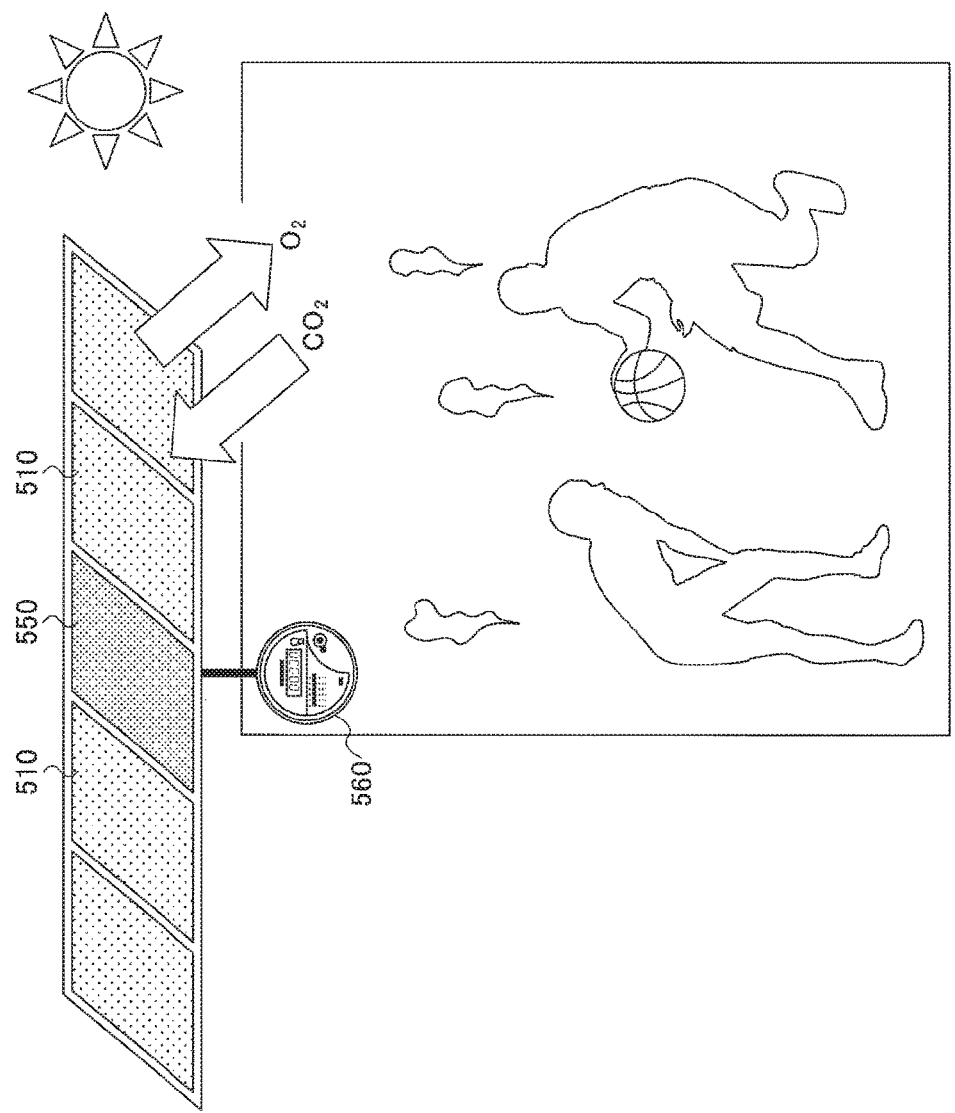
FIG. 41 is a diagram illustrating another system for controlling the density of carbon dioxide according to the eleventh embodiment of the present invention.

Furthermore, as illustrated in FIG. 41, the present embodiment may be a control system in which the photosynthesis units 510 and the solar panel 550 are installed on the roof of a gymnasium, and the carbon dioxide density sensor 560 is installed inside the gymnasium. Thus, according to the density of carbon dioxide inside the gymnasium detected by the carbon dioxide density sensor 560, the photosynthesis unit 510 removes carbon dioxide from the air inside the gymnasium and supplies oxygen. Accordingly, the density of carbon dioxide inside the gymnasium is maintained at a predetermined value. In this way, the space inside the gymnasium is made comfortable.

In the present embodiment, as the power for driving a water pump (not illustrated) needed for supplying water to the photosynthesis unit 510, the power generated at the solar panel 550 is used. Therefore, the control system according to the present embodiment is an independent system that does not depend on other energy sources.

Twelfth Embodiment

Next, a description is given of a twelfth embodiment. The present embodiment is an urban environment network system using the photosynthesis units 510, in which the photosynthesis apparatuses according to the first through sixth embodiments form a unit. The density of carbon dioxide in urban areas is higher than that of rural areas. This is one factor causing abnormal weather such as guerilla rainstorms due to the heat island phenomenon. Furthermore, urban areas have limited areas for greening.

Figure 42:
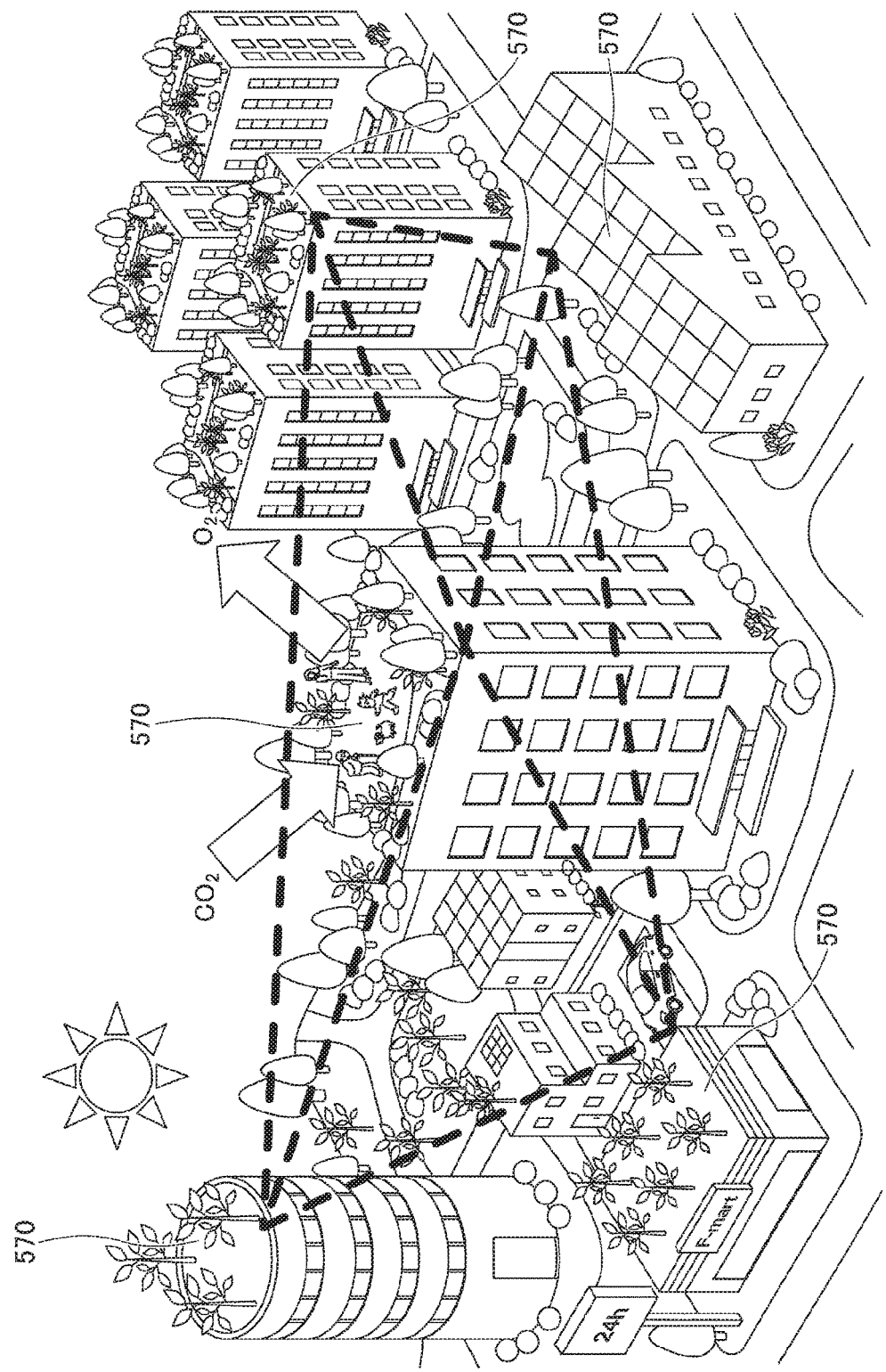
FIG. 42 is a diagram illustrating an urban environment network system according to a twelfth embodiment of the present invention.

In the present embodiment, as illustrated in FIG. 42, environment measurement stations 570, which are equipped with the photosynthesis units 510 and a carbon dioxide density sensor, are disposed on buildings, factories, and houses. The environment measurement stations 570 are connected by a wireless network as indicated by the dashed lines. Accordingly, the density of carbon dioxide in urban areas is reduced and controlled. The environment measurement stations 570 may include a sensor for measuring air pollutants such as PM2.5 and NOX, etc. Accordingly, the density of carbon dioxide in urban areas is reduced, and abnormal weather is mitigated.

According to an aspect of the embodiments, a photosynthesis apparatus for performing artificial photosynthesis is capable of using sunlight with high efficiency, and the installation area of the photosynthesis apparatus is decreased.

The present invention is not limited to the specific embodiments described herein, and variations and modifications may be made without departing from the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A photosynthesis apparatus, comprising:
a groove part formed in a semiconductor substrate;
a first conductive type area formed on one side surface of the groove part in the semiconductor substrate;
a second conductive type area formed on another side surface of the groove part in the semiconductor substrate;
an oxidation electrode formed in contact with the first conductive type area on the one side surface of the groove part;
a reduction electrode formed in contact with the second conductive type area on the other side surface of the groove part; and
a proton diaphragm formed at a center part of the groove part,
wherein a height of each of the oxidation electrode and the reduction electrode on the semiconductor substrate is the same as a depth of the groove part in the semiconductor substrate,
water including carbon dioxide is supplied to the groove part, and
light is radiated to the oxidation electrode or the reduction electrode to generate oxygen and a hydrogen ion from the water at the oxidation electrode, and the generated hydrogen ion penetrates the proton diaphragm and reacts with the carbon dioxide to generate formic acid at the reduction electrode.

2. The photosynthesis apparatus according to claim 1, wherein the semiconductor substrate is a silicon substrate.

3. A photosynthesis apparatus comprising:
a semiconductor layer formed on a substrate;
a groove part formed in the semiconductor layer;
a first conductive type area formed on one side surface of the groove part;
a second conductive type area formed on another side surface of the groove part;
an oxidation electrode formed in contact with the first conductive type area on the one side surface of the groove part;
a reduction electrode formed in contact with the second conductive type area on the other side surface of the groove part; and
a proton diaphragm formed at a center part of the groove part,
wherein a height of each of the oxidation electrode and the reduction electrode on the semiconductor layer is the same as a depth of the groove part in the semiconductor layer,
water including carbon dioxide is supplied to the groove part, and
light is radiated to the oxidation electrode or the reduction electrode to generate oxygen and a hydrogen ion from the water at the oxidation electrode, and the generated hydrogen ion penetrates the proton diaphragm and reacts with the carbon dioxide to generate formic acid at the reduction electrode.

4. The photosynthesis apparatus according to claim 3, wherein the first conductive type area and the second conductive type area are formed of a material including GaN.

5. The photosynthesis apparatus according to claim 4, wherein
the first conductive type area is formed by depositing a plurality of semiconductor layers having different band gaps, and
the second conductive type area is formed by depositing a plurality of semiconductor layers having different band gaps.

6. The photosynthesis apparatus according to claim 1, wherein
a first conductive type of the first conductive type area is an n-type, and
a second conductive type of the second conductive type area is a p-type.

7. A photosynthesis apparatus comprising:
a groove part formed in a semiconductor layer on a substrate;

a first semiconductor area formed on one side surface of the groove part;

a second semiconductor area formed on another side surface of the groove part;

a third semiconductor area formed in contact with the first semiconductor area and the second semiconductor area;

an oxidation electrode formed in contact with the first semiconductor area on the one side surface of the groove part;

a reduction electrode formed in contact with the second semiconductor area on the other side surface of the groove part; and a proton diaphragm formed at a center part of the groove part, wherein the third semiconductor area is formed of a semiconductor material having a wider band gap than a semiconductor material forming the first semiconductor area and the second semiconductor area, two-dimensional electron gas is generated at an interface between the first semiconductor area and the third semiconductor area, two-dimensional hole gas is generated at an interface between the second semiconductor area and the third semiconductor area, water including carbon dioxide is supplied to the groove part, and light is radiated to the oxidation electrode or the reduction electrode to generate oxygen and a hydrogen ion from the water at the oxidation electrode, and the generated hydrogen ion penetrates the proton diaphragm and reacts with the carbon dioxide to generate formic acid at the reduction electrode.

8. The photosynthesis apparatus according to claim 7, wherein the first semiconductor area is formed by depositing a plurality of semiconductor layers having different band gaps, and the second semiconductor area is formed by depositing a plurality of semiconductor layers having different band gaps.

9. The photosynthesis apparatus according to claim 7, wherein the first semiconductor area and the second semiconductor area are formed of a material including GaN, and the third semiconductor area is formed of a material including AlGaN.

10. The photosynthesis apparatus according to claim 7, wherein a through hole penetrating the substrate is formed between the groove part and a back side of the substrate, and the water including the carbon dioxide is supplied to the groove part via the through hole from the back side of the substrate.

* * * * *